US008854439B2

(12) United States Patent
Ito et al.

(10) Patent No.: US 8,854,439 B2
(45) Date of Patent: Oct. 7, 2014

(54) STEREOSCOPIC PICTURE DISPLAY, METHOD OF MANUFACTURING THE SAME AND STEREOSCOPIC PICTURE DISPLAY METHOD

(75) Inventors: Katsuhisa Ito, Tokyo (JP); Naoya Eguchi, Kanagawa (JP); Hiroki Kikuchi, Kanagawa (JP); Shinichiro Tajiri, Tokyo (JP); Izushi Kobayashi, Tokyo (JP); Hiroaki Yasunaga, Tokyo (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 13/131,507

(22) PCT Filed: Dec. 10, 2009

(86) PCT No.: PCT/JP2009/070672
§ 371 (c)(1),
(2), (4) Date: May 26, 2011

(87) PCT Pub. No.: WO2010/067838
PCT Pub. Date: Jun. 17, 2010

(65) Prior Publication Data
US 2011/0234772 A1  Sep. 29, 2011

(30) Foreign Application Priority Data

Dec. 12, 2008 (JP) .................................. 2008-317522
Oct. 21, 2009 (JP) .................................. 2009-242716

(51) Int. Cl.
H04N 13/04 (2006.01)
G03B 35/24 (2006.01)
G09G 3/00 (2006.01)
G02B 27/22 (2006.01)
G03B 35/22 (2006.01)

(52) U.S. Cl.
CPC ................ G03B 35/24 (2013.01); G09G 3/005 (2013.01); H04N 13/0493 (2013.01); G02B 27/2264 (2013.01); G03B 35/22 (2013.01)
USPC .......................................................... 348/54

(58) Field of Classification Search
CPC .... G02B 27/2264; G03B 35/22; G03B 35/24; G09G 3/005; H04N 13/0493
USPC ........................................................ 348/42–54
See application file for complete search history.

(56) References Cited

U.S. PATENT DOCUMENTS 6,460,278 B1   10/2002  Jurjavcic
2002/0075566 A1*  6/2002  Tutt et al. ..................... 359/619

(Continued)

FOREIGN PATENT DOCUMENTS

JP        10-97013       4/1998
JP       2004-177709     6/2004

(Continued)

OTHER PUBLICATIONS

Yendo, Tomohiro, "Cylindrical 3D Display Visible From Any Angle", Jul. 31, 2011, URL: http://www.yendo.org/seelinder.
Kinoshita, "Stereocopic Vision Display Technology in a Small Portable 360", Aug. 6, 2008, http://www.hitachi.co.jp/New/cnews/month/2007/08/0806.html.

*Primary Examiner* — Dave Czekaj
*Assistant Examiner* — Md Haque
(74) *Attorney, Agent, or Firm* — Robert J. Depke; The Chicago Technology Law Group, LLC

(57) ABSTRACT

A stereoscopic picture is viewable from all directions with high reproducibility without complicating a stereoscopic display mechanism, compared to related art. A cylindrical rotation section 104 rotating around a rotation shaft as a rotation center, a two-dimensional light-emitting element array 101 mounted in the rotation section and having a light-emission surface formed of a plurality of light-emitting elements arranged in a matrix, and a slit 102 arranged in a circumferential surface of the rotation section in a position facing the light-emission surface are included. As the two-dimensional light-emitting element array 101, a two-dimensional light-emitting element array including a curved portion with a concave surface which is formed as a light-emission surface is used. The plurality of light-emitting elements emit light, which corresponds to orientation of the light-emission surface, to outside of the rotation section through the slit 102.

14 Claims, 33 Drawing Sheets

(56) References Cited

U.S. PATENT DOCUMENTS

| | | | |
|---|---|---|---|
| 2005/0105179 A1* | 5/2005 | Taira et al. | 359/463 |
| 2005/0161680 A1* | 7/2005 | Kawakami et al. | 257/79 |
| 2006/0022206 A1* | 2/2006 | Hayakawa et al. | 257/82 |
| 2007/0258200 A1* | 11/2007 | Choi et al. | 361/681 |
| 2008/0043014 A1 | 2/2008 | Tachi et al. | |
| 2008/0242954 A1* | 10/2008 | Naya et al. | 600/300 |

FOREIGN PATENT DOCUMENTS

| | | |
|---|---|---|
| JP | 2005-114771 | 4/2005 |
| JP | 2005-189619 | 7/2005 |
| JP | 2005-300813 | 10/2005 |

* cited by examiner (L1=90, L2=10, r=30, −33° ≦θ≦33°)

STEREOSCOPIC PICTURE DISPLAY, METHOD OF MANUFACTURING THE SAME AND STEREOSCOPIC PICTURE DISPLAY METHOD

CROSS REFERENCES TO RELATED APPLICATIONS

The present application is a 371 U.S. National Stage filing of PCT/JP2009/070672, filed Dec. 10, 2009, which claims priority to Japanese Patent Application Number JP 2009-242716 filed Oct. 21, 2009 and the Japanese Patent Application Number JP 2008-317522, filed Dec. 12, 2008, all of which are incorporated herein by reference.

TECHNICAL FIELD

The present invention relates to a stereoscopic picture display capable of displaying a stereoscopic picture around an entire circumference thereof, a method of manufacturing the same and a stereoscopic picture display method.

BACKGROUND ART

A large number of integral imaging-based omnidirectional stereoscopic picture displays picking up images of a subject from all directions or reproducing a stereoscopic picture of an entire circumference of a subject based on two-dimensional picture information for stereoscopic picture display formed by a computer have been proposed. For example, NPTL 1 discloses a stereoscopic picture display viewable from all directions. The stereoscopic picture display includes, for example, a limited viewing angle screen, a rotation mechanism, a top mirror, bottom mirrors, a projector and a personal computer, and displays a stereoscopic picture with use of binocular parallax. The personal computer controls the projector and the rotation mechanism.

The projector projects pictures for stereoscopic picture display on the top mirror. The pictures for stereoscopic picture display projected on the top mirror are reflected by the bottom mirrors to be projected on the limited viewing angle screen. The limited viewing angle screen rotates at high speed by the rotation mechanism. When the stereoscopic picture display is configured in such a manner, a background is allowed to be seen through, and a three-dimensional stereoscopic picture is viewable from all directions over 360°.

NTPL 2 discloses 3D video display viewable from all directions. The 3D video display includes a cylindrical rotating body for stereoscopic picture display and a motor. A plurality of vertical lines allowing light to pass therethrough are arranged around a circumferential surface of the rotating body. A timing controller, a ROM, an LED array, an LED driver and an address counter are arranged in the rotating body. The timing controller is connected to the address counter, the ROM and the LED driver to control outputs thereof. The ROM stores picture data for stereoscopic picture display. On the other hand, a slip ring is arranged on a rotation shaft of the rotating body. Power is supplied to components in the rotating body through the slip ring.

The address counter generates an address based on set/reset signal from the timing controller. The ROM is connected to the address counter. The ROM receives a read control signal from the timing controller and the address from the address counter to read picture data for stereoscopic picture display and then transmit the picture data to the LED driver. The LED driver receives the picture data from the ROM and a light-emission control signal from the timing controller to drive the LED array. The LED array is controlled by the LED driver to emit light. The motor allows the rotating body to rotate. When the 3D video display is configured in such a manner, a stereoscopic picture is allowed to be displayed along 360°; therefore, the stereoscopic picture is observable without wearing glasses for binocular parallax.

Relating to the omnidirectional stereoscopic picture displays of this kind, PTL 1 discloses a stereoscopic picture display. The stereoscopic picture display includes a bundle-of-rays allotting means and a cylindrical two-dimensional pattern display means. The bundle-of-rays allotting means is arranged on a front side or a back side of a display surface having a convex-curved surface as seen from an observer. The bundle-of-rays allotting means has a curved surface where a plurality of aperture parts are formed or lenses are formed in an array, and bundles of rays from a plurality of pixels on the display surface are allotted to the respective aperture parts or lenses. The two-dimensional pattern display means displays a two-dimensional pattern on the display surface.

When the stereoscopic picture display is configured in such a manner, picture mapping of stereoscopic pictures easily displayed in full motion video is allowed to be effectively executed, and even though a viewpoint position is changed, stereoscopic pictures are not collapsed and is allowed to be displayed with high resolution.

Moreover, PTL 2 discloses an integral imaging-based display. The display includes one light-emitting unit and a cylindrical screen. The light-emitting unit is configured to be rotatable around a rotation shaft. The screen is arranged around the light-emitting unit, and forms a part of an axially symmetric rotating body on the rotation shaft. A plurality of light-emitting sections are arranged on a side facing the screen of the light-emitting unit, and each of the light-emitting sections has a light emission angle limited to a predetermined range by setting two or more directions different from one another as light emission directions.

The light-emitting unit rotates around the rotation shaft to subject the light emitting sections to rotational scanning, and modulates light emission amounts of the light-emitting sections according to given information, thereby displaying a picture on the screen. When the display is configured in such a manner, a stereoscopic picture is allowed to be displayed along 360°; therefore, a large number of people are allowed to observe the stereoscopic picture without glasses for binocular parallax.

Further, PTL 3 discloses an invention of a display displaying a picture in a curved form inside a cylindrical device and providing one and the same picture to all observers around the device by rotating the whole device.

PTL 4 discloses an invention of a stereoscopic display performing stereoscopic picture display by allowing a display unit, which emits a light flux from a number of display elements corresponding to a plurality of parallaxes at a predetermined parallax pitch angle to emit light while rotating with respect to an observer.

CITATION LIST

Patent Literature

[PTL 1] Japanese Patent Application Unexamined Publication No. 2004-177709 (P. 8, FIG. 7)
[PTL 2] Japanese Patent Application Unexamined Publication No. 2005-114771 (P. 8, FIG. 3)
[PTL 3] Japanese Patent Application Unexamined Publication (Translation of PCT Application) No. 2002-503831
[PTL 4] Japanese Patent Application Unexamined Publication No. H10-97013

Non-Patent Literature

[NPTL 1] "Stereoscopic Picture Display Viewable from All Direction" URL: http://hhil.hitachi.co.jp/products/transpost.html
[NPTL 2] "Cylindrical 3-D Video Display Observable from All Directions" URL: http://www.yendo.org/seelinder/

DISCLOSURE OF THE INVENTION

In stereoscopic picture displays in related art, the following issues arise.

In the stereoscopic picture display in NPTL 1, the limited viewing angle screen, the rotation mechanism, the top mirror, the bottom mirrors, the projector and the personal computer are necessary, so a system is large and control is complicated.

In the 3D video display in NPTL 2, the stereoscopic picture is displayed by light passing through a plurality of vertical lines arranged around the circumferential surface of the rotating body, so use efficiency of light rays may be reduced to cause large energy loss.

The stereoscopic picture display in PTL 1 includes the bundle-of-rays allotting means which is arranged on the front side or the back side of the display surface having a convex-curved surface as seen from an observer, and has a curved surface where a plurality of aperture parts are formed or lenses are formed in an array. As bundles of rays from a plurality of pixels on the display surface are allotted to the respective aperture parts or lenses, there is an issue that practical image quality is not obtainable.

In the integral imaging-based display in PTL 2, the light-emitting unit rotates around the rotation shaft to subject the light-emitting sections to rotational scanning, and modulates the light emission amounts of the light-emitting sections according to given information, thereby displaying a picture on a fixed screen. Therefore, as in the case of the stereoscopic picture display in PTL 1, there is an issue that practical image quality is not obtainable.

Moreover, the display in PTL 3 provides one and the same picture to all observers around the device, and is not allowed to perform stereoscopic display for displaying pictures having parallax according to a viewpoint position.

PTL 4 describes a stereoscopic display capable of displaying pictures having parallax according to a viewpoint position around a circumference of a cylindrical device. However, there is no specific description about how the pictures are displayed when the pictures are viewed from an arbitrary viewpoint position around the device, and practicability is little.

The present invention is made to solve the above-described issues, and it is an object of the invention to provide a stereoscopic picture display allowing a stereoscopic picture to be viewable from all directions with high reproducibility without complicating a stereoscopic display mechanism, compared to related art, a method of manufacturing the same, and a stereoscopic picture display method.

A stereoscopic picture display according to a first aspect of the invention includes: a cylindrical rotation section including a rotation shaft therein; a drive section allowing the rotation section to rotate around the rotation shaft as a rotation center; a light-emitting element array mounted in the rotation section and having a light-emission surface formed of a plurality of light-emitting elements arranged in a matrix with m rows and n columns, where each of m, n being an integer of 2 or more; and a slit arranged in a circumferential surface of the rotation section in a position facing the light-emission surface.

Then, the light-emitting element array includes a curved portion with a concave surface which is formed as the light-emission surface. Moreover, the plurality of light-emitting elements emit light, which corresponds to orientation of the light-emission surface, to outside of the rotation section through the slit.

A stereoscopic picture display according to a second aspect of the invention includes: a cylindrical rotation section including a rotation shaft therein; a drive section allowing the rotation section to rotate around the rotation shaft as a rotation center; a plurality of light-emitting element arrays mounted in the rotation section and each having a light-emission surface formed of a plurality of light-emitting elements arranged in a matrix with m rows and n columns, where each of m, n being an integer of 2 or more; and a plurality of slits arranged in a circumferential surface of the rotation section in positions facing the light-emission surfaces of the plurality of light-emitting element arrays, respectively.

Then, the light-emitting element arrays each include a curved portion with a concave surface which is formed as the light-emission surface. Moreover, the plurality of light-emitting elements emit light, which corresponds to orientation of the light-emission surface, to outside through the slit, and the plurality of slits are arranged in a circumferential surface of the rotation section at equal angle intervals around the rotation shaft as an origin point.

In a stereoscopic picture display method according to an embodiment of the invention, in a stereoscopic picture display including a cylindrical rotation section including a rotation shaft therein, a drive section allowing the rotation section to rotate around the rotation shaft as a rotation center, a light-emitting element array mounted in the rotation section and having a light-emission surface formed of a plurality of light-emitting elements arranged in a matrix with m rows and n columns, where each of m, n being an integer of 2 or more, and a slit arranged in a circumferential surface of the rotation section in a position facing the light-emission surface, when a stereoscopic picture is displayed by the stereoscopic picture display, as the light-emitting element array, a light-emitting element array including a curved portion with a concave surface which is formed as the light-emission surface is used, and the plurality of light-emitting elements emit light, which corresponds to orientation of the light-emission surface, to outside of the rotation section through the slit.

In the stereoscopic picture display according to the first or second aspect of the invention or the stereoscopic picture display method according to the embodiment of the invention, in a rotating state in which the rotation section including one or a plurality of light-emitting element arrays mounted therein rotates, a plurality of light-emitting elements in the light-emitting element array(s) emit light, which corresponds to orientation of a curved light-emission surface, to outside of the rotation section through the slit(s). Therefore, an observer is allowed to perceive a stereoscopic picture in an arbitrary position around the rotation section.

A method of manufacturing a stereoscopic picture display according to an embodiment of the invention includes: a step of processing a tube workpiece to form a cylindrical rotation section including a rotation shaft therein and a slit arranged in a circumferential surface thereof; a step of manufacturing a light-emitting element array having a curved portion; and a step of mounting the light-emitting element array in the rotation section.

Then, in the step of manufacturing the light-emitting element array, a plurality of light-emitting elements are arranged in a matrix with m rows and n columns on a concave surface of the curved portion to form a light-emission surface, where each of m, n being an integer of 2 or more, and a stereoscopic picture display is manufactured to allow the plurality of light-emitting elements to emit light, which corresponds to orientation of the light-emission surface, to outside of the rotation section through the slit.

In the method of manufacturing a stereoscopic picture display according to the embodiment of the invention, when a tube workpiece is processed, a cylindrical rotation section including a rotation shaft therein and having a slit in a circumferential surface thereof is formed. A two-dimensional light-emitting element array including a plurality of light-emitting elements is mounted in a predetermined position in the rotation section.

In the stereoscopic picture display according to the first or second aspect of the invention or the stereoscopic picture display method according to the embodiment of the invention, as the light-emitting element array, the light-emitting element array in which the light-emission surface is formed on the concave surface of the curved portion is used, and the plurality of light-emitting elements emit light, which corresponds to orientation of the light-emission surface, to outside of the rotation section through the slit(s); therefore, a stereoscopic picture is viewable from all directions with high reproducibility without complicating a stereoscopic display mechanism, compared to related art.

In particular, in the stereoscopic picture display according to the second aspect of the invention, the plurality of light-emitting element arrays and the plurality of slits are included; therefore, for example, when the plurality of light-emitting element arrays emit light having respective wavelengths different from one another, color stereoscopic picture display is achievable.

In the method of manufacturing a stereoscopic picture display according to the embodiment of the invention, the stereoscopic picture display with a simple configuration in which the light-emitting element array is mounted in the cylindrical rotation section is manufactured; therefore, a stereoscopic picture display allowing a stereoscopic picture to be viewed from all directions with high reproducibility is easily manufacturable without complicating a stereoscopic display mechanism, compared to related art.

BRIEF DESCRIPTION OF THE DRAWINGS

FIG. 19 is a block diagram illustrating a configuration example of one one-dimensional light-emitting element substrate #1 or the like.

FIGS. 21(A) and 21(B) are illustrations of a configuration example and an operation example of an omnidirectional stereoscopic picture display 20 according to a second embodiment.

FIGS. 22(A) and 22(B) are illustrations of a configuration example and an operation example of an omnidirectional stereoscopic picture display 30 according to a third embodiment.

FIGS. 23(A) and 23(B) are illustrations of a configuration example and an operation example of an omnidirectional stereoscopic picture display 40 according to a fourth embodiment.

FIGS. 24(A) and 24(B) are illustrations of a configuration example and an operation example of an omnidirectional stereoscopic picture display 50 according to a fifth embodiment.

FIGS. 25(A) and 25(B) are illustrations of a configuration example and an operation example of an omnidirectional stereoscopic picture display 60 according to a sixth embodiment.

FIGS. 26(A) and 26(B) are illustrations of an optimum width of a slit.

FIGS. 27(A) and 27(B) are illustrations of an example of a pixel arrangement of a display plane observed from an arbitrary viewpoint p in the omnidirectional stereoscopic picture display 10.

FIGS. 33(A) and 33(B) are illustrations of viewing examples of stereoscopic pictures in the omnidirectional stereoscopic picture display 10 and the like as the respective embodiments.

BEST MODE(S) FOR CARRYING OUT THE INVENTION

Figure 1:
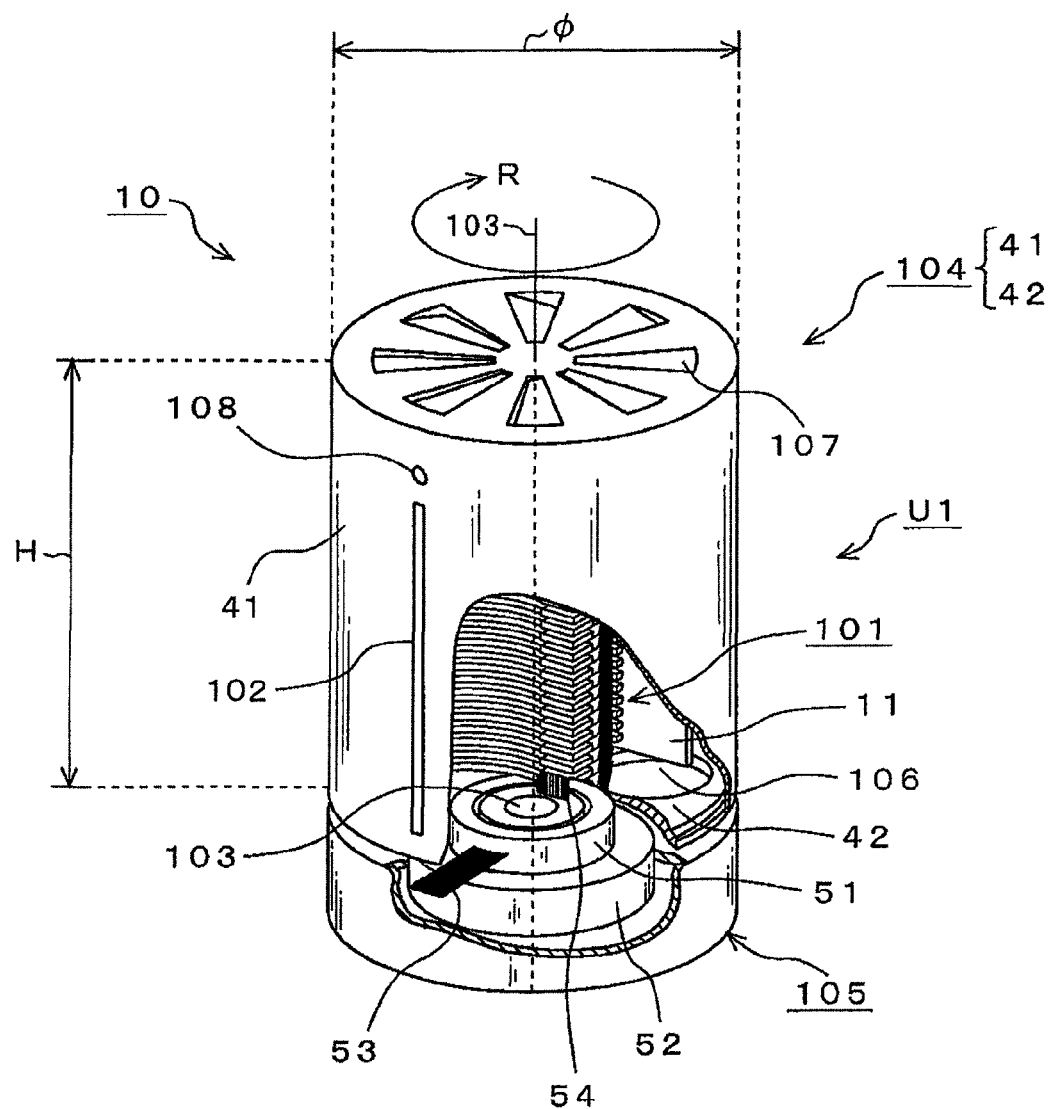
FIG. 1 is a partially cutaway perspective view illustrating a configuration example of an omnidirectional stereoscopic picture display 10 according to a first embodiment of the invention.

Best modes (hereinafter simply referred to as embodiments) for carrying out the invention will be described in detail below referring to the accompanying drawings. Descriptions will be given in the following order.
1. First Embodiment (Omnidirectional stereoscopic picture display 10: configuration example, assembly example, shape calculation example, formation example, operation principle, trail example, state, data generation example, stereoscopic picture display example)
2. Second Embodiment (Omnidirectional stereoscopic picture display 20: configuration example and operation example)
3. Third Embodiment (Omnidirectional stereoscopic picture display 30: configuration example and operation example)
4. Fourth Embodiment (Omnidirectional stereoscopic picture display 40: configuration example and operation example)
5. Fifth Embodiment (Omnidirectional stereoscopic picture display 50: configuration example and operation example)
6. Sixth Embodiment (Omnidirectional stereoscopic picture display 60: configuration example and operation example)
7. Seventh Embodiment (Optimization of slit width)
8. Eighth Embodiment (Optimization of light-emission timing)
9. Ninth Embodiment (Viewing example of stereoscopic pictures by displays of respective embodiments)
<First Embodiment>
[Configuration Example of Omnidirectional Stereoscopic Picture Display 10]

FIG. 1 is a partially cutaway perspective view illustrating a configuration example of an omnidirectional stereoscopic picture display 10 as a first embodiment. The omnidirectional stereoscopic picture display 10 illustrated in FIG. 1 configures an example of an integral imaging-based stereoscopic picture display, and includes a two-dimensional light-emitting element array 101, a rotation section 104 with a slit and a mounting base 105 with a drive mechanism. The omnidirectional stereoscopic picture display 10 picks up images of a subject from all directions or reproduces a stereoscopic picture of an entire circumference of the subject based on two-dimensional picture information or the like (hereinafter simply referred to as picture data Din) for stereoscopic picture display formed by a computer.

The rotation section 104 is configured to include an exterior body 41 with a slit and a turntable 42 with an inlet. The exterior body 41 is mounted on the turntable 42. The turntable 42 has a disk shape, and a rotation shaft 103 is arranged at a central position of the turntable 42. The rotation shaft 103 is set as a rotation center of the turntable 42 as well as a rotation center of the exterior body 41; therefore, hereinafter the rotation shaft 103 may be referred to as the rotation shaft 103 of the rotation section 104. An inlet 106 is arranged in a predetermined position of the turntable 42 to take air into the exterior body 41.

One or more two-dimensional light-emitting element arrays 101 with a predetermined shape are arranged inside the exterior body 41 on the turntable 42. The two-dimensional light-emitting element array 101 is configured of, for example, a number m×n of light-emitting elements arranged in a matrix with n rows and m columns. As the light-emitting elements, self-luminance elements such as light-emitting diodes, laser diodes or organic EL elements are used. In the two-dimensional light-emitting element array 101, a plurality of light-emitting elements emit light in accordance with rotation of the rotation section 104, and light-emission control is performed based on the picture data Din for stereoscopic picture display. The light-emission control is performed by a display control section 15 (refer to FIG. 18) which will be described later.

Needless to say, the light-emitting elements are not limited to the self-luminance elements, and may be light-emitting devices each configured of a combination of a light source and a modulating element. Light-emitting elements or light-emitting devices of any kind may be used as long as the light-emitting elements are allowed to follow the modulation speed of the rotation section 104 during slit rotational scanning with respect to a viewpoint p (refer to FIG. 3). In the two-dimensional light-emitting element array 101, in addition to the light-emitting elements, a drive circuit (a driver) for driving the light-emitting elements is mounted.

The two-dimensional light-emitting element array 101 has a laminate configuration formed by laminating, along the rotation shaft 103, a plurality of one-dimensional light-emitting element substrates #1 (refer to FIGS. 5 to 7) in which a plurality of light-emitting elements are arranged (mounted), in a curved line, on, for example, a cut end surface formed by cutting a printed wiring board along a curve (an arc). When the two-dimensional light-emitting element array 101 is configured in such a manner, the two-dimensional light-emitting element array 101 with a curved (for example, arc-shaped) light-emission surface is allowed to be configured easily.

The exterior body 41 mounted to cover the two-dimensional light-emitting element array 101 on the turntable 42 therewith has a cylindrical shape with a predetermined diameter φ and a predetermined height H. The diameter φ of the exterior body 41 is approximately 100 nm to 200 nm, and the height H thereof is approximately 400 nm to 500 nm. A slit 102 is arranged in a predetermined position in a circumferential surface of the exterior body 41. The slit 102 is punched in a direction parallel to the rotation shaft 103 in the circumferential surface of the exterior body 41, and is fixed in front of the light-emission surface of the two-dimensional light-emitting element array 101 to limit a light emission angle within a predetermined range.

Needless to say, the slit 102 is not limited to an aperture section, and may be a window section configured of a transparent member allowing light to pass therethrough. In this example, a light-emitting unit Ui (i=1, 2, 3, ... ) is configured of one set of the slit 102 in the circumferential surface of the exterior body 41 and the two-dimensional light-emitting element array 101 arranged inside the slit 102.

The above-described two-dimensional light-emitting element array 101 has a curved portion with a concave surface which is formed as a light-emission surface. Then, the light-emission surface of the curved portion is arranged between the rotation shaft 103 of the rotation section 104 and the slit 102 so as to face the slit 102. In such a configuration, light emitted from the light-emission surface of the curved portion is easily guided (condensed) onto the slit 102, compared to a planar light-emission surface. As the exterior body 41, a cylindrical body formed by performing a pressing process, a rolling process or the like on an iron plate or an aluminum plate is used. An inner surface and an outer surface of the exterior body 41 are preferably coated with black so as to absorb light. Note that an aperture section above the slit 102 in the exterior body 41 is a hole section 108 for sensor.

A top portion of the exterior body 41 has a fan configuration, and exhausts, to outside, air for cooling taken from the inlet 106 of the turntable 42. For example, a small fan section 107 (an outlet) configured of a blade as an example of a cooling blade member is arranged in the top portion (upper portion) of the exterior body 41 to make an air flow with use of a rotation operation, thereby forcefully exhausting heat generated from the two-dimensional light-emitting element array 101 or a drive circuit thereof. The fan section 107 may double as the top portion by cutting an upper portion of the exterior body 41. When the fan section 107 doubles as the top portion, the exterior body 41 is firmly configured.

The fan section 107 is not exclusively arranged to an upper portion of the rotation shaft 103 of the rotation section 104, and may be arranged around the rotation shaft 103 in a lower portion of the exterior body 41. Depending on the direction of a blade of a blade member, when the rotation section 104 rotates, an air flow from the upper portion to the lower portion in the rotation section 104, or an air flow from the lower portion to the upper portion in the rotation section 104 is allowed to be made. In both cases, an air inlet or an air outlet may be arranged in the upper portion or the lower portion of the rotation section 104.

The blade member is arranged in the rotating shift 103 in such a manner, an air flow is allowed to be made with use of the rotate operation of the rotation section 104. Therefore, heat generated from the two-dimensional light-emitting element array 101 is allowed to be exhausted to outside without additionally arranging a fan motor. As the fan motor is thereby not necessary, a reduction in cost of the omnidirectional stereoscopic picture display 60 is achievable.

The mounting base 105 is a portion rotationally supporting the turntable 42. A bearing section (not illustrated) is arranged in an upper portion of the mounting base 105. The bearing section is rotationally engaged with the rotation shaft 103 and supports the rotation section 104. A motor 52 is arranged inside the mounting base 105, and allows the turntable 42 to rotate at a predetermined rotation (modulation) speed. For example, a direct-coupling system AC motor or the like is engaged with a lower end of the rotation shaft 103. The motor 52 directly transmits torque to the rotation shaft 103 to rotate the rotation shaft 103, thereby allowing the rotation section 104 to rotate at a predetermined modulation speed.

The motor 52 corresponds to a specific example of "a drive section" in the invention.

In this example, in the case where power or the picture data Din is transmitted to the rotation section 104, a method of transmitting it through a slip ring 51 is applied. In this method, the slip ring 51 for transmitting power and the picture data Din is arranged on the rotation shaft 103. The slip ring 51 is separated into a fixed portion and a rotating portion. The rotating portion is mounted on the rotation shaft 103. A harness 53 (a wiring cable) is connected to the fixed portion.

The two-dimensional light-emitting element array 101 is connected to the rotating portion through another harness 54. A slider (not illustrated) between the fixed portion and the rotating portion is configured to make electrical contact with a ring body. The slider configures the fixed portion or the rotating portion, and the ring body configures the rotating portion or the fixed portion. By this configuration, in the mounting base 105, power supplied from outside or the picture data Din is allowed to be transmitted to the two-dimensional light-emitting element array 101 through the slip ring 51.

[Assembly Example of Omnidirectional Stereoscopic Picture Display 10]

Figure 2:
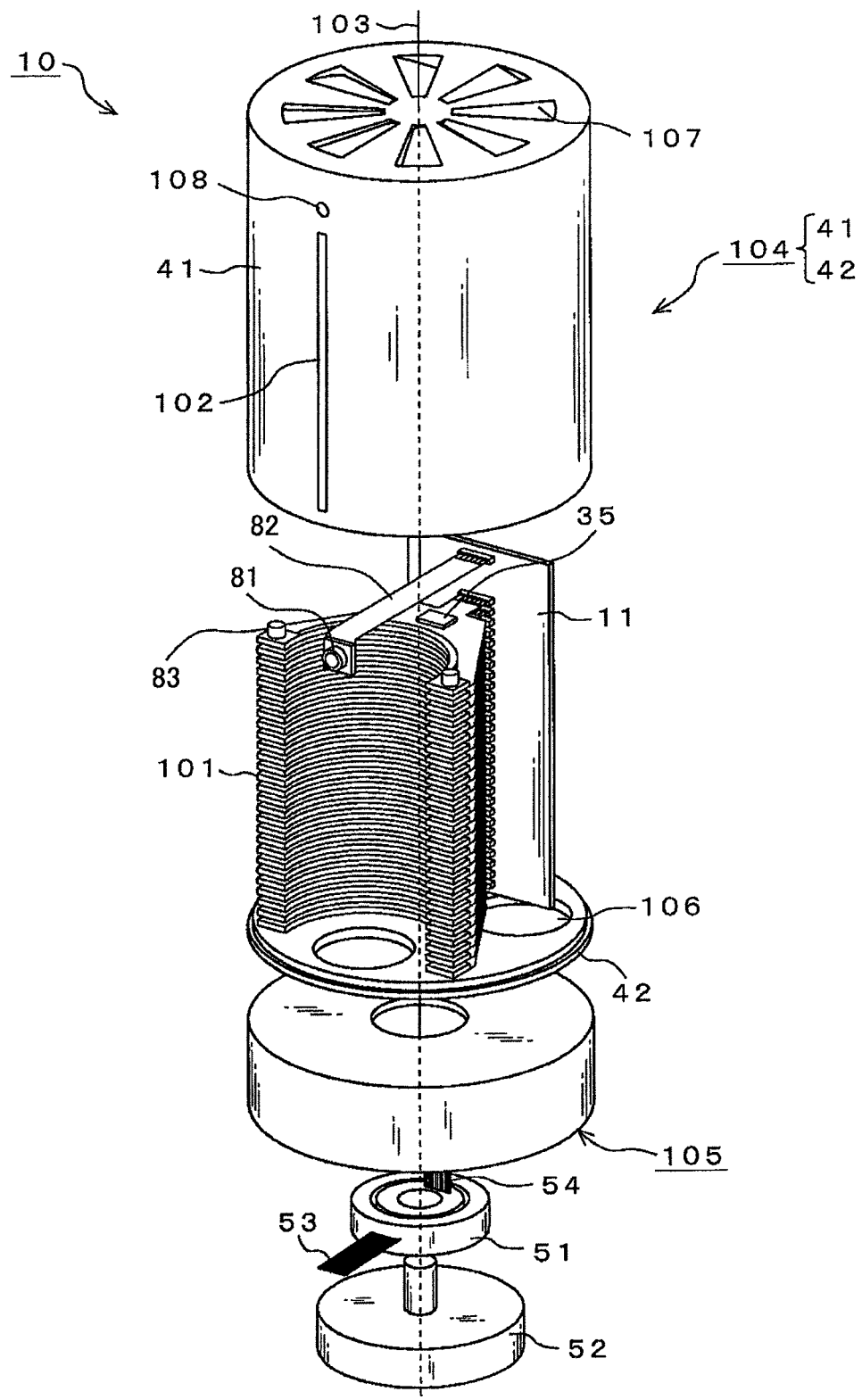
FIG. 2 is an exploded perspective view illustrating an assembly example of the omnidirectional stereoscopic picture display 10.

Next, referring to FIGS. 2 to 8, a method of assembling the omnidirectional stereoscopic picture display 10 and a method of manufacturing each member will be described below. FIG. 2 is an exploded perspective view illustrating an assembly example of the omnidirectional stereoscopic picture display 10. In the method of assembling the omnidirectional stereoscopic picture display 10, first, the exterior body 41 with a slit and the turntable 42 with an inlet as illustrated in FIG. 2 are prepared to form the rotation section 104. For example, a tube workpiece with a predetermined diameter is cut to a predetermined length to form the cylindrical exterior body 41 with a predetermined diameter and a predetermined length. In this example, a cylindrical body made of an iron plate or an aluminum plate is used as the exterior body 41.

After that, the slit 102 and the hole section 108 for sensor are formed in predetermined positions of the circumferential surface of the exterior body 41. In this example, the slit 102 is punched in a direction parallel to the rotation shaft 103 in a circumferential surface of the tube workpiece. The hole section 108 is formed above the slit 102. The exterior body 41 is mounted on the turntable 42 to be used. The inner surface and the outer surface of the exterior body 41 may be coated with black so as to absorb light.

Next, the turntable 42 is formed with use of a disk-shaped metal workpiece with a predetermined thickness. The rotation shaft 103 is formed in a central position of the turntable 42. The rotation shaft 103 is a rotation center of the turntable 42 as well as a rotation center of the exterior body 41. In this example, a pair of stick-shaped members (hereinafter referred to as dowel pins 83) for positioning (not illustrated) are formed so as to be projected on the turntable 42. The dowel pins 83 are used when the one-dimensional light-emitting element substrate #1 and the like are laminated.

Moreover, the slip ring 51 is arranged on the above-described rotation shaft 103 to draw the harness 54 from the rotating portion of the slip ring 51. The inlet 106 is formed in a predetermined position of the turntable 42. The inlet 106 is an air inlet for taking air into the exterior body 41. The turntable 42 may be coated with black so as to absorb light.

Figure 3:
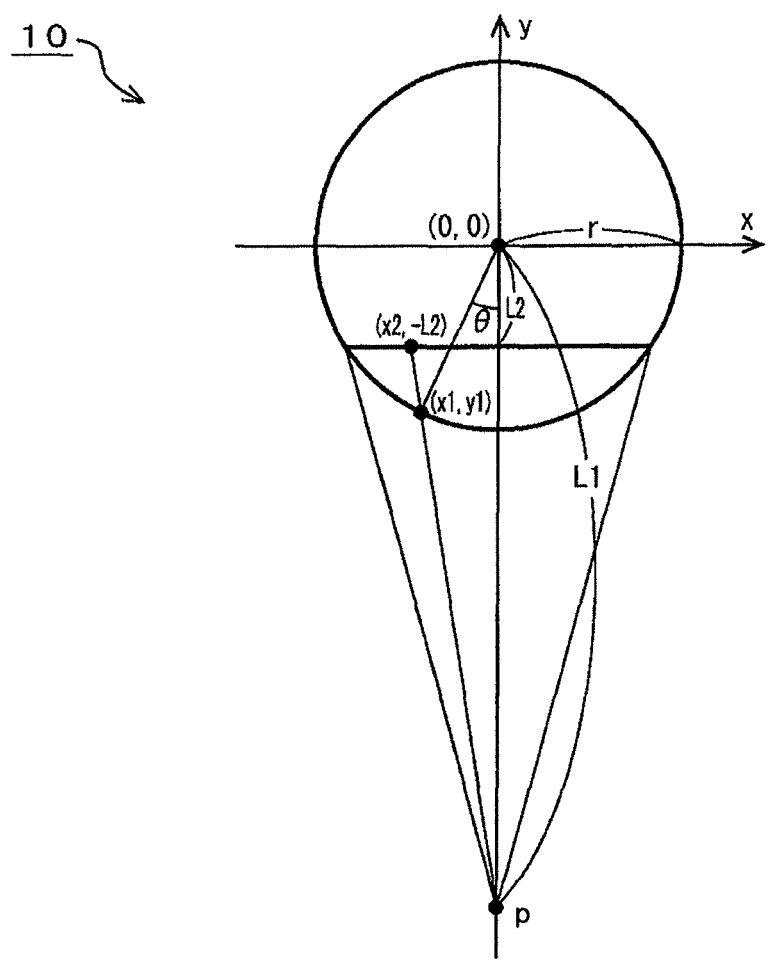
FIG. 3 is an illustration of a shape calculation example (No. 1) of a light-emitting surface of a two-dimensional light-emitting element array 101.

On the other hand, the two-dimensional light-emitting element array 101 having a predetermined shape for forming a stereoscopic picture is formed. In this example, the two-dimensional light-emitting element array 101 is formed so as to have a curved light-emission surface. FIG. 3 is an illustration of a shape calculation example (No. 1) of the light-emission surface of the two-dimensional light-emitting element array 101.

In this example, in an x-y coordinate plane (a plane orthogonal to the rotation shaft 103) illustrated in FIG. 3, the shape of the light-emission surface of the two-dimensional light-emitting element array 101 is a curve drawn by a point $(x(\theta), y(\theta))$ represented by the following expression. In the case where the two-dimensional light-emitting element array 101 is formed, L1 is a distance of a line segment from the rotation shaft 103 of the rotation section 104 to an arbitrary viewpoint p L2 is a minimum distance from the rotation shaft 104 to the two-dimensional light-emitting element array 101. Note that in the omnidirectional stereoscopic picture display 10, when the omnidirectional stereoscopic picture display 10 is observed from the arbitrary viewpoint p, picture display is performed so that a trail of light-emitting points by the two-dimensional light-emitting element array 101, that is, an observed picture display plane is, for example, a flat plane. In this case, L2 is equal to a distance from the rotation shaft 103 to a flat plane formed by the trail of the light-emitting points by a plurality of light-emitting elements.

Moreover, r is a distance of a line segment from the rotation shaft 103 of the rotation section 104 to the slit 102, and $\theta$ is an angle formed between the line segment with length L1 and the line segment with the length r, and represents the position of the slit 102 with respect to the line segment with the length L1. Then, $x(\theta)$ is an x-axis coordinate value forming a curved shape of the light-emission surface of the two-dimensional light-emitting element array 101, and $y(\theta)$ is a y-axis coordinate value forming the curved shape of the light-emission surface of the two-dimensional light-emitting element array 101. The x-axis coordinate value $x(\theta)$ is represented by an expression (1):

$$x(\theta)=r(L2-L1)\sin\theta\cos\theta/(L1-r\cos\theta)+L2\sin\theta \quad (1)$$

The y-axis coordinate value $y(\theta)$ is represented by an expression (2):

$$y(\theta)=r(L2-L1)\sin^2\theta/(L1-r\cos\theta)-L2\cos\theta \quad (2)$$

The shape of the light-emission surface of the two-dimensional light-emitting element array 101 is determined by the x-axis coordinate value $x(\theta)$ and the y-axis coordinate value $y(\theta)$. However, in the drawing, (x1, y1) indicates coordinates of the slit 102. Further, (x2, −L2) indicates coordinates of a light-emitting point actually observed from the viewpoint p through the slit 102.

Therefore, the trail of the light-emitting points observed from the viewpoint p through the slit 102 is allowed to determine the shape of the light-emission surface of the two-dimensional light-emitting element array 101 so that the light-emission surface looks flat. When the shape of the light-emission surface is determined, the light-emission surface may be formed by cutting a printed wiring board to form a curved surface.

Figure 4:
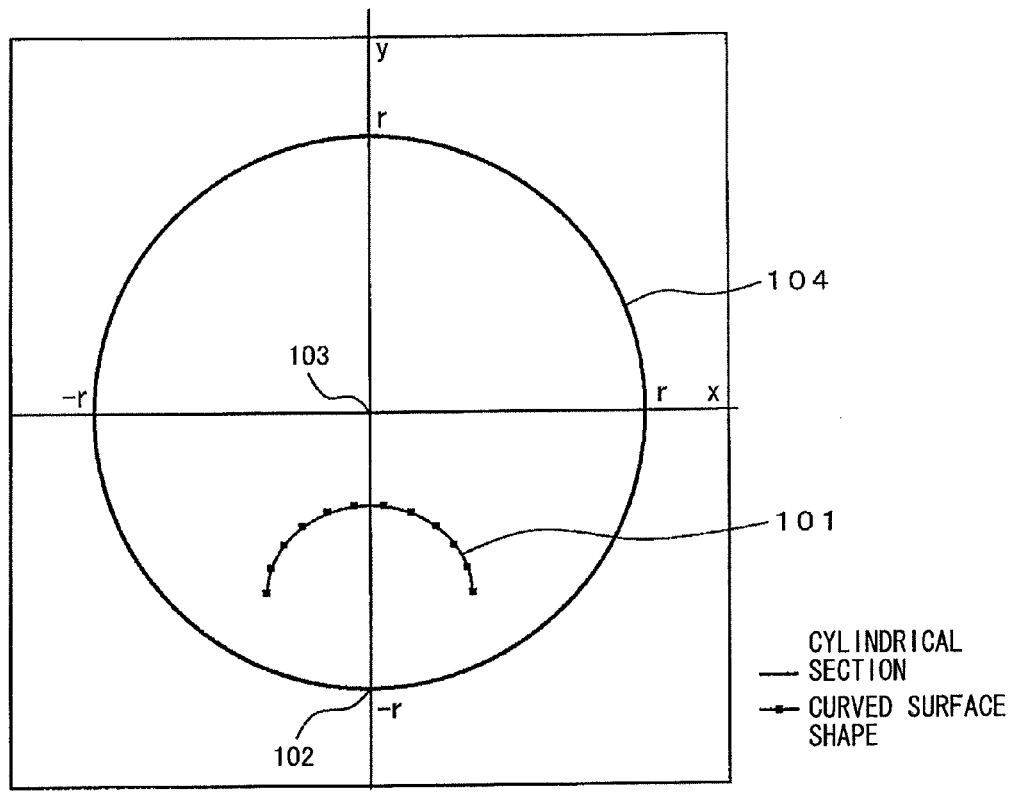
FIG. 4 is an illustration of a shape calculation example (No. 2) of the light-emitting surface of the two-dimensional light-emitting element array 101.

FIG. 4 is an illustration of a shape calculation example of the light-emission surface of the two-dimensional light-emitting element array 101 determined by the above-described expressions (1) and (2). In the shape calculation example of the light-emission surface illustrated in FIG. 4, the length L1 illustrated in FIG. 3 of the line segment from the rotation shaft 103 of the rotating section 104 to the arbitrary viewpoint p is 90 mm. The distance L2 from the rotation shaft 103 of the rotation section 104 to a virtual straight line is 10 mm. The length r of the line segment from the rotation shaft 103 of the rotation section 104 to the slit 102 is 30 mm. A case where the angle $\theta$ formed by the line segment with the length L1 and the line segment with the length r and representing the position of the slit 102 with respect to the line segment with the length L1 is $-33° \leq \theta \leq 33°$ is illustrated.

Figure 5:
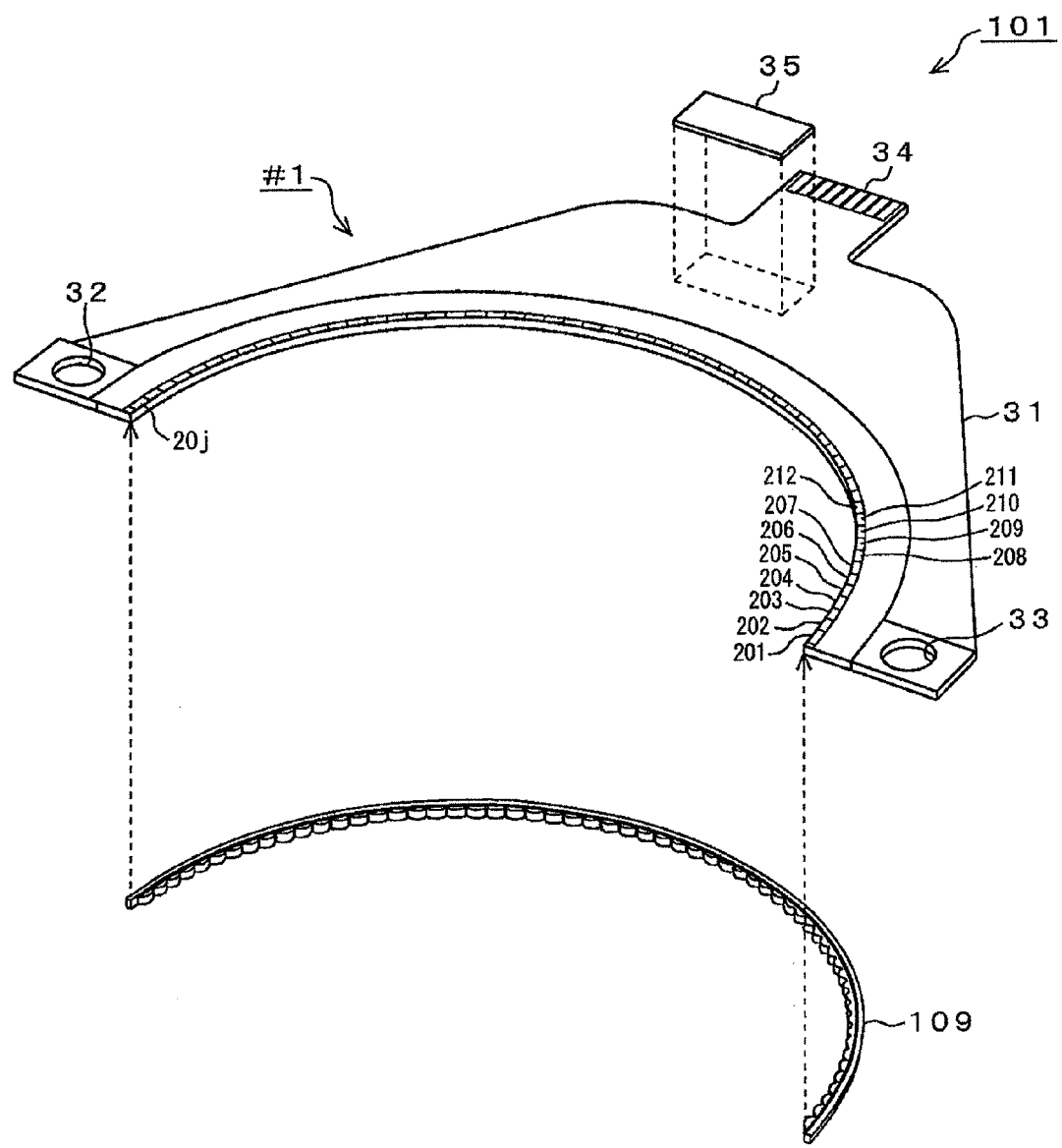
FIG. 5 is a perspective view illustrating a shape example (No. 1) of the two-dimensional light-emitting element array 101.
Figure 6:
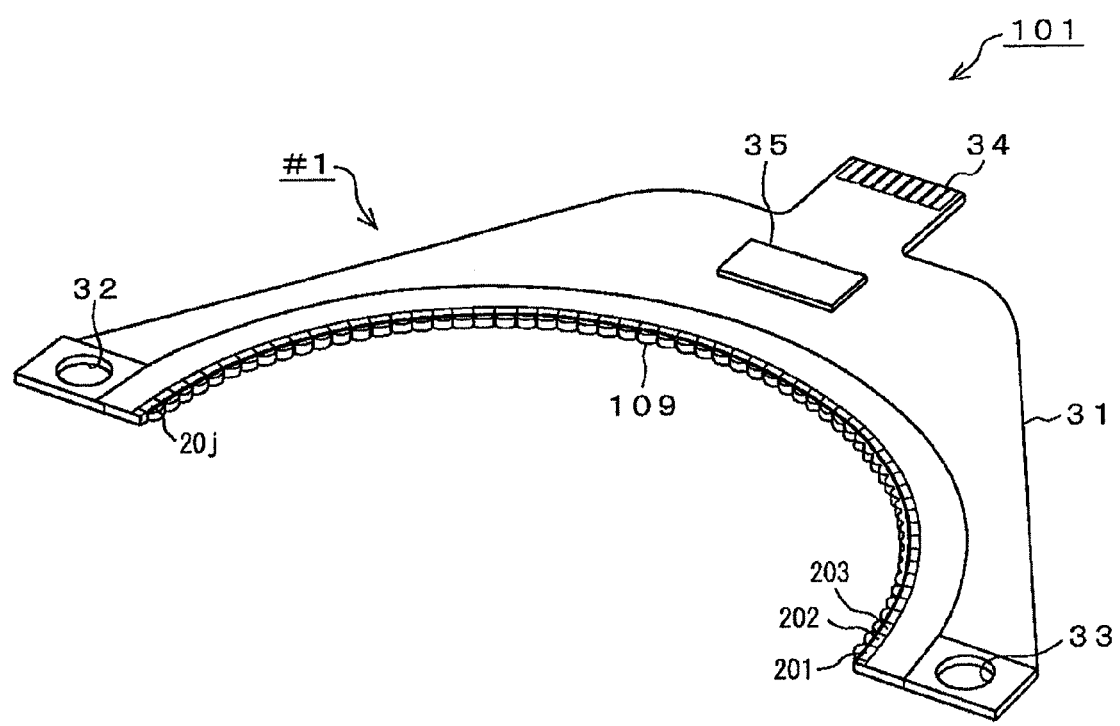
FIG. 6 is a perspective view illustrating a shape example (No. 2) of the two-dimensional light-emitting element array 101.
Figure 7:
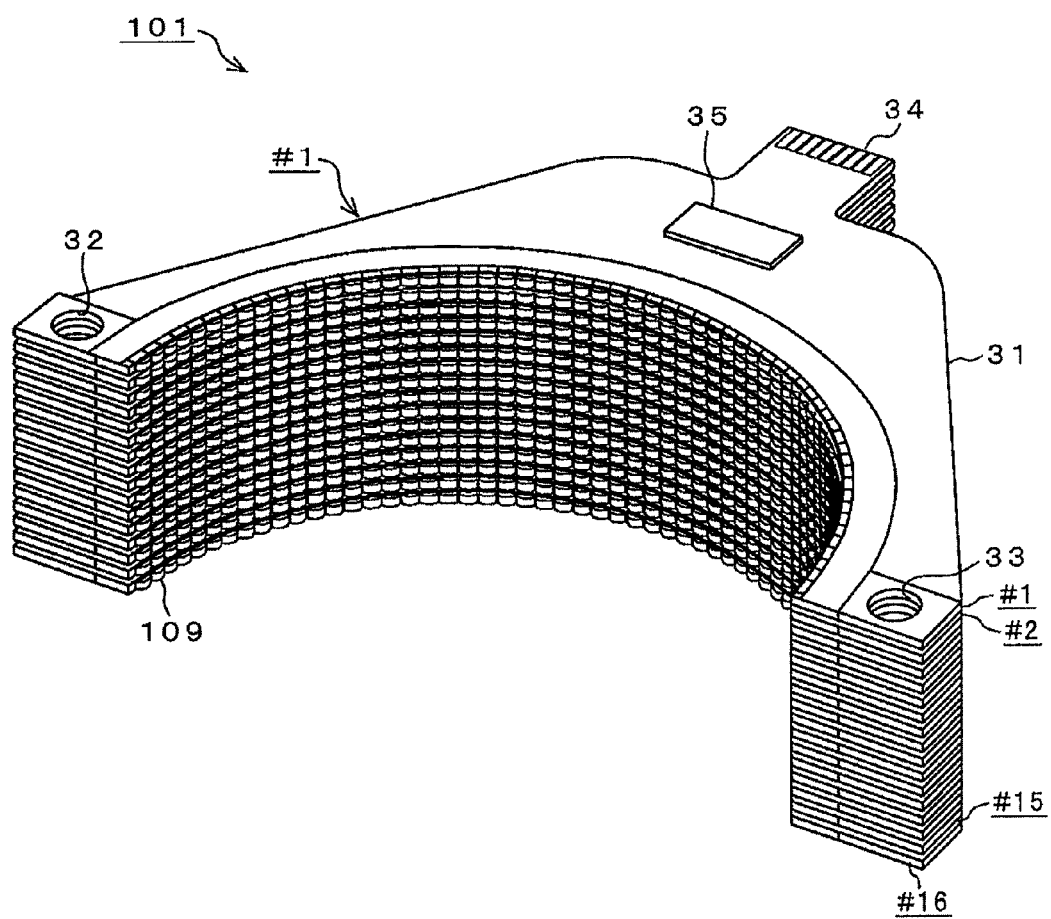
FIG. 7 is a perspective view illustrating a shape example (No. 3) of the two-dimensional light-emitting element array 101.

FIGS. 5 to 7 are perspective views illustrating formation examples (Nos. 1 to 3) of the two-dimensional light-emitting element array 101. FIG. 5 is an exploded perspective view illustrating a formation example of the one-dimensional light-emitting element substrate #1. In this example, when the two-dimensional light-emitting element array 101 is formed, first, the one-dimensional light-emitting element substrate #1 is formed. The one-dimensional light-emitting element substrate #1 is formed by patterning a copper foil substrate (not illustrated) to form a wiring pattern and cutting a printed wiring board 31 on which the wiring pattern is formed to have a Y-shaped outline and cutting an inner surface of the printed wiring board 31 into a curved shape (for example, an arc shape) based on the above-described expressions (1) and (2). In this example, a connector 34 with a wiring configuration is formed on a side opposite to a curved part.

Moreover, hole sections 32 and 33 for positioning are formed on both sides of the printed wiring board 31 of a one-dimensional light-emitting element substrate #k. An IC 35 (a semiconductor integrated circuit device) for serial-parallel conversion and driver is mounted on the printed wiring board 31 having a Y-shaped outline and a curved inner surface. Next, a number j (rows) of light-emitting element 20j are arranged, in a curved line, on a curved edge section or a curved cut end surface of the printed wiring board 31 on which the IC 35 is mounted. Further, a linear lens member 109 is arranged in front of the light-emitting elements 20j to form the one-dimensional light-emitting element substrate #1 (a substrate) (refer to FIG. 6).

FIG. 6 is a perspective view illustrating a configuration example of the one-dimensional light-emitting element substrate #1. In this example, the number n of the one-dimensional light-emitting element substrates #1 as illustrated in FIG. 6 are prepared. It is because the number n of the one-dimensional light-emitting element substrates #1 are laminated to form the two-dimensional light-emitting element array 101 in a matrix with m rows and n columns.

Note that as the two-dimensional light-emitting element array 101 with a curved surface, an array manufactured by bending a flexible flat panel display into the shape of a letter U so as to have a curved light-emission surface or a flat panel display having a curved surface in advance may be used. It is difficult to use a flat panel display with a typical configuration as it is for the two-dimensional light-emitting element array 101 of the invention. In addition, in a general-purpose flat panel display, a dynamic lighting system in which wiring lines are arranged in a matrix, and light-emitting elements are sequentially scanned by m rows or n columns to emit light is applied.

Therefore, it takes time to update pictures, and an updating rate is approximately 240 to 1000 Hz at a maximum. Therefore, it is necessary to update pictures at a sufficiently faster rate than 1000 Hz. In this example, a method of speeding up drive circuits of the light-emitting element 20j with use of the light-emitting element 20j responding at high speed, or a method of reducing the number of scanning lines in dynamic lighting by increasing the number of simultaneously driven light-emitting elements 20j is devised.

To largely increase the number of simultaneously driven light-emitting elements 20j, a wiring pattern in a matrix form may be finely divided into a given number, and a number, equal to the number of divided wiring patterns, of small matrices may be separately driven, or static lighting in which all light-emitting elements 20j are simultaneously driven may be performed.

FIG. 7 is a perspective view illustrating a laminate example of a number k of one-dimensional light-emitting element substrates #k (k=1 to n). In this example, a necessary number of one-dimensional light-emitting element substrates #k are laminated to manufacture the two-dimensional light-emitting element array 101 with a curved surface on which a number j (rows) of the light-emitting elements 20j are arranged in a curved line.

In the two-dimensional light-emitting element array 101 with a laminate configuration illustrated in FIG. 7, first, the one-dimensional light-emitting element substrates #k are laminated so as to align the hole sections 32 and 33 for positioning of the printed wiring boards thereof. Such a laminate configuration allows the two-dimensional light-emitting element array 101 to be easily slid onto the stick-shaped dowel pins 83 projected on the turntable 42. As a result, a number k of one dimensional light-emitting element substrates #1 to #k are allowed to be laminated in a self-aligned manner. The two-dimensional light-emitting element array 101 with a curved light-emission surface is easily manufacturable through such formation order.

In this example, the picture data Din is transmitted to the one-dimensional light-emitting element substrates #k in parallel from the beginning, the number of wiring patterns are largely increased. Therefore, as the IC 35, in addition to an IC (a drive circuit) for driver driving the light-emitting elements 20j, an IC (an ASIC circuit) for serial-parallel conversion is mounted in the one-dimensional light-emitting element substrates #k. The IC for serial-parallel conversion operates to convert serially transmitted picture data Din into parallel data.

When the one-dimensional light-emitting element substrates #k are laminated and an information transmitting method is devised in such a manner, the picture data Din is allowed to be transmitted to close proximity of the light-emitting elements 20j through serial wiring patterns. As a result, compared to the case where the picture data Din is transmitted in parallel to the one-dimensional light-emitting element substrates #k, the number of wiring patterns is allowed to be largely reduced. Moreover, the two-dimensional light-emitting element array 101 with high assemblability and ease of maintenance is allowed to be formed with high yield. Therefore, the two-dimensional light-emitting element array 101 having a curved light-emission surface is manufacturable.

When the two-dimensional light-emitting element array 101 as illustrated in FIGS. 3 to 7 is prepared, the two-dimensional light-emitting element array 101 is mounted in a predetermined position of the rotation section 104 illustrated in FIG. 2, in this example, on the turntable 42. At this time, when hole sections of the printed wiring boards of the number k of one-dimensional light-emitting element substrates #k are slid onto the stick-shaped dowel pins 83 projected on the turntable 42, the one-dimensional light-emitting element substrates #k are in a self-aligned state. The number k of one-dimensional light-emitting element substrates #1 to #n are laminated and mounted along the rotation shaft 103 so as to maintain this state.

In this example, a connection substrate 11 mounted on a predetermined substrate is installed upright on the turntable 42. A connector with a plug-in configuration for connecting to connectors of wiring configurations of the one-dimensional light-emitting element substrates #1 to #n is arranged in the connection substrate 11. The connector with the plug-in configuration of the above-described connection substrate 11 is engaged with the connectors of the wiring configurations of the one-dimensional light-emitting element substrates #1 to #n to connect the number k of the one-dimensional light-emitting element substrates #1 to #n to the connection substrate 11.

Moreover, the two-dimensional light-emitting element array 101 is arranged between the rotation shaft 103 of the rotation section 104 and the slit 102 of the exterior body 41 so that the curved light-emission surface (a concave surface side) faces the position of the slit 102. For example, the two-dimensional light-emitting element array 101 is mounted in a position where the rotation shaft 103 of the rotation section 104, a central portion of the two-dimensional light-emitting element array 101 and the slit 102 are aligned on one straight line. The two-dimensional light-emitting element array 101 is connected to the harness 54 from the rotating portion of the slip ring 51.

In this example, a viewer detection sensor 81 configuring an example of an observer detection section is mounted in a position allowed to see outside from the interior of the exterior body 41. The viewer detection sensor 81 is arranged on the above-described connection substrate 11 through an arm member 82. The viewer detection sensor 81 is arranged at an end of the arm member 82, and is used to detect a viewer who views a corresponding stereoscopic picture from the outside of the rotation section 104 rotated by the motor 52 and determine whether the stereoscopic picture is viewed or not. In the viewer detection sensor 81, a position sensitive detector (PSD) sensor, an ultrasonic sensor, an infrared sensor, a face-recognition camera or the like is used.

The viewer detection sensor 81 is desired to detect fine angular resolution capability throughout 360°. In this example, the viewer detection sensor 81 rotates with the rotation section 104 to detect a viewer; therefore, one viewer detection sensor 81 is allowed to perform detection throughout 360°, and a system with high angular resolution capability is allowed to be formed. As a result, the number of sensors are largely reduced, and a cost reduction is achievable while having high resolution capability.

In the case where a high-speed camera is applied to the viewer detection sensor 81, the camera is mounted on the rotation shaft 103 of the rotation section 104. When such a high-speed camera is arranged on the rotation shaft 103 of the rotating section 104 to perform a rotation operation, the presence or absence of an observer in all regions is detectable throughout 360°.

When the two-dimensional light-emitting element array 101 is arranged on the turntable 42, the exterior body 41 is arranged so as to cover the two-dimensional light-emitting element array 101 on the turntable 42 therewith. At this time, when the slit 102 is fixed in front of the light-emission surface of the two-dimensional light-emitting element array 101, a light emission angle is allowed to be limited within a predetermined range. Therefore, the slit 102 in the circumferential surface of the exterior body 41 and the two-dimensional light-emitting element array 101 inside the slit 102 are allowed to configure the light-emitting unit U1.

On the other hand, the mounting base 105 for rotationally supporting the turntable 42 is formed. In this example, the slip ring 51 is arranged in an upper portion of the mounting base 105, and a bearing section (not illustrated) is mounted. The bearing section is rotationally engaged with the rotation shaft 103, and supports the rotation section 104. In addition to the slip ring 51, the motor 52, a control section 55, an I/F substrate 56, a power supply section 57 and the like are mounted in the mounting base 105 (refer to FIG. 18). The motor 52 is directly connected to the rotation shaft 103.

The control section 55 and the power supply section 57 are connected to the fixed portion of the slip ring 51 through the harness 53. Therefore, in the mounting base 105, power supplied from outside or the picture data Din is allowed to be transmitted to the two-dimensional light-emitting element array 101 through the slip ring 51. When the mounting base 105 is prepared, the rotation section 104 on which the two-dimensional light-emitting element array 101 is mounted is mounted on the mounting base 105. Therefore, the omnidirectional stereoscopic picture display 10 is completed.

[Function Example of Lens Member 109 in Two-Dimensional Light-Emitting Element Array 101]

Figure 8:
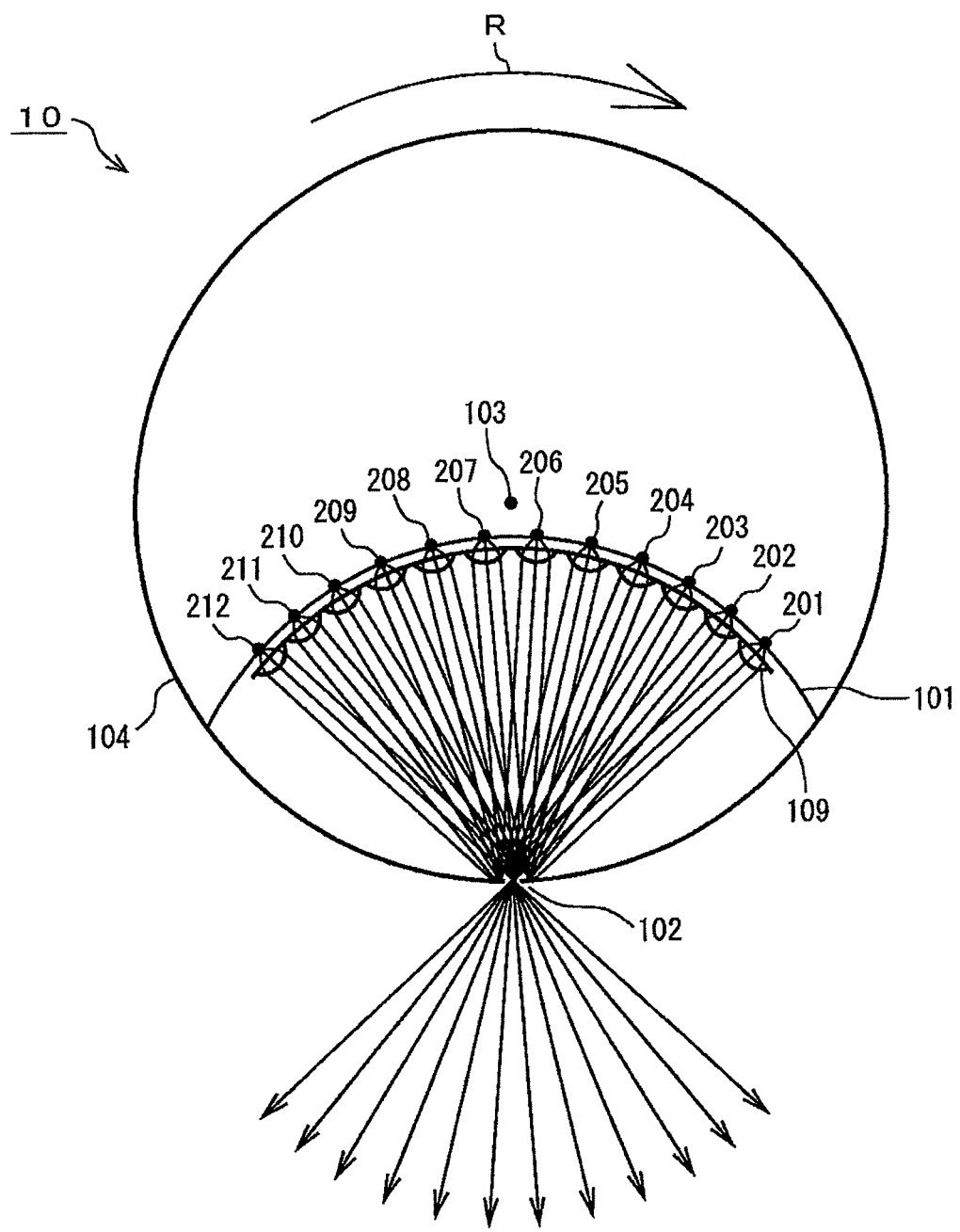
FIG. 8 is a schematic view illustrating a function example of a lens member in the two-dimensional light-emitting element array 101 as seen from a rotation shaft direction.

FIG. 8 is a schematic view illustrating a function example of a lens member 109 in the two-dimensional light-emitting element array 101 as seen from a rotation shaft direction. In this example, the two-dimensional light-emitting element array 101 illustrated in FIG. 8 is configured by laminating a plurality of one-dimensional light-emitting element substrates #1. For the sake of convenience, for example, a number m=12 of light-emitting elements 20j (j=1 to m) are arranged in a first column. In the examples illustrated in FIGS. 5 to 7, the number m of the light-emitting elements is m=59.

Most of light emitted from light-emitting elements 201 to 212 is scattered in the exterior body 41 without reaching around the slit 102 to be converted into heat. Therefore, in the two-dimensional light-emitting element array 101, the lens member 109 with a predetermined shape is mounted on a light-emission surface of each of the light-emitting elements 201 to 212. In this example, the lens members 109 are arranged on respective light-emitting elements 20j; therefore, each of light fluxes diverged and emitted from the light-emitting elements 201 to 212 is a parallel light flux. Therefore, each of the light fluxes from the light-emitting elements 201 to 212 is allowed to be condensed around the slit 102.

In the lens member 109, a microlens or a selfoc lens is used. Needless to say, to reduce production cost, without arranging the lens members 109 on respective light-emitting elements 201 to 212, a sheet-shaped lens or a plate-shaped lens such as a microlens array or a selfoc lens array may be arranged on the two-dimensional light-emitting element array 101.

In the case where light is condensed only in a lateral direction, a lenticular lens may be used. When such lens members 109 are arranged, scattered light is minimized, and light is efficiently used, as well as it is advantageous to obtain luminance or contrast as the omnidirectional stereoscopic picture display 10, and an improvement in power efficiency is expected.

[Operation Principle of Omnidirectional Stereoscopic Picture Display 10]

Figure 9:
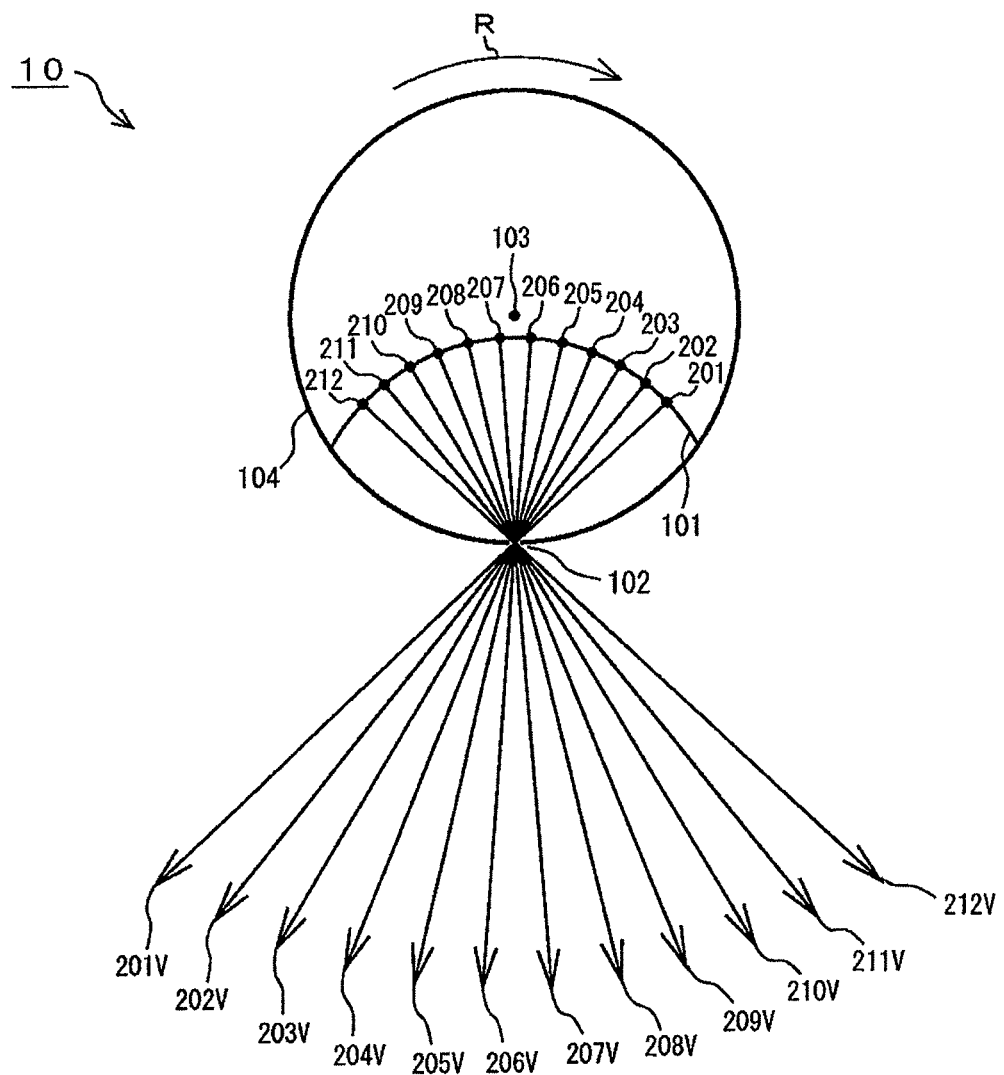
FIG. 9 is a schematic view illustrating an operation example of the omnidirectional stereoscopic picture display 10 as seen from the rotation shaft direction.

Next, referring to FIGS. 9 to 17, an operation principle of the omnidirectional stereoscopic picture display 10 will be described below. FIG. 9 is a schematic view illustrating an operation example of the omnidirectional stereoscopic picture display 10 as seen from the rotation shaft direction. The lens members 109 are not illustrated in the drawing.

The omnidirectional stereoscopic picture display 10 illustrated in FIG. 9 uses an integral imaging method, and has a configuration in which the rotation section 104 rotates around the rotation shaft 103 as a rotation center in a direction indicated by an arrow R (refer to FIG. 1) or a direction opposite thereto.

In the omnidirectional stereoscopic picture display 10, the slit 102 parallel to the rotation shaft 103 is arranged in the exterior body 41 in front of the light-emission surface of the two-dimensional light-emitting element array 101, and the omnidirectional stereoscopic picture display 10 has a configuration in which light emitted from the two-dimensional light-emitting element array 101 is not leaked from any part except for the slit part. By this slit configuration, the emission angle in a lateral direction with respect to the slit 102 of light emitted from each of the light-emitting elements 201 to 212 of the two-dimensional light-emitting element array 101 is largely limited.

In this example, the number m of the light-emitting elements 201 to 212 is m=12 (rows), but the number m may be any number. By 12 light-emitting elements 201 to 212, light of a stereoscopic picture formed with reference to the rotation shaft 103 is leaked from the interior of the rotation section 104 to outside through the slit 102. In this case, a direction where each of 12 light-emitting elements 201 to 212 and the slit 102 are connected to each other is represented by a vector.

A direction indicated by a line segment connecting the light-emitting element 201 and the slit 102 is a direction of light leaked from the light-emitting element 201 through the slit 102. Hereinafter this direction is referred to as "vector 201V direction". Hereinafter, likewise, a direction indicated by a line segment connecting the light-emitting element 202 and the slit 102 is a direction of light leaked from the light-emitting element 202 through the slit 102. This direction is referred to as "vector 202V direction". Likewise, a direction indicated by a line segment connecting the light-emitting element 212 and the slit 102 is a direction of light leaked from the light-emitting element 212 through the slit 102. The direction is referred to as "vector 212V direction".

For example, light emitted from the light-emitting element 201 passes through the slit 102 to be emitted in the vector 201V direction. Light emitted from the light-emitting element 202 passes through the slit 102 to be emitted in the vector 202V direction. Likewise, light emitted from the light-emitting elements 202 to 212 passes through the slit 102 to be emitted in vector 203V to 212V directions, respectively. Light from the light-emitting elements 201 to 212 is emitted in respective different directions in such a manner; therefore, integral imaging for one vertical line limited by the slit 102 is allowed.

When the rotation section 104 with such a slit configuration is subjected to rotational scanning with respect to the viewpoint p, a cylindrical integral imaging plane is allowed to be formed. Moreover, when the picture data Din from outside or the picture data Din from a storage device such as an ROM in the rotation section is reflected on the light-emitting unit U1 of the two-dimensional light-emitting element array 101 according to the angle of the rotational scanning with respect to the viewpoint p, arbitrary reproduced light rays are allowed to be emitted.

[Trail Example of Light-Emission Point]

Next, a trail example of light-emission points observed from the viewpoint p will be described below.

In the omnidirectional stereoscopic picture display 10, as described above, for example, a number m=12 of light-emitting elements are arranged in different positions on a plane orthogonal to the rotation shaft 103 in the two-dimensional light-emitting element array 101. The number m of light-emitting elements emit light for different viewpoint positions in accordance with rotation of the rotation section 104 toward outside through the slit 102. In this case, in a state where the rotation section 104 rotates, observation is made from one arbitrary viewpoint position around the rotation section 104 in a direction of the rotation shaft 103. At this time, the display control section 15 (refer to FIG. 18) which will be described later performs light-emission control of a plurality of light-emitting elements so that, for example, a planar picture according to the arbitrary viewpoint position is formed in the rotation section 104 by the trail of the light-emission points by the plurality of light-emitting elements. For example, planar pictures having slight parallax therebetween according to the viewpoint positions are observed from the viewpoint positions. Therefore, when observation is made from two arbitrary viewpoint positions corresponding to the positions of both eyes, for example, planar pictures having parallax therebetween according to the viewpoint positions are observed. Therefore, an observer is allowed to perceive a stereoscopic picture in an arbitrary position around the rotation section.

Figure 10:
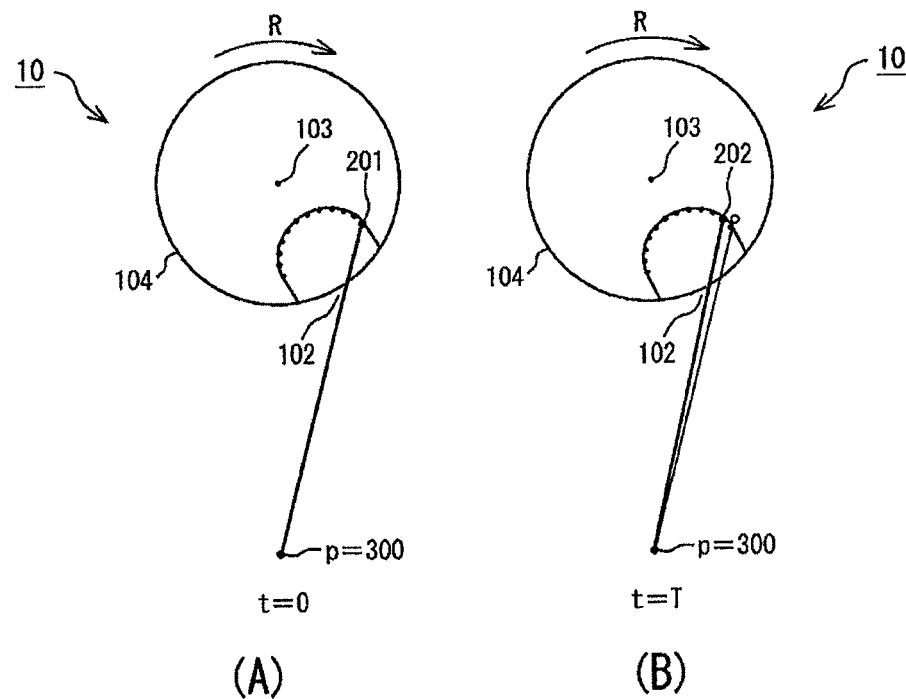
FIG. 10 is an illustration of a trail example (No. 1) of light-emission points observed from a viewpoint p.
Figure 10:
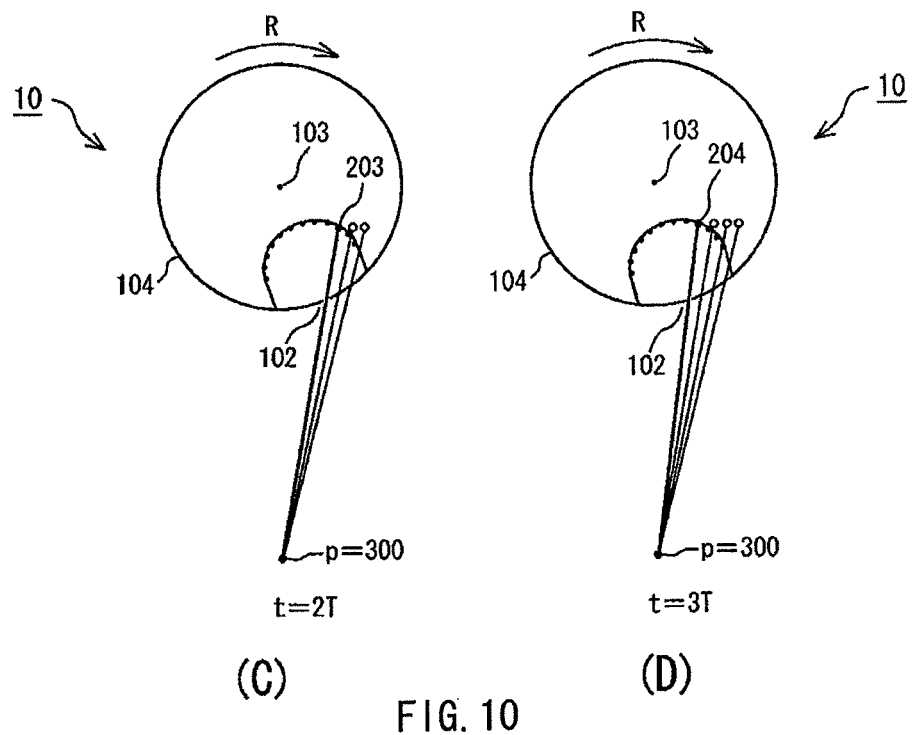
Figure 11:
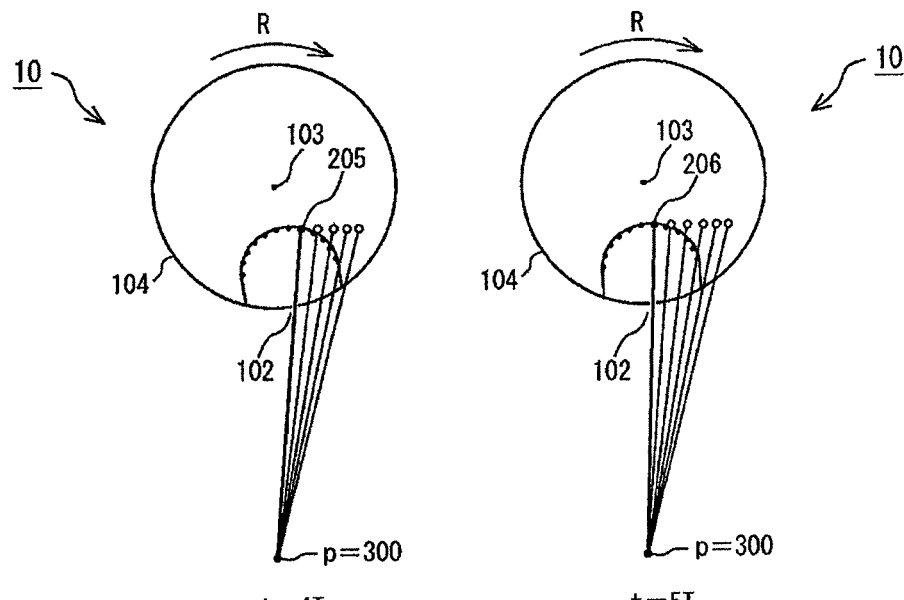
FIG. 11 is an illustration of a trail example (No. 2) of light-emission points observed from the viewpoint p.
Figure 11:
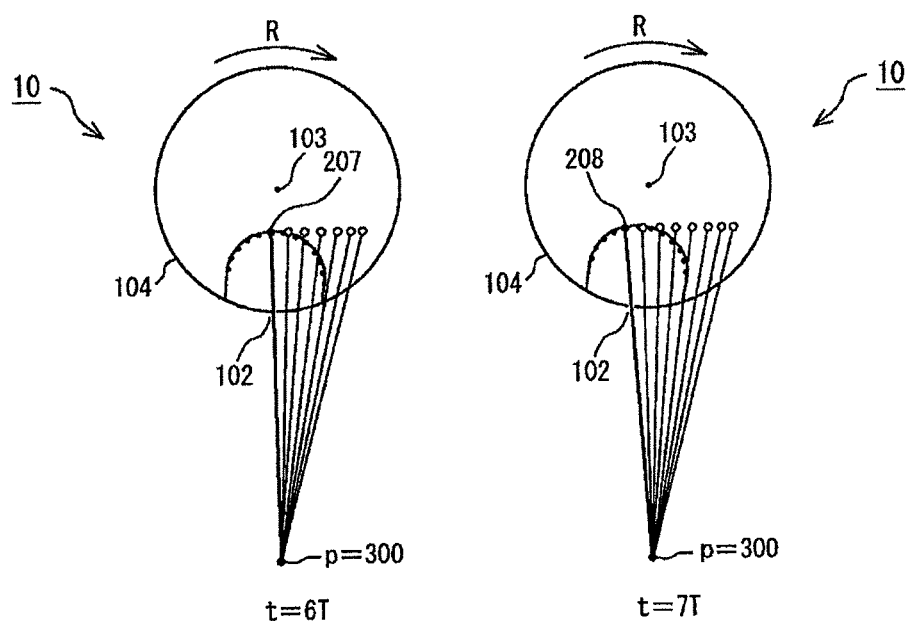
Figure 12:
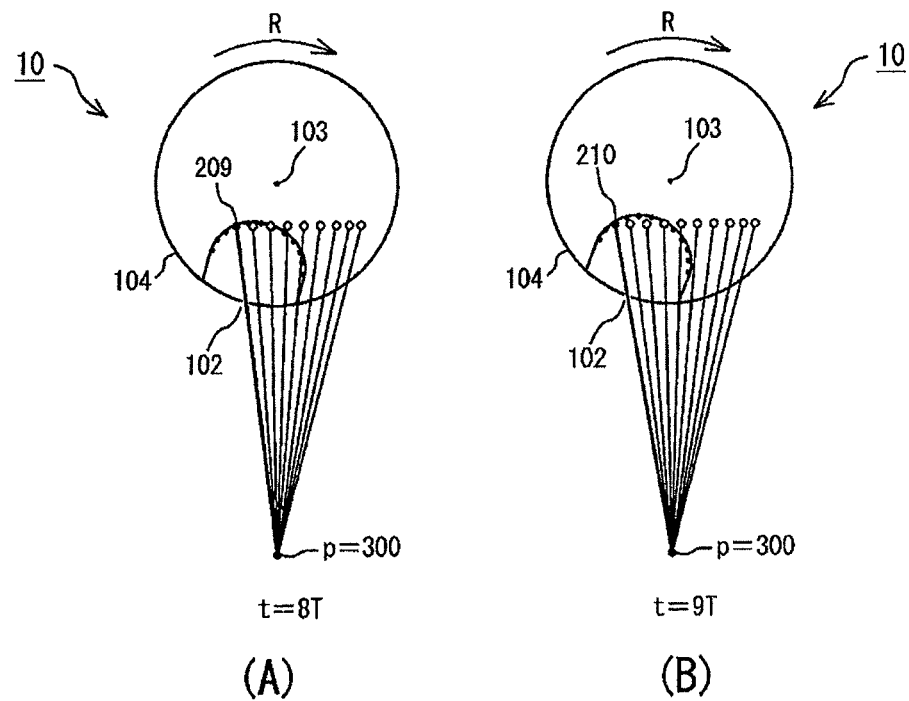
FIG. 12 is an illustration of a trail example (No. 3) of light-emission points observed from the viewpoint p.
Figure 12:
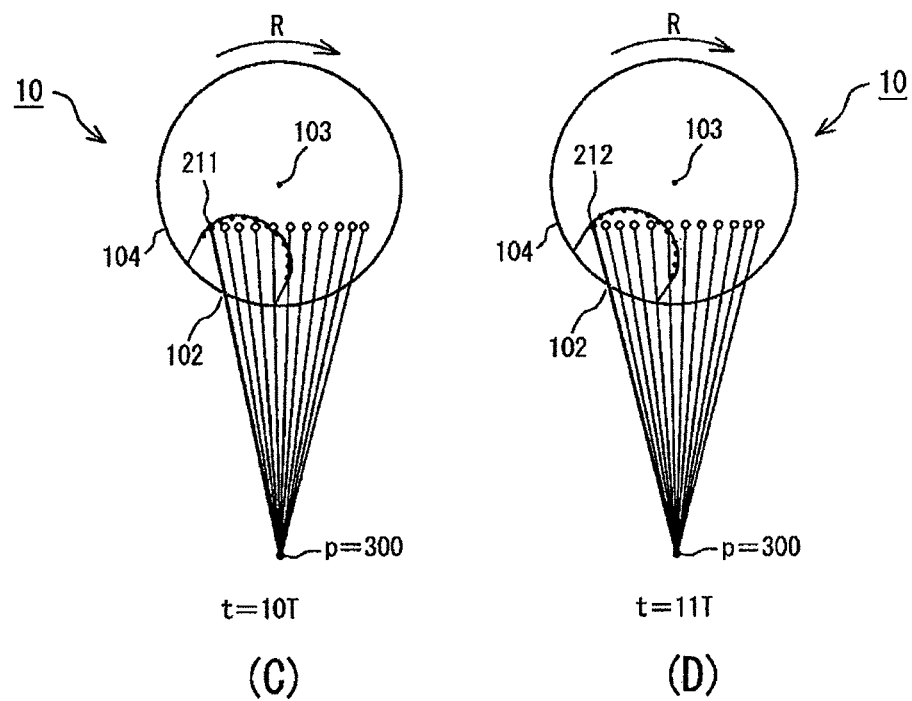
Figure 13:
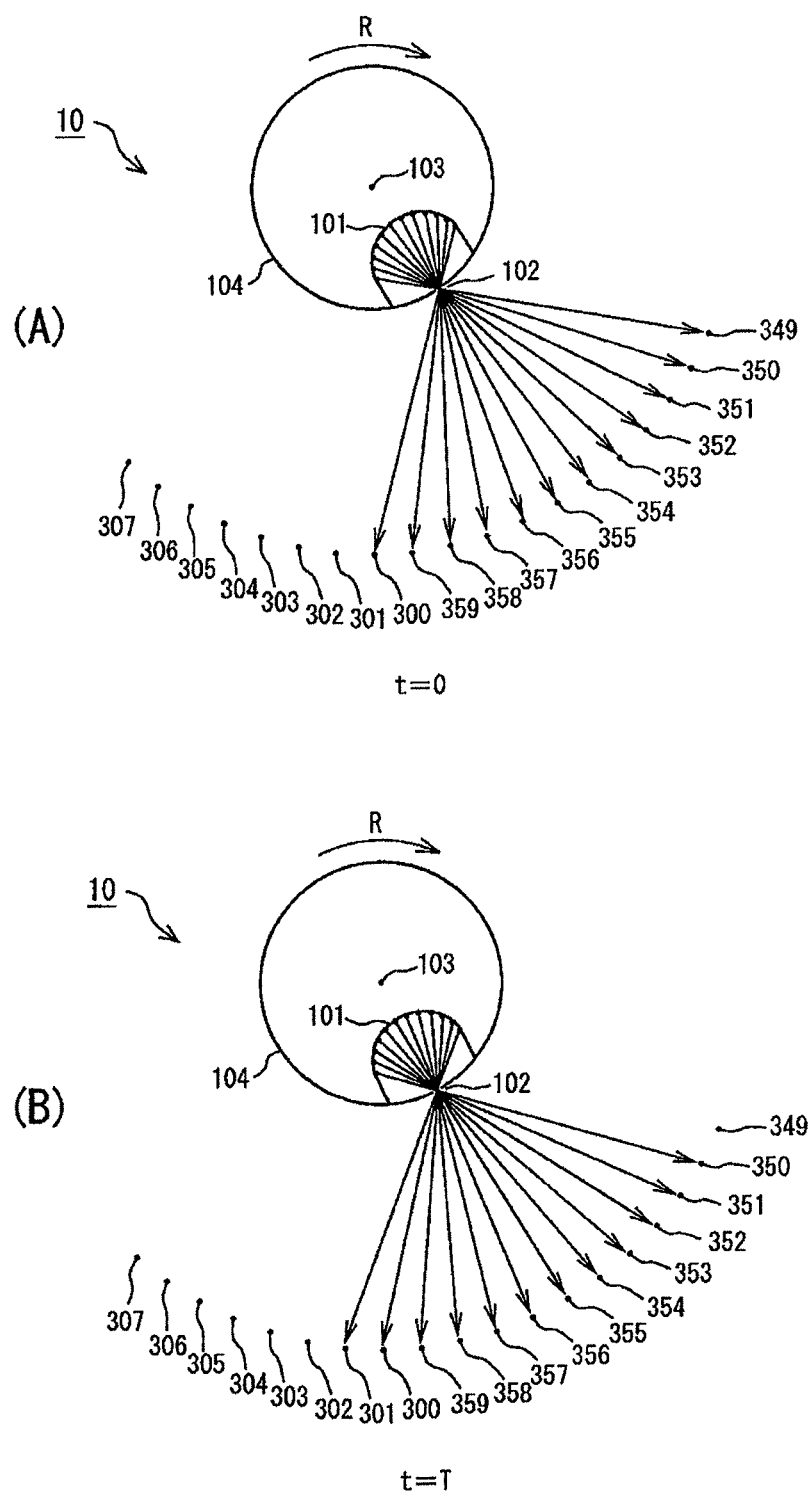
FIG. 13 is an illustration of a state (No. 1) where light rays are emitted to a plurality of viewpoints through a slit 102.
Figure 14:
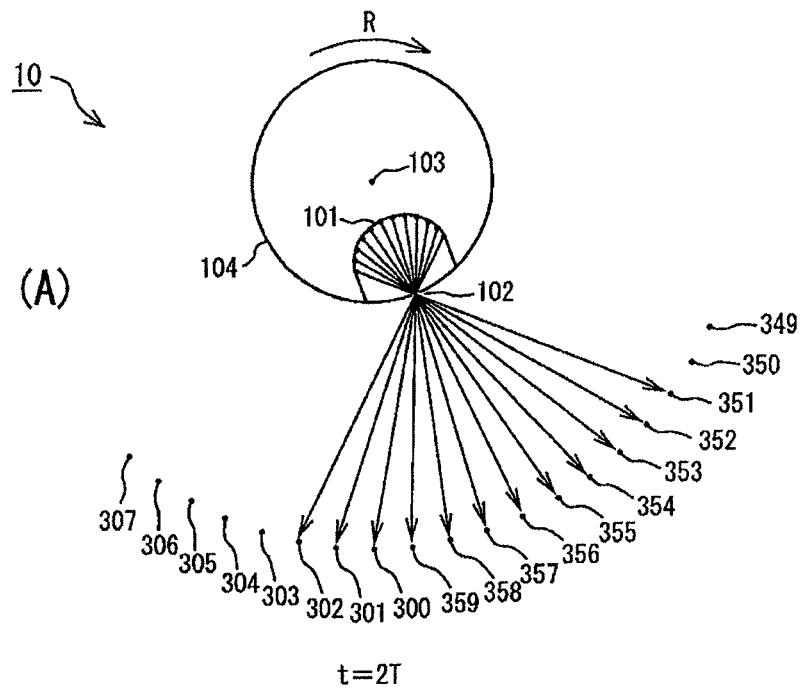
FIG. 14 is an illustration of a state (No. 2) where light rays are emitted to a plurality of viewpoints through the slit 102.
Figure 14:
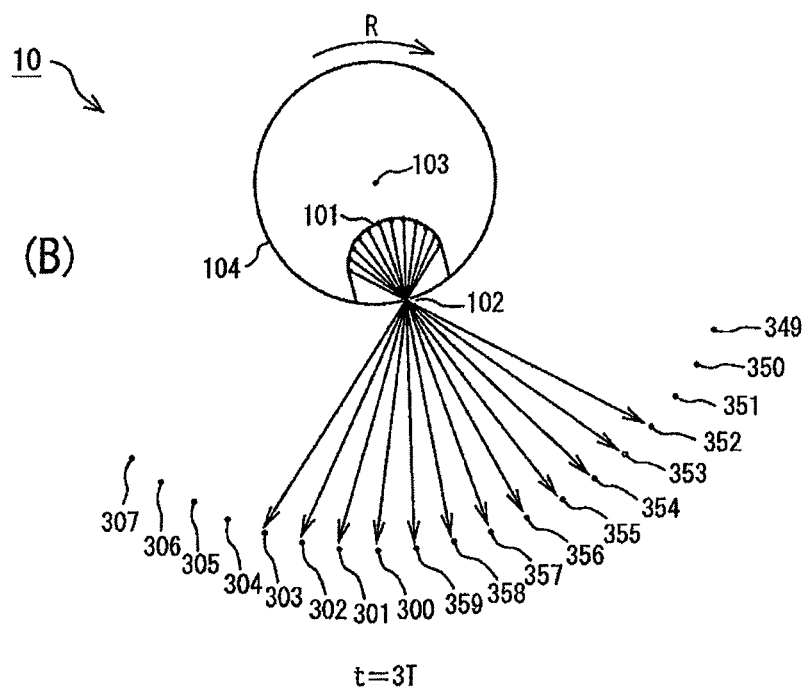
Figure 15:
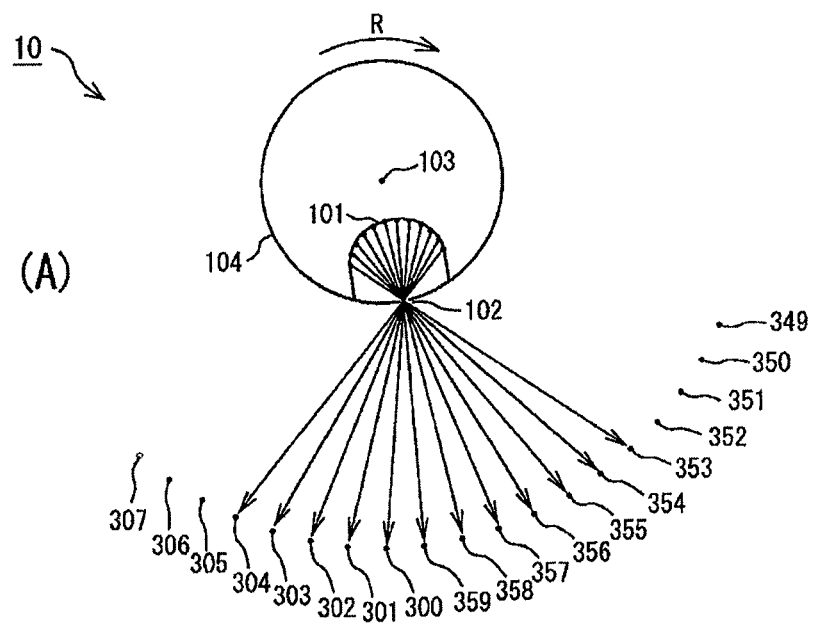
FIG. 15 is an illustration of a state (No. 3) where light rays are emitted to a plurality of viewpoints through the slit 102.
Figure 15:
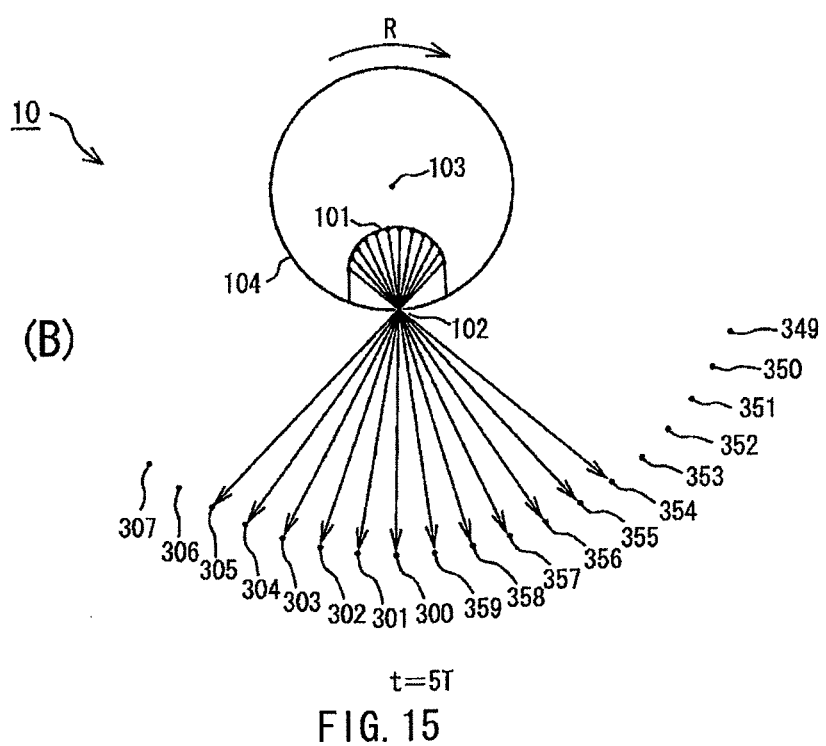

FIGS. 10 to 12 are illustrations of trail examples of light-emission points viewed from the viewpoint p. As illustrated in FIGS. 10A to 10D, in the case where the rotation section 104 including the light-emitting unit U1 rotates at constant speed to be subjected to rotational scanning with respect to the viewpoint p=300, light-emitting elements observed from the viewpoint 300 are changed from the light-emitting element 201 to the light-emitting elements 202, 203, . . . and 212 in order at intervals T.

A configuration in which the trail of the light-emission points (small black circle marks in the drawing) is perceived as, for example, a plane is achieved by adjusting the light-emission surface shape of the two-dimensional light-emitting element array 101 and the position of the slit 102. For example, when the two-dimensional light-emitting element array 101 is observed from the viewpoint 300 through the slit 102 at a time t=0 illustrated in FIG. 10A, light leaked from the light-emitting element 201 is observed.

When the two-dimensional light-emitting element array 101 is observed from the viewpoint 300 through the slit 102 at the time t=T illustrated in FIG. 10B, light leaked from the light-emitting element 202 is observed. A first small white circle mark from right in the drawing indicates the light-emission point of the light-emitting element 201. When the two-dimensional light-emitting element array 101 is observed from the viewpoint 300 through the slit 102 at the time t=2T illustrated in FIG. 10C, light leaked from the light-emitting element 203 is observed. A second small circle mark in FIG. 10C indicates the light-emission point of the light-emitting element 202.

When the two-dimensional light-emitting element array 101 is observed from the viewpoint 300 through the slit 102 at the time t=3T illustrated in FIG. 10D, light leaked from the light-emitting element 204 is observed. A third small circle mark in FIG. 10D indicates the light-emission point of the light-emitting element 203.

Moreover, when the two-dimensional light-emitting element array 101 is observed from the viewpoint 300 through the slit 102 at the time t=4T illustrated in FIG. 11A, light leaked from the light-emitting element 205 is observed. A fourth small circle mark in FIG. 11A indicates the light-emission point of the light-emitting element 204. When the two-dimensional light-emitting element array 101 is observed from the viewpoint 300 through the slit 102 at the time t=5T illustrated in FIG. 11B, light leaked from the light-emitting element 206 is observed. A fifth small circle mark in FIG. 11B indicates the light-emission point of the light-emitting element 205.

When the two-dimensional light-emitting element array 101 is observed from the viewpoint 300 through the slit 102 at the time t=6T illustrated in FIG. 11C, light leaked from the light-emitting element 207 is observed. A sixth small circle mark in FIG. 11C indicates the light-emission point of the light-emitting element 206. When the two-dimensional light-emitting element array 101 is observed from the viewpoint 300 through the slit 102 at the time t=7T illustrated in FIG. 11D, light leaked from the light-emitting element 208 is observed. A seventh small circle mark in FIG. 11D indicates the light-emission point of the light-emitting element 207.

When the two-dimensional light-emitting element array 101 is observed from the viewpoint 300 through the slit 102 at the time t=8T illustrated in FIG. 12A, light leaked from the light-emitting element 209 is observed. An eighth small circle mark in FIG. 12A indicates the light-emission point of the light-emitting element 208. When the two-dimensional light-emitting element array 101 is observed from the viewpoint 300 through the slit 102 at the time t=9T illustrated in FIG. 12B, light leaked from the light-emitting element 210 is observed. A ninth small circle mark in FIG. 12B indicates the light-emission point of the light-emitting element 209.

When the two-dimensional light-emitting element array 101 is observed from the viewpoint 300 through the slit 102 at the time t=10T illustrated in FIG. 12C, light leaked from the light-emitting element 211 is observed. A tenth small circle mark in FIG. 12C indicates the light-emission point of the light-emitting element 210. When the two-dimensional light-emitting element array 101 is observed from the viewpoint 300 through the slit 102 at the time t=11T illustrated in FIG. 12D, light leaked from the light-emitting element 212 is observed. An eleventh small circle mark in FIG. 12D indicates the light-emission point of the light-emitting element 211. A twelfth small black circle mark in FIG. 12D indicates the light-emission point of the light-emitting element 212.

[State where Light Rays are Emitted]

Next, a state where light rays are emitted to a plurality of viewpoints through the slit 102 will be described below. FIGS. 13 to 16 are illustrations of states (Nos. 1 to 4) where light rays are emitted to a plurality of viewpoints p through the slit 102. In this example, in the case where 60 viewpoints p=300 to 359 are provided at intervals of 6° around an entire circumference (360°) of the light-emitting unit U1, states from the time t=0 to the time t=5T ($\frac{1}{12}$ of the entire circumference) where the rotation section 104 rotates by 30° from an arbitrary reference position are illustrated.

In such a light-emitting unit U1, light rays are simultaneously emitted to a plurality (12) of viewpoints p corresponding to the number of light-emitting elements 201 to 212 as illustrated in FIGS. 13A and B, FIGS. 14A and B and FIGS. 15A and B. By this emission, a plane formed by a trail of the light-emission points is observed from not only the viewpoint p=300 but also other viewpoints p=349 to 359.

For example, when the two-dimensional light-emitting element array 101 is observed from the viewpoint 300 (p is removed) through the slit 102 at the time t=0 illustrated in FIG. 13A, light leaked from the light-emitting element 201 is observed. In this example, the rotation section 104 rotates in a clockwise direction, and the viewpoint is shifted in increments of 6° with reference to the viewpoint 300. When the two-dimensional light-emitting element array 101 is observed through the slit 102 from another viewpoint 359 different from the viewpoint 300 illustrated in FIG. 13A by an angle of 6° in a counterclockwise direction, light leaked from the light-emitting element 202 is observed.

When the two-dimensional light-emitting element array 101 is observed through the slit 102 from the viewpoint 358 different from the viewpoint 300 illustrated in FIG. 13A by an angle of 12° in a counterclockwise direction, light leaked from the light-emitting element 203 is observed. When the two-dimensional light-emitting element array 101 is observed through the slit 102 from the viewpoint 357 different from the viewpoint 300 illustrated in FIG. 13A by an angle of 18° in a counterclockwise direction, light leaked from the light-emitting element 204 is observed.

When the two-dimensional light-emitting element array 101 is observed through the slit 102 from the viewpoint 356 different from the viewpoint 300 illustrated in FIG. 13A by an angle of 24° in a counterclockwise direction, light leaked from the light-emitting element 205 is observed. When the two-dimensional light-emitting element array 101 is observed through the slit 102 from the viewpoint 355 different from the viewpoint 300 illustrated in FIG. 13A by an angle of 30° in a counterclockwise direction, light leaked from the light-emitting element 206 is observed.

When the two-dimensional light-emitting element array 101 is observed through the slit 102 from the viewpoint 354 different from the viewpoint 300 illustrated in FIG. 13A by an angle of 36° in a counterclockwise direction, light leaked from the light-emitting element 207 is observed. When the two-dimensional light-emitting element array 101 is observed through the slit 102 from the viewpoint 353 different from the viewpoint 300 illustrated in FIG. 13A by an angle of 42° in a counterclockwise direction, light leaked from the light-emitting element 208 is observed.

When the two-dimensional light-emitting element array 101 is observed through the slit 102 from the viewpoint 352 different from the viewpoint 300 illustrated in FIG. 13A by an angle of 48° in a counterclockwise direction, light leaked from the light-emitting element 209 is observed. When the two-dimensional light-emitting element array 101 is observed through the slit 102 from the viewpoint 351 different from the viewpoint 300 illustrated in FIG. 13A by an angle of 54° in a counterclockwise direction, light leaked from the light-emitting element 210 is observed.

When the two-dimensional light-emitting element array 101 is observed through the slit 102 from the viewpoint 350 different from the viewpoint 300 illustrated in FIG. 13A by an angle of 60° in a counterclockwise direction, light leaked from the light-emitting element 211 is observed. When the two-dimensional light-emitting element array 101 is observed through the slit 102 from the viewpoint 349 different from the viewpoint 300 illustrated in FIG. 13A by an angle of 66° in a counterclockwise direction, light leaked from the light-emitting element 212 is observed.

Moreover, when the two-dimensional light-emitting element array 101 is observed from the viewpoint 300 through the slit 102 at the time t=T illustrated in FIG. 13B, light leaked from the light-emitting element 202 is observed. When the two-dimensional light-emitting element array 101 is observed through the slit 102 from another viewpoint 301 different from the viewpoint 300 illustrated in FIG. 13B by an angle of 6° in a clockwise direction, light leaked from the light-emitting element 201 is observed.

When the two-dimensional light-emitting element array 101 is observed through the slit 102 from another viewpoint 359 different from the viewpoint 300 illustrated in FIG. 13B by an angle of 6° in a counterclockwise direction, light leaked from the light-emitting element 203 is observed. When the two-dimensional light-emitting element array 101 is observed through the slit 102 from the viewpoint 358 different from the viewpoint 300 illustrated in FIG. 13B by an angle of 12° in a counterclockwise direction, light leaked from the light-emitting element 204 is observed.

When the two-dimensional light-emitting element array 101 is observed through the slit 102 from the viewpoint 357 different from the viewpoint 300 illustrated in FIG. 13B by an angle of 18° in a counterclockwise direction, light leaked from the light-emitting element 205 is observed. When the two-dimensional light-emitting element array 101 is observed through the slit 102 from the viewpoint 356 different from the viewpoint 300 illustrated in FIG. 13B by an angle of 24° in a counterclockwise direction, light leaked from the light-emitting element 206 is observed.

When the two-dimensional light-emitting element array 101 is observed through the slit 102 from the viewpoint 355 different from the viewpoint 300 illustrated in FIG. 13B by an angle of 30° in a counterclockwise direction, light leaked from the light-emitting element 207 is observed. When the two-dimensional light-emitting element array 101 is observed through the slit 102 from the viewpoint 354 different from the viewpoint 300 illustrated in FIG. 13B by an angle of 36° in a counterclockwise direction, light leaked from the light-emitting element 208 is observed.

When the two-dimensional light-emitting element array 101 is observed through the slit 102 from the viewpoint 353 different from the viewpoint 300 illustrated in FIG. 13B by an angle of 42° in a counterclockwise direction, light leaked from the light-emitting element 209 is observed. When the two-dimensional light-emitting element array 101 is observed through the slit 102 from the viewpoint 352 different from the viewpoint 300 illustrated in FIG. 13B by an angle of 48° in a counterclockwise direction, light leaked from the light-emitting element 210 is observed.

When the two-dimensional light-emitting element array 101 is observed through the slit 102 from the viewpoint 351 different from the viewpoint 300 illustrated in FIG. 13B by an angle of 54° in a counterclockwise direction, light leaked from the light-emitting element 211 is observed. When the two-dimensional light-emitting element array 101 is observed through the slit 102 from the viewpoint 350 different from the viewpoint 300 illustrated in FIG. 13B by an angle of 60° in a counterclockwise direction, light leaked from the light-emitting element 212 is observed.

Further, when the two-dimensional light-emitting element array 101 is observed from the viewpoint 300 through the slit 102 at the time t=2T illustrated in FIG. 14A, light leaked from the light-emitting element 203 is observed. When the two-dimensional light-emitting element array 101 is observed through the slit 102 from another viewpoint 301 different from the viewpoint 300 illustrated in FIG. 14A by an angle of 6° in a clockwise direction, light leaked from the light-emitting element 202 is observed.

When the two-dimensional light-emitting element array 101 is observed through the slit 102 from another viewpoint 302 different from the viewpoint 300 illustrated in FIG. 14A by an angle of 12° in a clockwise direction, light leaked from the light-emitting element 201 is observed. When the two-dimensional light-emitting element array 101 is observed through the slit 102 from another viewpoint 359 different from the viewpoint 300 illustrated in FIG. 14A by an angle of 6° in a counterclockwise direction, light leaked from the light-emitting element 204 is observed.

When the two-dimensional light-emitting element array 101 is observed through the slit 102 from the viewpoint 358 different from the viewpoint 300 illustrated in FIG. 14A by an angle of 12° in a counterclockwise direction, light leaked from the light-emitting element 205 is observed. When the two-dimensional light-emitting element array 101 is observed through the slit 102 from the viewpoint 357 different from the viewpoint 300 illustrated in FIG. 14A by an angle of 18° in a counterclockwise direction, light leaked from the light-emitting element 206 is observed.

When the two-dimensional light-emitting element array 101 is observed through the slit 102 from the viewpoint 356 different from the viewpoint 300 illustrated in FIG. 14A by an angle of 24° in a counterclockwise direction, light leaked from the light-emitting element 207 is observed. When the two-dimensional light-emitting element array 101 is observed through the slit 102 from the viewpoint 355 different from the viewpoint 300 illustrated in FIG. 14A by an angle of 30° in a counterclockwise direction, light leaked from the light-emitting element 208 is observed.

When the two-dimensional light-emitting element array 101 is observed through the slit 102 from the viewpoint 354 different from the viewpoint 300 illustrated in FIG. 14A by an angle of 36° in a counterclockwise direction, light leaked from the light-emitting element 209 is observed. When the two-dimensional light-emitting element array 101 is observed through the slit 102 from the viewpoint 353 different from the viewpoint 300 illustrated in FIG. 14A by an angle of 42° in a counterclockwise direction, light leaked from the light-emitting element 210 is observed.

When the two-dimensional light-emitting element array 101 is observed through the slit 102 from the viewpoint 352 different from the viewpoint 300 illustrated in FIG. 14A by an angle of 48° in a counterclockwise direction, light leaked from the light-emitting element 211 is observed. When the two-dimensional light-emitting element array 101 is observed through the slit 102 from the viewpoint 351 different from the viewpoint 300 illustrated in FIG. 14A by an angle of 54° in a counterclockwise direction, light leaked from the light-emitting element 212 is observed.

Moreover, when the two-dimensional light-emitting element array 101 is observed from the viewpoint 300 through the slit 102 at the time t=3T illustrated in FIG. 14B, light leaked from the light-emitting element 204 is observed. When the two-dimensional light-emitting element array 101 is observed through the slit 102 from another viewpoint 301 different from the viewpoint 300 illustrated in FIG. 14B by an angle of 6° in a clockwise direction, light leaked from the light-emitting element 203 is observed.

When the two-dimensional light-emitting element array 101 is observed through the slit 102 from another viewpoint 302 different from the viewpoint 300 illustrated in FIG. 14B by 12° in a clockwise direction, light leaked from the light-emitting element 202 is observed. When the two-dimensional light-emitting element array 101 is observed through the slit 102 from another viewpoint 303 different from the viewpoint 300 illustrated in FIG. 14B by an angle of 18° in a clockwise direction, light leaked from the light-emitting element 201 is observed.

When the two-dimensional light-emitting element array 101 is observed through the slit 102 from another viewpoint 359 different from the viewpoint 300 illustrated in FIG. 14B by an angle of 6° in a counterclockwise direction, light leaked from the light-emitting element 205 is observed. When the two-dimensional light-emitting element array 101 is observed through the slit 102 from the viewpoint 358 different from the viewpoint 300 illustrated in FIG. 14B by an angle of 12° in a counterclockwise direction, light leaked from the light-emitting element 206 is observed.

When the two-dimensional light-emitting element array 101 is observed through the slit 102 from the viewpoint 357 different from the viewpoint 300 illustrated in FIG. 14B by an angle of 18° in a counterclockwise direction, light leaked from the light-emitting element 207 is observed. When the two-dimensional light-emitting element array 101 is observed through the slit 102 from the viewpoint 356 different from the viewpoint 300 illustrated in FIG. 14B by an angle of 24° in a counterclockwise direction, light leaked from the light-emitting element 208 is observed.

When the two-dimensional light-emitting element array 101 is observed through the slit 102 from the viewpoint 355 different from the viewpoint 300 illustrated in FIG. 14B by an angle of 30° in a counterclockwise direction, light leaked from the light-emitting element 209 is observed. When the two-dimensional light-emitting element array 101 is observed through the slit 102 from the viewpoint 354 different from the viewpoint 300 illustrated in FIG. 14B by an angle of 36° in a counterclockwise direction, light leaked from the light-emitting element 210 is observed.

When the two-dimensional light-emitting element array 101 is observed through the slit 102 from the viewpoint 353 different from the viewpoint 300 illustrated in FIG. 14B by an angle of 42° in a counterclockwise direction, light leaked from the light-emitting element 211 is observed. When the two-dimensional light-emitting element array 101 is observed through the slit 102 from the viewpoint 352 different from the viewpoint 300 illustrated in FIG. 14B by an angle of 48° in a counterclockwise direction, light leaked from the light-emitting element 212 is observed.

Further, when the two-dimensional light-emitting element array 101 is observed from the viewpoint 300 through the slit 102 at the time t=4T illustrated in FIG. 15A, light leaked from the light-emitting element 205 is observed. When the two-dimensional light-emitting element array 101 is observed through the slit 102 from another viewpoint 301 different from the viewpoint 300 illustrated in FIG. 15A by an angle of 6° in a clockwise direction, light leaked from the light-emitting element 204 is observed.

When the two-dimensional light-emitting element array 101 is observed through the slit 102 from another viewpoint 302 different from the viewpoint 300 illustrated in FIG. 15A by an angle of 12° in a clockwise direction, light leaked from the light-emitting element 203 is observed. When the two-dimensional light-emitting element array 101 is observed through the slit 102 from another viewpoint 303 different from the viewpoint 300 illustrated in FIG. 15A by an angle of 18° in a clockwise direction, light leaked from the light-emitting element 202 is observed.

When the two-dimensional light-emitting element array 101 is observed through the slit 102 from another viewpoint 304 different from the viewpoint 300 illustrated in FIG. 15A by an angle of 24° in a clockwise direction, light leaked from the light-emitting element 201 is observed. When the two-dimensional light-emitting element array 101 is observed through the slit 102 from another viewpoint 359 different from the viewpoint 300 illustrated in FIG. 15A by an angle of 6° in a counterclockwise direction, light leaked from the light-emitting element 206 is observed.

When the two-dimensional light-emitting element array 101 is observed through the slit 102 from the viewpoint 358 different from the viewpoint 300 illustrated in FIG. 15A by an angle of 12° in a counterclockwise direction, light leaked from the light-emitting element 207 is observed. When the two-dimensional light-emitting element array 101 is observed through the slit 102 from the viewpoint 357 different from the viewpoint 300 illustrated in FIG. 15A by an angle of 18° in a counterclockwise direction, light leaked from the light-emitting element 208 is observed.

When the two-dimensional light-emitting element array 101 is observed through the slit 102 from the viewpoint 356 different from the viewpoint 300 illustrated in FIG. 15A by an angle of 24° in a counterclockwise direction, light leaked from the light-emitting element 209 is observed. When the two-dimensional light-emitting element array 101 is observed through the slit 102 from the viewpoint 355 different from the viewpoint 300 illustrated in FIG. 15A by an angle of 30° in a counterclockwise direction, light leaked from the light-emitting element 210 is observed.

When the two-dimensional light-emitting element array 101 is observed through the slit 102 from the viewpoint 354 different from the viewpoint 300 illustrated in FIG. 15A by an angle of 36° in a counterclockwise direction, light leaked from the light-emitting element 211 is observed. When the two-dimensional light-emitting element array 101 is observed through the slit 102 from the viewpoint 353 different from the viewpoint 300 illustrated in FIG. 15A by an angle of 42° in a counterclockwise direction, light leaked from the light-emitting element 212 is observed.

Moreover, when the two-dimensional light-emitting element array 101 is observed from the viewpoint 300 through the slit 102 at the time t=5T illustrated in FIG. 15B, light leaked from the light-emitting element 206 is observed. When the two-dimensional light-emitting element array 101 is observed through the slit 102 from another viewpoint 301 different from the viewpoint 300 illustrated in FIG. 15B by an angle of 6° in a clockwise direction, light leaked from the light-emitting element 205 is observed.

When the two-dimensional light-emitting element array 101 is observed through the slit 102 from another viewpoint 302 different from the viewpoint 300 illustrated in FIG. 15B by an angle of 12° in a clockwise direction, light leaked from the light-emitting element 204 is observed. When the two-dimensional light-emitting element array 101 is observed through the slit 102 from another viewpoint 303 different from the viewpoint 300 illustrated in FIG. 15B by an angle of 18° in a clockwise direction, light leaked from the light-emitting element 203 is observed.

When the two-dimensional light-emitting element array 101 is observed through the slit 102 from another viewpoint 304 different from the viewpoint 300 illustrated in FIG. 15B by an angle of 24° in a clockwise direction, light leaked from the light-emitting element 202 is observed. When the two-dimensional light-emitting element array 101 is observed through the slit 102 from another viewpoint 305 different from the viewpoint 300 illustrated in FIG. 15B by an angle of 30° in a clockwise direction, light leaked from the light-emitting element 201 is observed.

When the two-dimensional light-emitting element array 101 is observed through the slit 102 from another viewpoint 359 different from the viewpoint 300 illustrated in FIG. 15B by an angle of 6° in a counterclockwise direction, light leaked from the light-emitting element 207 is observed. When the two-dimensional light-emitting element array 101 is observed through the slit 102 from the viewpoint 358 different from the viewpoint 300 illustrated in FIG. 15B by an angle of 12° in a counterclockwise direction, light leaked from the light-emitting element 208 is observed.

When the two-dimensional light-emitting element array 101 is observed through the slit 102 from the viewpoint 357 different from the viewpoint 300 illustrated in FIG. 15B by an angle of 18° in a counterclockwise direction, light leaked from the light-emitting element 209 is observed. When the two-dimensional light-emitting element array 101 is observed through the slit 102 from the viewpoint 356 different from the viewpoint 300 illustrated in FIG. 15B by an angle of 24° in a counterclockwise direction, light leaked from the light-emitting element 210 is observed.

When the two-dimensional light-emitting element array 101 is observed through the slit 102 from the viewpoint 355 different from the viewpoint 300 illustrated in FIG. 15B by an angle of 30° in a counterclockwise direction, light leaked from the light-emitting element 211 is observed. When the two-dimensional light-emitting element array 101 is observed through the slit 102 from the viewpoint 354 different from the viewpoint 300 illustrated in FIG. 15B by an angle of 36° in a counterclockwise direction, light leaked from the light-emitting element 212 is observed.

Note that at the time t=6T to 11T, light leaked from 12 light-emitting elements 201 to 212 is observed by shifting viewpoints from one to another. During this time, the rotation section 104 rotates from an angle of 30° to 60°. Therefore, when the rotation section 104 rotates an entire revolution (one revolution), that is, 360°, light emission at the time t=0 to 59T by 12 light-emitting elements 201 to 212 is observed. The two-dimensional light-emitting element array 101 is observed through the slit 102 from other viewpoints different from the viewpoint 300 in a clockwise direction or a counterclockwise direction in increments of an angle of 6° in such a manner. As a result, light leaked from the 12 light-emitting elements 201 to 212 is observable by shifting viewpoints from one to another (refer to FIG. 16).

Figure 16:
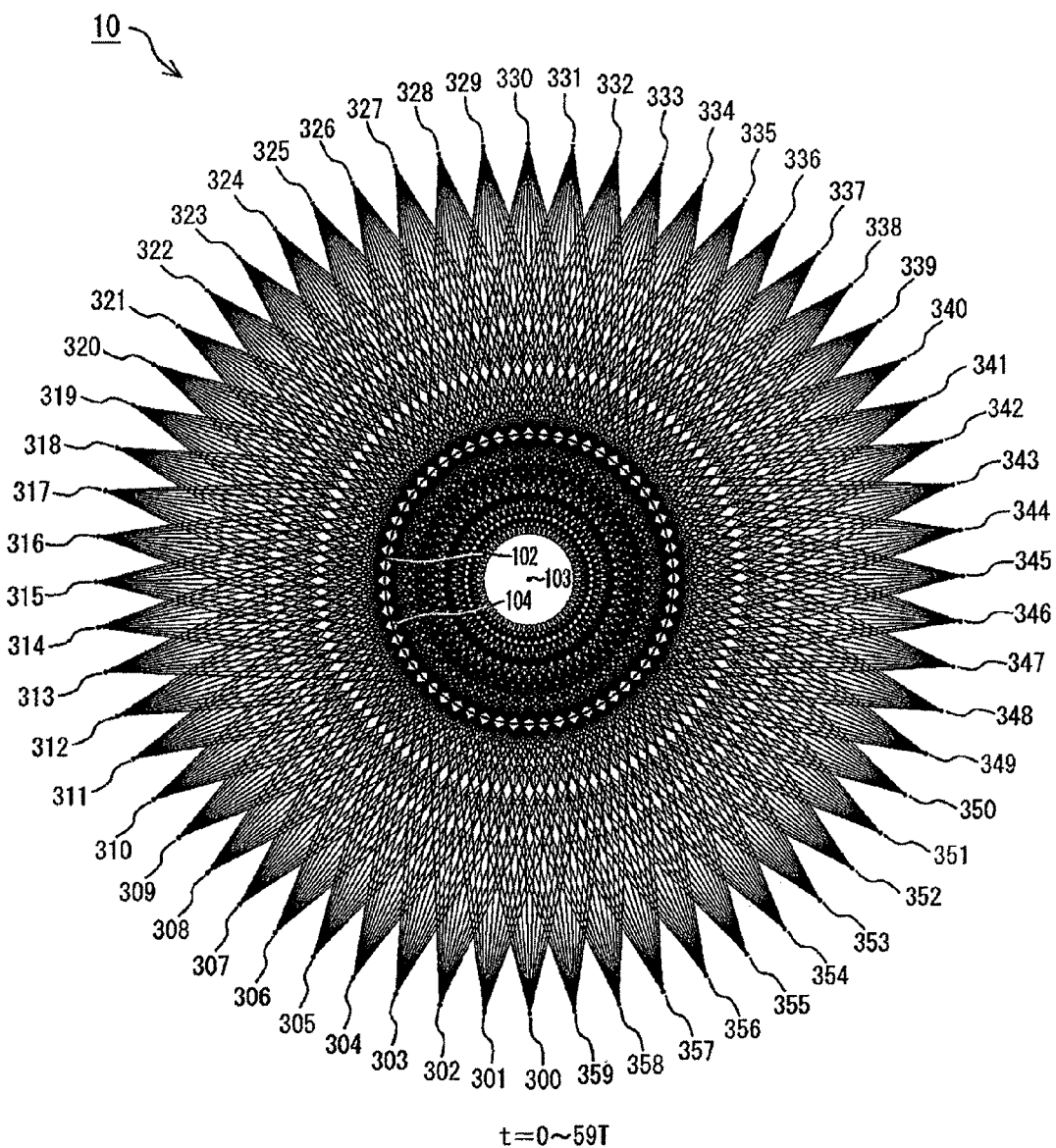
FIG. 16 is an illustration of a state (No. 4) where light rays are emitted to a plurality of viewpoints through the slit 102.

FIG. 16 is an illustration of an entire trail example of the light-emission points by the two-dimensional light-emitting element array 101. In the trail example of the light-emission points by the two-dimensional light-emitting element array 101 illustrated in FIG. 16, a plane formed by a trail of light-emission points from the time t=0 to the time t=59T is observed from all (60) viewpoints 300 to 359. In this example, the number of observation viewpoints is 60 (an arrangement pitch of an angle of 6°). The configuration of the above-described light-emitting unit U1 is extremely advantageous to generate picture data for integral imaging, because as reproduced pictures observed from 60 viewpoints 300 to 359 are planes, a process of converting shooting data into emission light data in determined order or the like is eased.

[Generation Example of Picture Data for Stereoscopic Picture Display]

Figure 17:
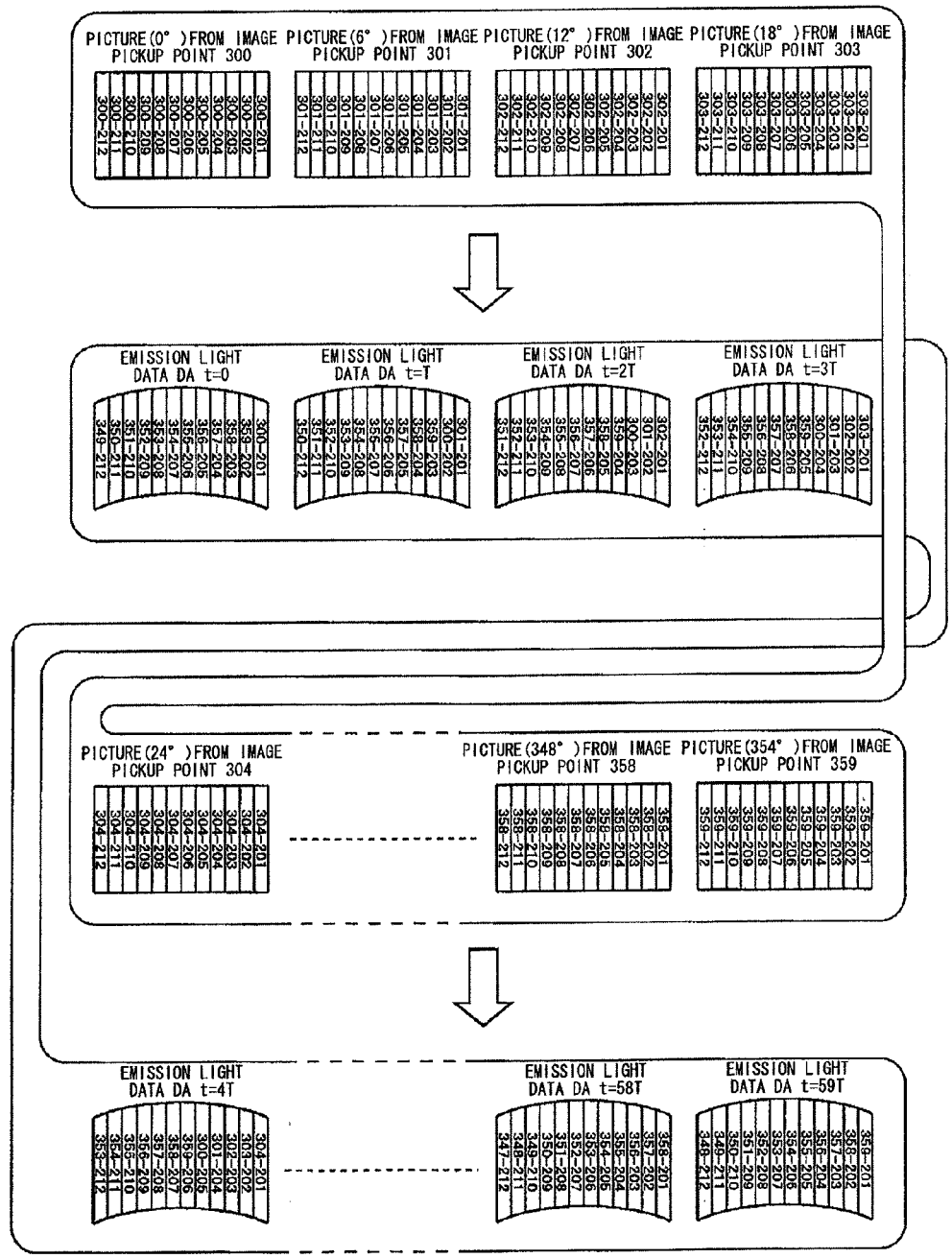
FIG. 17 is a data format illustrating a conversion example of shooting data/emission light data.

Next, a generation example of picture data for stereoscopic picture display applicable to the omnidirectional stereoscopic picture display 10 will be described below. FIG. 17 is a data format illustrating a conversion example of shooting data/emission light data.

In this example, pictures of an object (subject) to be displayed on the omnidirectional stereoscopic picture display 10 illustrated in FIG. 16 are taken from all directions. For example, the object is placed at a shooting center, and 60 shooting points (corresponding to viewpoints 300 to 359) are provided around an entire circumference of the object in increments of 6° with respect to a central part of the placed object as a rotation center.

Next, pictures of the object are actually taken from the viewpoints 300 to 359 toward an object shooting central position (corresponding to the rotation shaft 103) with use of a camera. The shooting data throughout an entire circumference of the object necessary for integral imaging is allowed to be collected.

After that, an alignment operation process is executed on a line data basis in a slit direction (a vertical direction) so that the shooting data collected as illustrated in FIG. 17 is converted into emission light data of 12 (rows of) light-emitting elements 201 to 212 in the two-dimensional light-emitting element array 101 for respective light emission times.

In this case, the shooting data of a picture (0°) taken and obtained from a shooting point 300 is represented as follows. Shooting data (300-201, 300-202, 300-203, 300-204, 300-205, 300-206, 300-207, 300-208, 300-209, 300-210, 300-211, 300-212) is obtained from the shooting point 300.

Moreover, shooting data of a picture (6°) taken and obtained from a shooting point 301 is represented as follows. Shooting data (301-201, 301-202, 301-203, 301-204, 301-205, 301-206, 301-207, 301-208, 301-209, 301-210, 301-211, 301-212) is obtained from the shooting point 301.

Shooting data of a picture (12°) taken and obtained from a shooting point 302 is represented as follows. Shooting data (302-201, 302-202, 302-203, 302-204, 302-205, 302-206, 302-207, 302-208, 302-209, 302-210, 302-211, 302-212) is obtained from the shooting point 302.

Shooting data of a picture (18°) taken and obtained from a shooting point 303 is represented as follows. Shooting data (303-201, 303-202, 303-203, 303-204, 303-205, 303-206, 303-207, 303-208, 303-209, 303-210, 303-211, 303-212) is obtained from the shooting point 303.

Shooting data of a picture (24°) taken and obtained from a shooting point 304 is represented as follows. Shooting data (304-201, 304-202, 304-203, 304-204, 304-205, 304-206, 304-207, 304-208, 304-209, 304-210, 304-211, 304-212) is obtained from the shooting point 304. Likewise, shooting data of a picture (348°) taken and obtained from a shooting point 358 is represented as follows. Shooting data (358-201, 358-202, 358-203, 358-204, 358-205, 358-206, 358-207, 358-208, 358-209, 358-210, 358-211, 358-212) is obtained from the shooting point 358.

Then, shooting data of a picture (354°) taken and obtained from a shooting point 359 is represented as follows. Shooting data (359-201, 359-202, 359-203, 359-204, 359-205, 359-206, 359-207, 359-208, 359-209, 359-210, 359-211, 359-212) is obtained from the shooting point 359.

The following alignment operation is executed on the above-described shooting data to perform a conversion process into emission light data at the time t=0 to t=59T. First, as emission light data of the light-emitting element 201 at the time t=0, shooting data (300-201) of a picture (0°) of the object is aligned. As emission light data of the light-emitting element 202 at the same time t=0, shooting data (359-202) of the picture (354°) of the object is aligned. As emission light data of the light-emitting element 203 at the same time t=0, shooting data (358-203) of the picture (348°) of the object is aligned.

As emission light data of the light-emitting element 204 at the same time t=0, shooting data (357-204) of the picture (342°) of the object is aligned. As emission light data of the light-emitting element 205 at the same time t=0, shooting data (356-205) of the picture (336°) of the object is aligned. As emission light data of the light-emitting element 206 at the same time t=0, shooting data (355-206) of the picture (330°) of the object is aligned.

As emission light data of the light-emitting element 207 at the same time t=0, shooting data (354-207) of the picture (324°) of the object is aligned. As emission light data of the light-emitting element 208 at the same time t=0, shooting data (353-208) of the picture (318°) of the object is aligned. As emission light data of the light-emitting element 209 at the same time t=0, shooting data (352-209) of the picture (312°) of the object is aligned.

As emission light data of the light-emitting element 210 at the same time t=0, shooting data (351-210) of the picture (306°) of the object is aligned. As emission light data of the light-emitting element 211 at the same time t=0, shooting data (350-211) of the picture (300°) of the object is aligned. As emission light data of the light-emitting element 212 at the same time t=0, shooting data (349-212) of the picture (294°) of the object is aligned.

By this alignment operation, emission light data of the light-emitting elements 201 to 212 at the time t=0 is allowed to be generated. The generated data is emission light data (300-201, 359-202, 358-203, 357-204, 356-205, 355-206, 354-207, 353-208, 352-209, 351-210, 350-211, 349-212).

Next, as emission light data of the light-emitting element 201 at the time t=T, shooting data (301-201) of the picture (6°) of the object is aligned. As emission light data of the light-emitting element 202 at the same time t=T, shooting data (300-202) of the picture (0°) of the object is aligned. As emission light data of the light-emitting element 203 at the same time t=T, shooting data (359-203) of the picture (354°) of the object is aligned. As emission light data of the light-emitting element 204 at the same time t=T, shooting data (358-204) of the picture (348°) of the object is aligned.

As emission light data of the light-emitting element 205 at the same time t=T, shooting data (357-205) of the picture (342°) of the object is aligned. As emission light data of the light-emitting element 206 at the same time t=T, shooting data (356-206) of the picture (336°) of the object is aligned. As emission light data of the light-emitting element 207 at the same time t=T, shooting data (355-207) of the picture (330°) of the object is aligned. As emission light data of the light-emitting element 208 at the same time t=T, shooting data (354-208) of the picture (324°) of the object is aligned.

As emission light data of the light-emitting element 209 at the same time t=T, shooting data (353-209) of the picture (318°) of the object is aligned. As emission light data of the light-emitting element 210 at the same time t=T, shooting data (352-210) of the picture (312°) of the object is aligned. As emission light data of the light-emitting element 211 at the same time t=T, shooting data (351-211) of the picture (306°) of the object is aligned. As emission light data of the light-emitting element 212 at the same time t=T, shooting data (350-212) of the picture (300°) of the object is aligned.

By this alignment operation, emission light data of the light-emitting elements 201 to 212 at the time t=T is allowed to be generated. The generated data is emission light data (301-201, 300-202, 359-203, 358-204, 357-205, 356-206, 355-207, 354-208, 353-209, 352-210, 351-211, 350-212).

Next, as emission light data of the light-emitting element 201 at the time t=2T, shooting data (302-201) of the picture (12°) of the object is aligned. As emission light data of the light-emitting element 202 at the same time t=2T, shooting data (301-202) of the picture (6°) of the object is aligned. As emission light data of the light-emitting element 203 at the same time t=2T, shooting data (300-203) of the picture (0°) of the object is aligned. As emission light data of the light-emitting element 204 at the same time t=2T, shooting data (359-204) of the picture (354°) of the object is aligned.

As emission light data of the light-emitting element 205 at the same time t=2T, shooting data (358-205) of the picture (348°) of the object is aligned. As emission light data of the light-emitting element 206 at the same time t=2T, shooting data (357-206) of the picture (342°) of the object is aligned. As emission light data of the light-emitting element 207 at the same time t=2T, shooting data (356-207) of the picture (336°) of the object is aligned. As emission light data of the light-emitting element 208 at the same time t=2T, shooting data (355-208) of the picture (330°) of the object is aligned.

As emission light data of the light-emitting element 209 at the same time t=2T, shooting data (354-209) of the picture (324°) of the object is aligned. As emission light data of the light-emitting element 210 at the same time t=2T, shooting data (353-210) of the picture (318°) of the object is aligned. As emission light data of the light-emitting element 211 at the same time t=2T, shooting data (352-211) of the picture (312°) of the object is aligned. As emission light data of the light-emitting element 212 at the same time t=2T, shooting data (351-212) of the picture (306°) of the object is aligned.

By this alignment operation, emission light data of the light-emitting elements 201 to 212 at the time t=2T is allowed to be generated. The generated data is emission light data (302-201, 301-202, 300-203, 359-204, 358-205, 357-206, 356-207, 355-208, 354-209, 353-210, 352-211, 351-212).

Next, as emission light data of the light-emitting element 201 at the time t=3T, shooting data (303-201) of the picture (18°) of the object is aligned. As emission light data of the light-emitting element 202 at the same time t=3T, shooting data (302-202) of the picture (12°) of the object is aligned. As emission light data of the light-emitting element 203 at the same time t=3T, shooting data (301-203) of the picture (6°) of the object is aligned. As emission light data of the light-emitting element 204 at the same time t=3T, shooting data (300-204) of the picture (0°) of the object is aligned.

As emission light data of the light-emitting element 205 at the same time t=3T, shooting data (359-205) of the picture (354°) of the object is aligned. As emission light data of the light-emitting element 206 at the same time t=3T, shooting data (358-206) of the picture (348°) of the object is aligned.

As emission light data of the light-emitting element 207 at the same time t=3T, shooting data (357-207) of the picture (342°) of the object is aligned.

As emission light data of the light-emitting element 208 at the same time t=3T, shooting data (356-208) of the picture (336°) of the object is aligned. As emission light data of the light-emitting element 209 at the same time t=3T, shooting data (355-209) of the picture (330°) of the object is aligned. As emission light data of the light-emitting element 210 at the same time t=3T, the shooting data (354-210) of the picture (324°) of the object is aligned.

As emission light data of the light-emitting element 211 at the same time t=3T, shooting data (353-211) of the picture (318°) of the object is aligned. As emission light data of the light-emitting element 212 at the same time t=3T, shooting data (352-212) of the picture (312°) of the object is aligned.

By this alignment operation, emission light data of the light-emitting elements 201 to 212 at the time t=3T is allowed to be generated. The generated data is emission light data (303-201, 302-202, 301-203, 300-204, 359-205, 358-206, 357-207, 356-208, 355-209, 354-210, 353-211, 352-212).

Next, as emission light data of the light-emitting element 201 at the time t=4T, shooting data (304-201) of the picture (24°) of the object is aligned. As emission light data of the light-emitting element 202 at the same time t=4T, shooting data (303-202) of the picture (18°) of the object is aligned. As emission light data of the light-emitting element 203 at the same time t=4T, shooting data (302-203) of the picture (12°) of the object is aligned. As emission light data of the light-emitting element 204 at the same time t=4T, shooting data (301-204) of the picture (6°) of the object is aligned.

As emission light data of the light-emitting element 205 at the same time t=4T, shooting data (300-205) of the picture (0°) of the object is aligned. As emission light data of the light-emitting element 206 at the same time t=4T, shooting data (359-206) of the picture (354°) of the object is aligned. As emission light data of the light-emitting element 207 at the same time t=4T, shooting data (358-207) of the picture (348°) of the object is aligned. As emission light data of the light-emitting element 208 at the same time t=4T, shooting data (357-208) of the picture (342°) of the object is aligned.

As emission light data of the light-emitting element 209 at the same time t=4T, shooting data (356-209) of the picture (336°) of the object is aligned. As emission light data of the light-emitting element 210 at the same time t=4T, shooting data (355-210) of the picture (330°) of the object is aligned. As emission light data of the light-emitting element 211 at the same time t=4T, shooting data (354-211) of the picture (324°) of the object is aligned. As emission light data of the light-emitting element 212 at the same time t=4T, shooting data (353-212) of the picture (318°) of the object is aligned.

By this alignment operation, emission light data of the light-emitting elements 201 to 212 at the time t=4T is allowed to be generated. The generated data is emission light data (304-201, 303-202, 302-203, 301-204, 300-205, 359-206, 358-207, 357-208, 356-209, 355-210, 354-211, 353-212).

Likewise, as emission light data of the light-emitting element 201 at the time t=58T, shooting data (358-201) of the picture (348°) of the object is aligned. As emission light data of the light-emitting element 202 at the same time t=58T, shooting data (357-202) of the picture (342°) of the object is aligned. As emission light data of the light-emitting element 203 at the same time t=58T, shooting data (356-203) of the picture (336°) of the object is aligned. As emission light data of the light-emitting element 204 at the same time t=58T, shooting data (355-204) of the picture (330°) of the object is aligned.

As emission light data of the light-emitting element 205 at the same time t=58T, shooting data (354-205) of the picture (324°) of the object is aligned. As emission light data of the light-emitting element 206 at the same time t=58T, shooting data (353-206) of the picture (318°) of the object is aligned. As emission light data of the light-emitting element 207 at the same time t=58T, shooting data (352-207) of the picture (312°) of the object is aligned. As emission light data of the light-emitting element 208 at the same time t=58T, shooting data (351-208) of the picture (306°) of the object is aligned.

As emission light data of the light-emitting element 209 at the same time t=58T, shooting data (350-209) of the picture (300°) of the object is aligned. As emission light data of the light-emitting element 210 at the same time t=58T, shooting data (349-210) of the picture (294°) of the object is aligned. As emission light data of the light-emitting element 211 at the same time t=58T, shooting data (348-211) of the picture (288°) of the object is aligned. As emission light data of the light-emitting element 212 at the same time t=58T, shooting data (347-212) of the picture (282°) of the object is aligned.

By this alignment operation, emission light data of the light-emitting elements 201 to 212 at the time t=58T is allowed to be generated. The generated data is emission light data (358-201, 357-202, 356-203, 355-204, 354-205, 353-206, 352-207, 351-208, 350-209, 349-210, 348-211, 347-212).

Then, as emission light data of the light-emitting element 201 at the time t=59T, shooting data (359-201) of the picture (354°) of the object is aligned. As emission light data of the light-emitting element 202 at the same time t=59T, shooting data (358-202) of the picture (348°) of the object is aligned. As emission light data of the light-emitting element 203 at the same time t=59T, shooting data (357-203) of the picture (342°) of the object is aligned. As emission light data of the light-emitting element 204 at the same time t=59T, the shooting data (356-204) of the picture (336°) of the object is aligned.

As emission light data of the light-emitting element 205 at the same time t=59T, shooting data (355-205) of the picture (330°) of the object is aligned. As emission light data of the light-emitting element 206 at the same time t=59T, shooting data (354-206) of the picture (324°) of the object is aligned. As emission light data of the light-emitting element 207 at the same time t=59T, shooting data (353-207) of the picture (318°) of the object is aligned. As emission light data of the light-emitting element 208 at the same time t=59T, shooting data (352-208) of the picture (312°) of the object is aligned.

As emission light data of the light-emitting element 209 at the same time t=59T, shooting data (351-209) of the picture (306°) of the object is aligned. As emission light data of the light-emitting element 210 at the same time t=59T, shooting data (350-210) of the picture (300°) of the object is aligned. As emission light data of the light-emitting element 211 at the same time t=59T, shooting data (349-211) of the picture (294°) of the object is aligned. As emission light data of the light-emitting element 212 at the same time t=59T, shooting data (348-212) of the picture (288°) of the object is aligned.

By this alignment operation, emission light data of the light-emitting elements 201 to 212 at the time t=59T is allowed to be generated. The generated data is emission light data (359-201, 358-202, 357-203, 356-204, 355-205, 354-206, 353-207, 352-208, 351-209, 350-210, 349-211, 348-212).

Emission light data (hereinafter may be referred to as picture data Din) for stereoscopic picture display applicable to the omnidirectional stereoscopic picture display 10 is allowed to be easily generated only by such an alignment operation process. Moreover, when the light-emitting unit U1 has an internal configuration in consideration of generation of the picture data Din, picture data Din for stereoscopic picture display is allowed to be generated by a small-scale signal processing circuit for a short time.

In the above-described example, a method of taking pictures of an actual subject (object) by a camera is described; however, the invention is not limited thereto, and picture data Din for stereoscopic picture display may be generated by computer graphics. Also in display of a virtual object by computer graphics, when rendering of pictures in a direction of the rotation shaft 103 from 60 viewpoints 300 to 359 is performed, and the same process is performed, the picture data Din is allowed to be easily generated.

In this case, "rendering" means creating a picture by calculating information of an object, graphics or the like supplied as numerical data. In rendering of three-dimensional graphics, a picture is created by hidden surface removal, shading, or the like in consideration of positions of viewpoints, the number, positions and kind of light sources, the shape of an object and coordinates of an apex of the object, the material of the object. Rendering techniques include a ray tracing method, a radiosity method and the like.

[Configuration Example of Control System]

Figure 18:
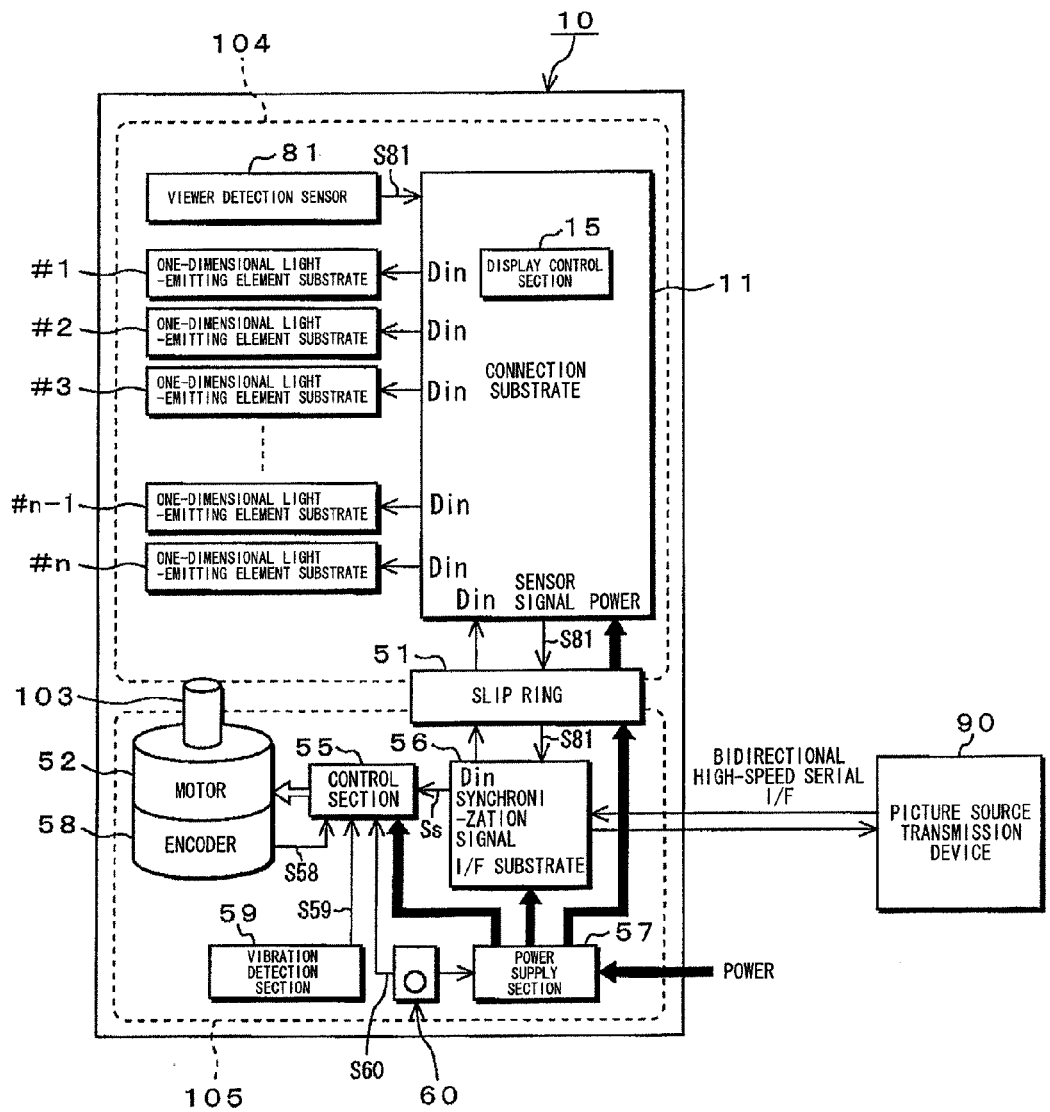
FIG. 18 is a block diagram illustrating a configuration example of a control system of the omnidirectional stereoscopic picture display 10.

Next, a configuration example of a control system of the omnidirectional stereoscopic picture display 10 will be described below. FIG. 18 is a block diagram illustrating the configuration example of the control system of the omnidirectional stereoscopic picture display 10. A stereoscopic picture display viewable from all directions in this example has a configuration in which light rays are emitted to all regions where no viewer is present; therefore, there is apprehension that power efficiency is largely wasted. Therefore, an improvement in power efficiency and a reduction in the amount of information are achieved by viewer detection.

A picture source transmission device 90 is connected to the omnidirectional stereoscopic picture display 10 in FIG. 18, and serial picture data Din for stereoscopic picture display is supplied to the omnidirectional stereoscopic picture display 10. The control system of the omnidirectional stereoscopic picture display 10 is separated into the rotation section 104 and the mounting base 105, and two control systems are electrically connected to each other through the slip ring 51.

A control system in the rotation section 104 includes a connection substrate 11. A number k of one-dimensional light-emitting element substrates #k (k=1 to n) configuring n lines and one viewer detection sensor 81 are connected to the connection substrate 11. The one-dimensional light-emitting element substrates #1 to #n allow a number m (rows) of light-emitting elements to sequentially emit light based on the serial picture data Din for stereoscopic picture display for n lines (refer to FIG. 19).

The display control section 15 is mounted in the connection substrate 11. The display control section 15 receives the picture data Din for stereoscopic picture for each pixel to control light-emission intensities of the light-emitting elements from one pixel to another based on the picture data Din. The serial picture data Din in which the light-emission intensity of each pixel is modulated is transmitted to the IC 35 for serial-parallel conversion and driver, or the like of the one-dimensional light-emitting element substrate #1 illustrated in FIG. 5. The light-emission intensity of the two-dimensional light-emitting element array 101 is controllable from one pixel to another by this control.

In this example, the omnidirectional stereoscopic picture display 10 is an integral imaging-based display; therefore, vast amounts of picture data Din are transmitted to the IC 35 of the one-dimensional light-emitting element substrate #1 to perform display to all directions. However, it is wasteful to transmit picture data Din which is not viewed in terms of a transmission band or picture generation. Therefore, light rays are emitted accurately only to a region where a viewer is present.

The viewer detection sensor 81 is connected to the connection substrate 11, and detects a viewer (for example, pupils of the viewer) viewing a corresponding stereoscopic picture around the rotation section 104 rotated by the motor 52 illustrated in FIG. 1 to generate a viewer detection signal S81. The viewer detection signal S81 is transmitted to the display control section 15 to be used for determining whether the stereoscopic picture is viewed or not.

The display control section 15 receives the viewer detection signal S81 from the viewer detection sensor 81 to obtain a viewer detection value, and performs comparison between the viewer detection value and a predetermined viewer determination value, and then controls the light-emission intensities of the light-emitting elements according to a result of the comparison. More specifically, in a segment where a viewer detection value equal to or higher than the viewer determination value is detected, the two-dimensional light-emitting element array 101 is allowed to operate. In a segment where a viewer detection value lower than the viewer determination value is detected, the display control section 15 controls the light-emission intensities of the one-dimensional light-emitting element substrates #1 to #n to stop the two-dimensional light-emitting element array 101.

The viewer detection sensor 81 corresponds to a specific example of "an observer detection section" in the invention.

Thus, a configuration where light rays are emitted to only a region where an observer is present is used to detect the presence or absence of an observer by the viewer detection sensor 81, and the light-emission intensities of the one-dimensional light-emitting element substrates #1 to #n are controllable in the region where the observer is present. The one-dimensional light-emitting element substrates #1 to #n are allowed to stop in other regions; therefore, a reduction in power consumption is allowed. Therefore, a stereoscopic picture is allowed to be displayed with extremely higher power efficiency than that in a flat display in related art. Moreover, as information to be transmitted is allowed to be largely reduced, the scale of a transmission circuit or a picture generation circuit is reduced to cause cost reduction.

On the other hand, a drive control system is arranged in the mounting base 105, and the drive control system is configured by including a control section 55, an I/F substrate 56, a power supply section 57 and an encoder 58. The I/F substrate 56 is connected to the external picture source transmission device 90 through a bidirectional high-speed serial interface (I/F). The picture source transmission device 90 transmits serial picture data Din for stereoscopic picture display based on bidirectional high-speed serial I/F standards to the connection substrate 11 through the I/F substrate 56 and the slip ring 51.

The control section 55 corresponds to a specific example of "a drive control section" in the invention.

For example, the omnidirectional stereoscopic picture display 10 sequentially transmits a viewer region detected by the viewer detection sensor 81 to the picture source transmission device 90. The picture source transmission device 90 transmits only corresponding region pictures to the omnidirectional stereoscopic picture display 10. In this example, in the case where a stereoscopic picture is viewed by a plurality of viewers around the omnidirectional stereoscopic picture display 10, different picture sources corresponding to viewing regions may be reproduced. In this case, each viewer may select a picture source to be reproduced, or a viewer may be specified by face recognition by a camera, and a preset picture source may be reproduced (refer to FIG. 33B). When this is used for digital signage, a plurality of different pieces of information are allowed to be transmitted by one omnidirectional stereoscopic picture display 10.

Herein, digital signage means various information display by electronic data, and digital signage is suitably applied to display for customer attraction, publicity, advertisement and sales promotion by a public display installed in a store/commercial facility, a traffic facility or the like. For example, when a 360° display region of the omnidirectional stereoscopic picture display 10 is divided into three 120° viewing regions to reproduce different picture data on respective display regions, different pieces of display information are viewable in the three viewing regions, respectively.

For example, when a stereoscopic picture of a front side of a first character is displayed on a display region (0° to 120°) on a front side of the omnidirectional stereoscopic picture display 10, a viewer located on the front side is allowed to view the stereoscopic picture of the front side of the first character. Likewise, when a stereoscopic picture of a front side of a second character is displayed on a display region (121° to 240°) on a right side thereof, a viewer located on the right side is allowed to view the stereoscopic picture of the front side of the second character. Likewise, when a stereoscopic picture of a front side of a third character is displayed on a display region (241° to 360°) on a left side thereof, a viewer located on the left side is allowed to view the stereoscopic picture of the front side of the third character. Therefore, a plurality of different pieces of information are allowed to be transmitted by one omnidirectional stereoscopic picture display 10 or the like.

The control section 55 is connected to the I/F substrate 56. The above-described picture source transmission device 90 transmits a synchronization signal Ss to the control section 55 through the I/F substrate 56. The motor 52, the encoder 58 and a switch section 60 are connected to the control section 55. The encoder 58 is mounted on the motor 52, and detects the rotation speed of the motor 52 to transmit a speed detection signal S58 representing the rotation speed of the rotation section 104 to the control section 55. When a power supply is turned on, the switch section 60 transmits a switch signal S60 to the control section 55. The switch signal S60 represents power-off or power-on information. An on/off operation of the switch section 60 is performed by a user.

The encoder 58 corresponds to a specific example of "a rotation detection section" in the invention.

The control section 55 controls the motor 52 to rotate at a predetermined rotation (modulation) speed based on the synchronization signal Ss and the speed detection signal S58. The power supply section 57 is connected to the slip ring 51, the control section 55 and the I/F substrate 56 to supply power for each substrate drive to the connection substrate 11, the control section 55 and the I/F substrate 56.

In this example, when an error amount in a servo control system performing rotation control of the rotation section 104 exceeds a certain amount to cause nonuniform rotation, the control section 55 controls the rotation section 104 to immediately stop a rotation operation. The encoder 58 detects the rotation of the rotation section 104 rotated by the motor 52.

The control section 55 performs comparison between a rotation detection value obtained from the encoder 58 and a predetermined rotation reference value, and controls the motor 52 according to a result of the comparison. More specifically, in the case where a rotation detection value equal to or higher than the rotation reference value is detected, the motor 52 is controlled so as to stop the rotation operation of the rotation section 104. Thus, in the omnidirectional stereoscopic picture display 10, when the error amount in the servo control system performing the rotation control of the rotation section 104 exceeds the certain value, the rotation operation is allowed to be stopped immediately. Therefore, rotation runaway of the rotation section 104 is preventable to secure safety. Therefore, a breakdown in the omnidirectional stereoscopic picture display 10 is preventable.

Figure 19:
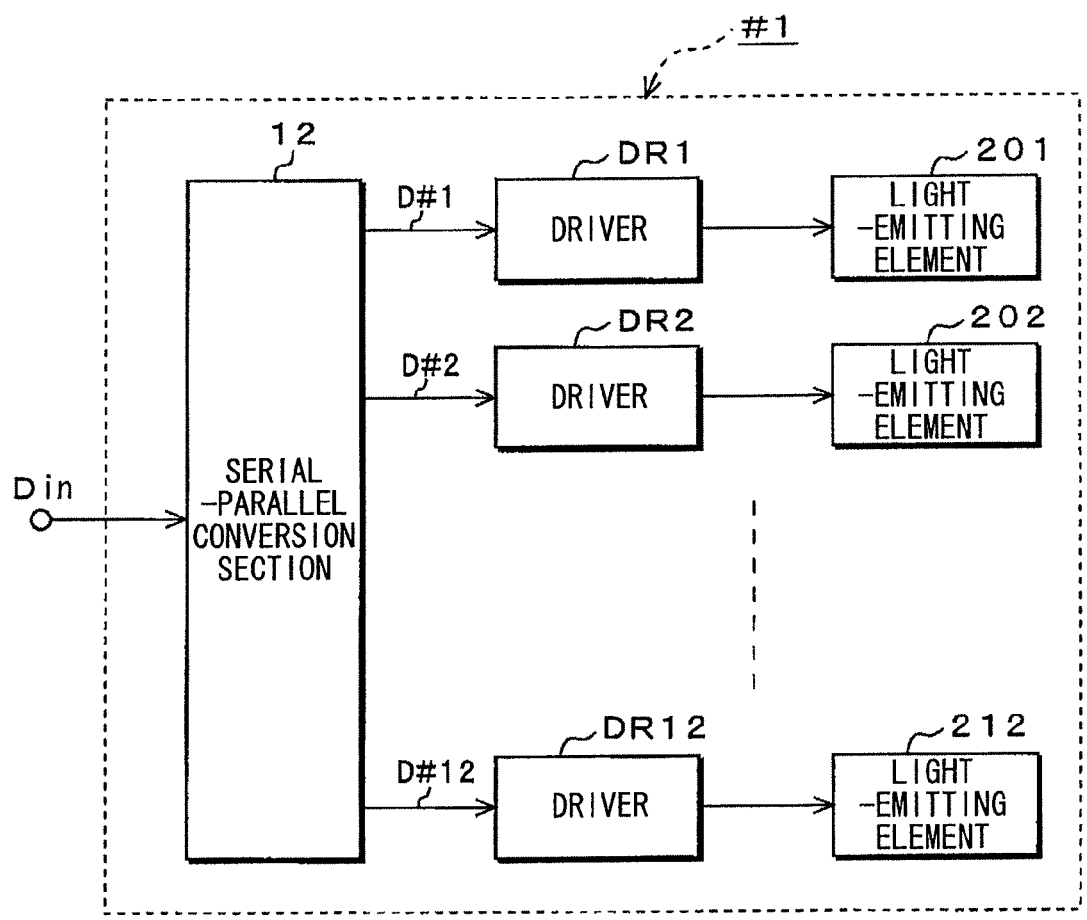

FIG. 19 is a block diagram illustrating a configuration example of one one-dimensional light-emitting element substrate #1 or the like. The one-dimensional light-emitting element substrate #1 or the like illustrated in FIG. 19 is configured by including one serial-parallel conversion section 12, a number m of drivers DRj (j=1 to m) and a number m of light-emitting elements 20j (j=1 to m). In this example, a case where the number m is 12 (rows) will be described. The serial-parallel conversion section 12 is connected to the connection substrate 11, and serial picture data Din for stereoscopic picture display for a first line is converted into parallel picture data D#j (j=1 to m) for stereoscopic picture display for first to twelfth rows.

Twelve drivers DR1 to DR12 (drive circuits) are connected to the serial-parallel conversion section 12. The light-emitting element 201 in a first row is connected to the driver DR1. The light-emitting element 201 emits light based on picture data D#1 for stereoscopic picture display for the first row. The light-emitting element 202 in a second row is connected to the driver DR2. The light-emitting element 202 emits light based on picture data D#2 for stereoscopic picture display for the second row.

Likewise, the light-emitting elements 203 to 212 in third to twelfth rows are connected to the drivers DR3 to DR12, respectively. The light-emitting elements 203 to 212 emit light based on picture data D#3 to D#12 for stereoscopic picture display for the third to twelfth rows, respectively. Therefore, the twelve light-emitting elements 201 to 212 sequentially emit light based on serial picture data Din for stereoscopic picture display for the first line. In this example, one serial-parallel conversion section 12 and the number m of drivers DRj configure the IC 35 for serial-parallel conversion and for driver illustrated in FIG. 5. Other one-dimensional light-emitting element substrates #2 to #n have the same configuration and functions as those of the one-dimensional light-emitting element substrate #1, and will not be further described.

[Stereoscopic Picture Display Example]

Figure 20:
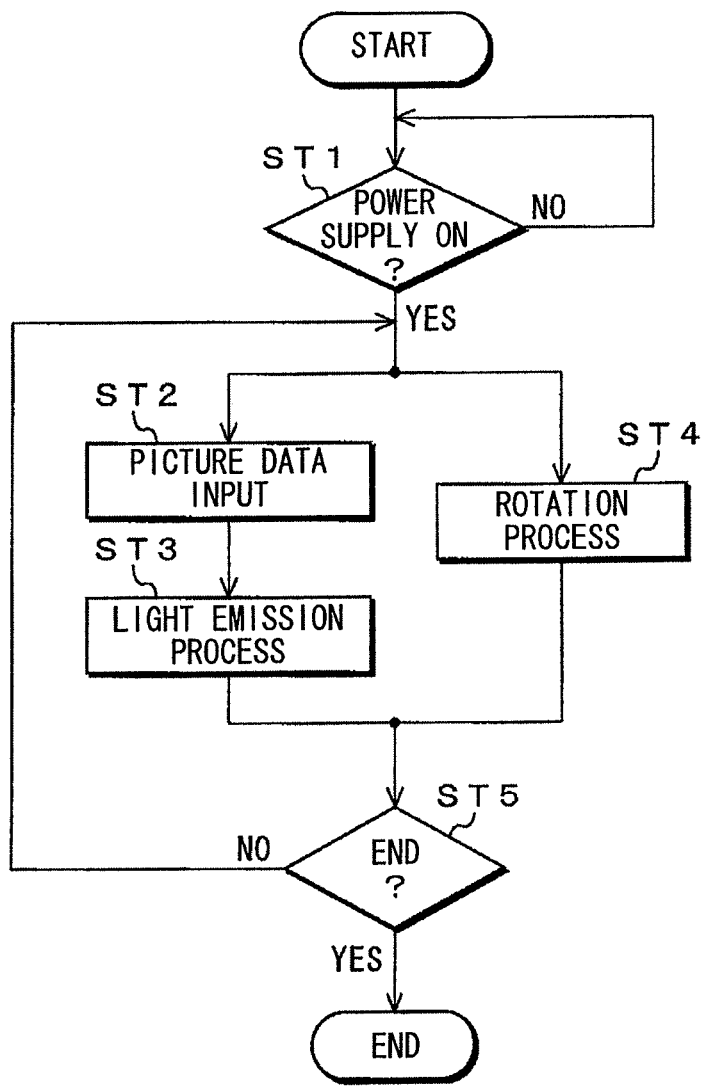
FIG. 20 is an operation flowchart illustrating a stereoscopic picture display example in the omnidirectional stereoscopic picture display 10.

Next, an operation example of the omnidirectional stereoscopic picture display 10 in a stereoscopic picture display method according to the invention will be described below. FIG. 20 is an operation flowchart illustrating a stereoscopic picture display example in the omnidirectional stereoscopic picture display 10. In the omnidirectional stereoscopic picture display 10, as illustrated in FIG. 1, the rotation section 104 has a predetermined diameter and a predetermined length, and has the slit 102 in a direction of a circumferential surface parallel to the rotation shaft 103. This example is based on a case where the two-dimensional light-emitting element array 101 is mounted in the rotation section 104, and the rotation section 104 rotates to display a stereoscopic picture.

The picture data Din for stereoscopic picture applied in this case is obtained by picking up images of an arbitrary subject from N points at equal intervals around an entire circumference with use of one image pickup system including the number n×m of image pickup elements. Two-dimensional picture data Din for N points×m rows obtained by image pickup is transmitted. Then, one light-emitting unit U1 configured of the two-dimensional light-emitting element array 101 and the slit 102 reproduces a stereoscopic picture of an entire circumference of the subject. The display control section 15 performs light-emission control of a plurality of light-emitting elements so that, for example, a planar picture based on the two-dimensional picture data Din is formed inside the rotation section 104 by a trail of light-emission points by the plurality of light-emitting elements when viewing from one arbitrary viewpoint position corresponding to one of the number n of image pickup positions in a direction of the rotation shaft 103.

These are considered as operation conditions, and in the omnidirectional stereoscopic picture display 10, first, in step ST1, the control section 55 detects whether a power supply is turned on or not. At this time, a user turns the switch section 60 on when the user views a stereoscopic picture. When the power supply is turned on, the switch section 60 transmits the switch signal S60 representing power-on information to the control section 55. When the control section 55 detects the power-on information based on the switch signal S60, a stereoscopic picture display process is executed.

Next, in step ST2, the connection substrate 11 receives the picture data Din for stereoscopic picture to be supplied to the two-dimensional light-emitting element array 101 mounted in the rotation section 104. As illustrated in FIG. 16, the picture data Din represents order of sequentially reproducing a number N=60 of image pickup positions by a number m=12 (rows) of light-emitting elements 201 to 212 of the two-dimensional light-emitting element array 101, as well as order of 60 consecutive image pickup positions. In the picture source transmission device 90, corresponding picture data Din for stereoscopic picture display is extracted from two-dimensional picture data Din for 60 points×12 rows.

The picture source transmission device 90 executes an alignment operation process of rearranging data alignment on a line data basis in a slit direction (a vertical direction) illustrated in FIG. 17. Then, the picture source transmission device 90 converts collected shooting data into emission light data of 12 (rows of) light-emitting elements 201 to 212 in the two-dimensional light-emitting element array 101 for respective light emission times. The emission light data reproduced at the time t=0 to t=59T obtained thereby is picture data Din for stereoscopic picture. The picture data Din is supplied from the picture source transmission device 90 into the mounting base 105, and in the mounting base 105, the picture data Din is transmitted with power to the two-dimensional light-emitting element array 101 of the rotation section 104 through the slip ring 51.

Next, in step ST3, the light-emitting elements 201 to 212 emit light based on the picture data Din. In this example, the two-dimensional light-emitting element array 101 has an arc-shaped light-emission surface; therefore, light emitted from the light-emission surface is condensed in a direction of the slit 102 (refer to FIG. 16). Light emitted from the light-emitting elements 201 to 212 is condensed around the slit 102 of the rotation section 104.

In parallel with this, in step ST4, the rotation section 104 including the two-dimensional light-emitting element array 101 rotates at a predetermined speed. At this time, the motor 52 in the mounting base 105 allows the turntable 42 to rotate at a predetermined rotation (modulation) speed. When the turntable 42 rotates, the rotation section 104 rotates.

The encoder 58 mounted on the motor 52 detects the rotation speed of the motor 52 to transmit the speed detection signal S58 representing the rotation speed of the rotation section 104 to the control section 55. The control section 55 controls the motor 52 to rotate at the predetermined rotation (modulation) speed based on the speed detection signal S58. Therefore, the rotation section 104 is allowed to rotate at the predetermined modulation speed. In the omnidirectional stereoscopic picture display 10, light of a stereoscopic picture formed with reference to the rotation shaft 103 of the rotation section 104 is leaked from the interior of the rotation section 104 to outside through the slit 102. The light leaked to outside provides a stereoscopic picture to a plurality of viewpoints.

Note that in step ST5, the control section 55 determines whether or not to stop the stereoscopic picture display process. For example, the control section 55 detects power-off information based on the switch signal S60 from the switch section 60 to stop the stereoscopic picture display process. In the case where the power-off information from the switch section 60 is not detected, the stereoscopic picture display process continues by returning to the steps ST2 and ST4.

Thus, in the omnidirectional stereoscopic picture display 10 according to the first embodiment, light emitted from the light-emitting elements 201 to 212 is condensed around the slit 102 of the rotation section 104. By light condensing, light of a stereoscopic picture formed with reference to the rotation shaft 103 of the rotation section 104 is leaked from the interior of the rotation section 104 to outside through the slit 102.

Therefore, as rotational scanning with reference to a viewpoint of an observer is allowed to be performed on the light-emission surface of the two-dimensional light-emitting element array 101, a stereoscopic picture formed with reference to the rotation shaft 103 is viewable from the outside of the rotation section 104. Therefore, compared to a stereoscopic picture mechanism in related art, the omnidirectional stereoscopic picture display 10 viewable from all direction with a simpler configuration and higher power efficiency is easily achievable. Moreover, various 3D polygons which are not allowed to be displayed on a flat display in related art are allowed to be displayed; therefore, stereoscopic character trademark service is allowed to be provided.

In the above-described embodiment, the case where the picture data Din is transmitted with power to the two-dimensional light-emitting element array 101 through the slip ring 51 is described; however, the invention is not limited thereto. The picture data Din may be transmitted with power from the mounting base 105 to the rotation section 104 with use of a radio communication system.

For example, a coil for power reception and a radio receiver for picture signal are arranged in the rotation section 104. A coil for power transmission and a radio transmitter for picture signal are arranged in the mounting base 105. A radio receiver and a radio transmitter each including an antenna are used. A feeder is connected to the coil for power reception, and the feeder is connected to the two-dimensional light-emitting element array 101. A signal line is connected to the ratio receiver, and the signal line is connected to the two-dimensional light-emitting element array 101.

In the mounting base 105, the coil for power transmission is arranged in a position linked with the coil for power reception of the rotation section 104. A cable for power feed is connected to the coil for power transmission to supply power to the coil for power transmission from outside. Likewise, the ratio transmitter is arranged in a position which is allowed to communicate with the ratio receiver of the rotation section 104. A cable for picture signal is connected to the radio transmitter to supply picture data Din to the radio transmitter from the picture source transmission device 90 or the like.

Therefore, power supplied from outside is allowed to be taken by electromagnetic induction and be transmitted to the two-dimensional light-emitting element array 101. Moreover, the picture data Din supplied from the picture source transmission device 90 is allowed to be transmitted to the two-dimensional light-emitting element array 101 through electromagnetic waves. Note that an antenna of the radio receiver-cum-coil for power reception may be used, and an antenna for radio transmitter-cum-coil for power transmission may be used. In this case, the frequency of a voltage (a current) served for electromagnetic induction may be the carrier frequency of an electromagnetic wave. Needless to say, a battery, picture data or the like may be installed in the rotation section 104. The picture data Din may be written to a storage device to be read to the two-dimensional light-emitting element array 101 in the rotation section 104.

Note that in the case where one light-emitting unit U1 is used, a phenomenon in which the light-emitting unit U1 self-vibrates due to core eccentricity is considered; therefore, a balancer may be arranged so that the rotation shaft 103 coincides with a barycenter. The balancer may have substantially the same weight as that of the two-dimensional light-emitting element array 101, and may be arranged in a position different from the position of the two-dimensional light-emitting element array 101 by 180°. Needless to say, the number of balancers is not limited to one, and one balancer may be arranged at every 120°. Such a configuration allows the rotation section 104 to smoothly rotate.

Moreover, while the omnidirectional stereoscopic picture display 10 performs an rotation operation, for example, the case where self-vibrations start due to core eccentricity caused by coming the balancer off or the case where large vibrations or the like are applied from outside is expected. In such a case, when the rotation section 104 rotates in a state where the rotation shaft 103 does not coincide with the barycenter, a situation (breakdown) where the rotation section 104 or the two-dimensional light-emitting element array 101 is not allowed to maintain a predetermined shape is expected.

Therefore, a vibration detection section 59 such as an acceleration sensor or a vibration sensor is mounted in the mounting base 105, and in the case where the control section 55 detects a vibration value equal to or higher than a predetermined value, the rotation section 104 may be controlled to immediately stop the rotation operation.

The omnidirectional stereoscopic picture display 10 illustrated in FIG. 18 includes the control section 55 and the vibration detection section 59. The vibration detection section 59 detects vibrations of the rotation section 104 rotated by the motor 52 in the mounting base 105 to transmit a vibration detection signal S59. The control section 55 performs comparison between the vibration detection value based on the vibration detection signal S59 obtained from the vibration detection section 59 and a predetermined vibration reference value, and controls the motor 52 according to a result of the comparison. More specifically, in the case where a vibration detection value equal to or higher than the vibration reference value is detected, the motor 52 is controlled to stop the rotation operation of the rotation section 104.

Thus, in the vibration detection section 59 such as an acceleration center detects vibrations of the mounting base 105, and when the vibration amount exceeds a predetermined value, the rotation operation is allowed to be stopped immediately. Therefore, rotation runaway of the rotation section 104 is preventable to secure safety. Therefore, a breakdown in the omnidirectional stereoscopic picture display 10 is preventable.

<Second Embodiment>
[Configuration Example of Omnidirectional Stereoscopic Picture Display 20]

Figure 21:
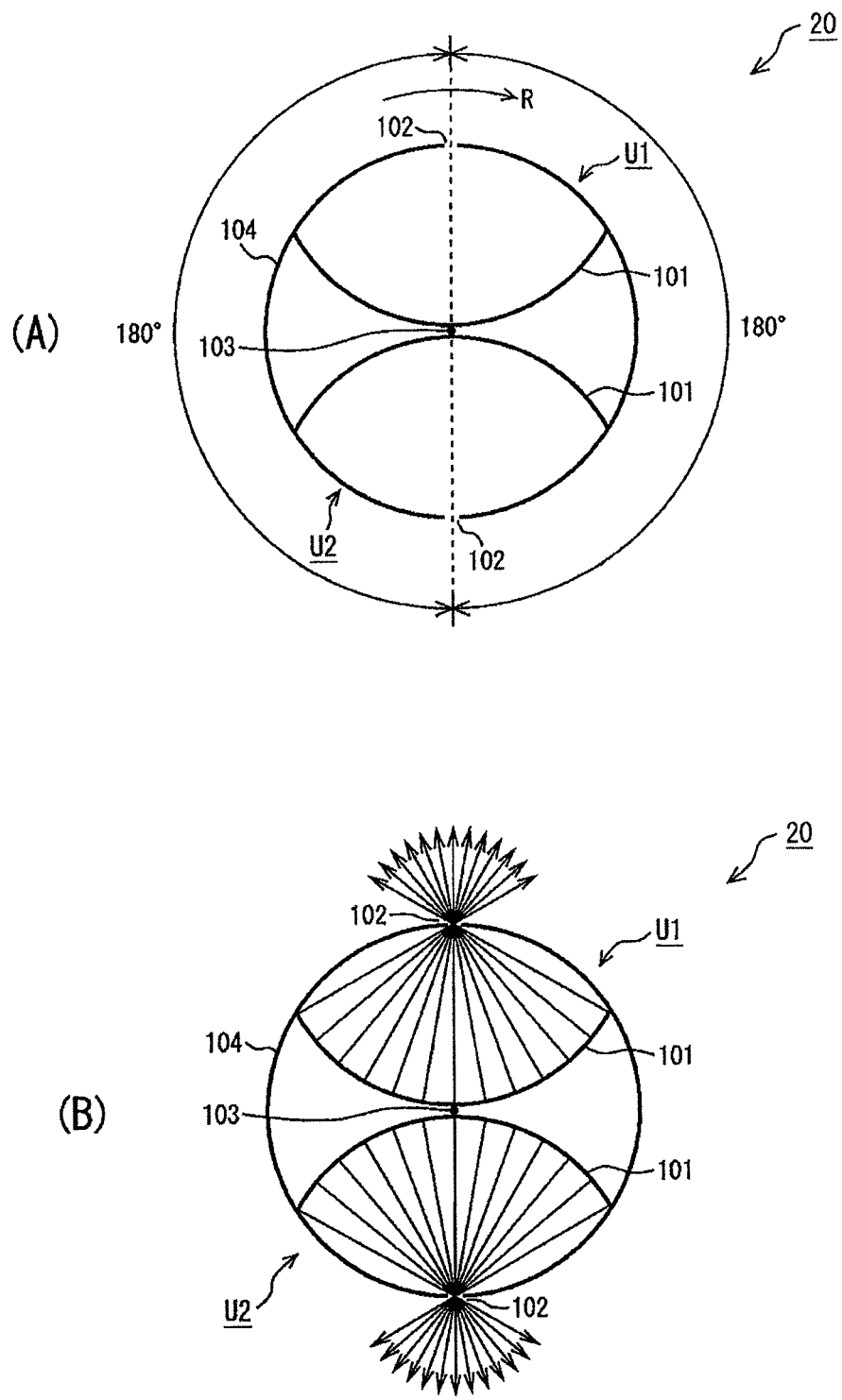
[FIG. 21]

FIGS. 21A and B are a sectional view illustrating a configuration example of an omnidirectional stereoscopic picture display 20 according to a second embodiment, and an illustration of an operation example thereof. As a configuration relating to the number of light-emitting units U1 configured of the two-dimensional light-emitting element array 101 and the slit 102, any of various configurations in addition to the above-described configuration may be applied. For example, a configuration in which two light-emitting units U1 using the cylindrical two-dimensional light-emitting element array 101 are used may be considered.

The omnidirectional stereoscopic picture display 20 illustrated in FIG. 21A uses an integral imaging method, and has a configuration in which two light-emitting units U1 and U2 are included and the rotation section 104 rotates around the rotation shaft 103 as a rotation center in a direction indicated by an arrow R or a direction opposite thereto.

In the omnidirectional stereoscopic picture display 20, two slits 102 are arranged in the exterior body 41 at equal angle intervals (180°) around the rotation shaft 103 as an origin point of the rotation section 104. The light-emitting unit U1 includes one of the slits 102, and the light-emitting unit U2 includes the other slit 102. The two-dimensional light-emitting element array 101 of the light-emitting unit U1 is arranged between the exterior body 41 and the rotation shaft 103 so that a light-emission surface thereof faces the one slit 102 of the rotation section 104. The two-dimensional light-emitting element array 101 of the light-emitting unit U2 is arranged between the exterior body 41 and the rotation shaft 103 so that a light-emission surface thereof faces the other slit 102 of the rotation section 104.

In the omnidirectional stereoscopic picture display 20, the silt 102 parallel to the rotation shaft 103 is arranged in the exterior body 41 in front of the light-emission surface of the two-dimensional light-emitting element array 101 of the light-emitting unit U1. Also, in this example, a configuration in which light emitted from the two-dimensional light-emitting element array 101 is not leaked from any part except for the slit part is applied. The other light-emitting unit U2 has the same configuration.

[Operation Example]

By this two-slit configuration, the emission angle in a lateral direction with respect to the slit 102 of light emitted from the two-dimensional light-emitting element array 101 of the light-emitting unit U1 illustrated in FIG. 21B is largely limited. Likewise, the emission angle in a lateral direction with respect to the slit 102 of light emitted from the two-dimensional light-emitting element array 101 of the light-emitting unit U2 is largely limited. When the rotation section 104 with such two-slit configuration is subjected to rotational scanning with respect to a viewpoint, a cylindrical integral imaging plane is allowed to be formed. Light of a stereoscopic picture formed with reference to the rotation shaft 103 is leaked from the interior of the rotation section 104 to outside through the two slits 102.

Thus, in the omnidirectional stereoscopic picture display 20 according to the second embodiment, light from two two-dimensional light-emitting element arrays 101 is emitted to different directions, respectively; therefore, integral imaging for 2 vertical lines limited by the two slits 102 is allowed. Therefore, a stereoscopic picture with high resolution formed by light emitted from the two two-dimensional light-emitting element arrays 101 is viewable.

<Third Embodiment>
[Configuration Example of Omnidirectional Stereoscopic Picture Display 30]

Figure 22:
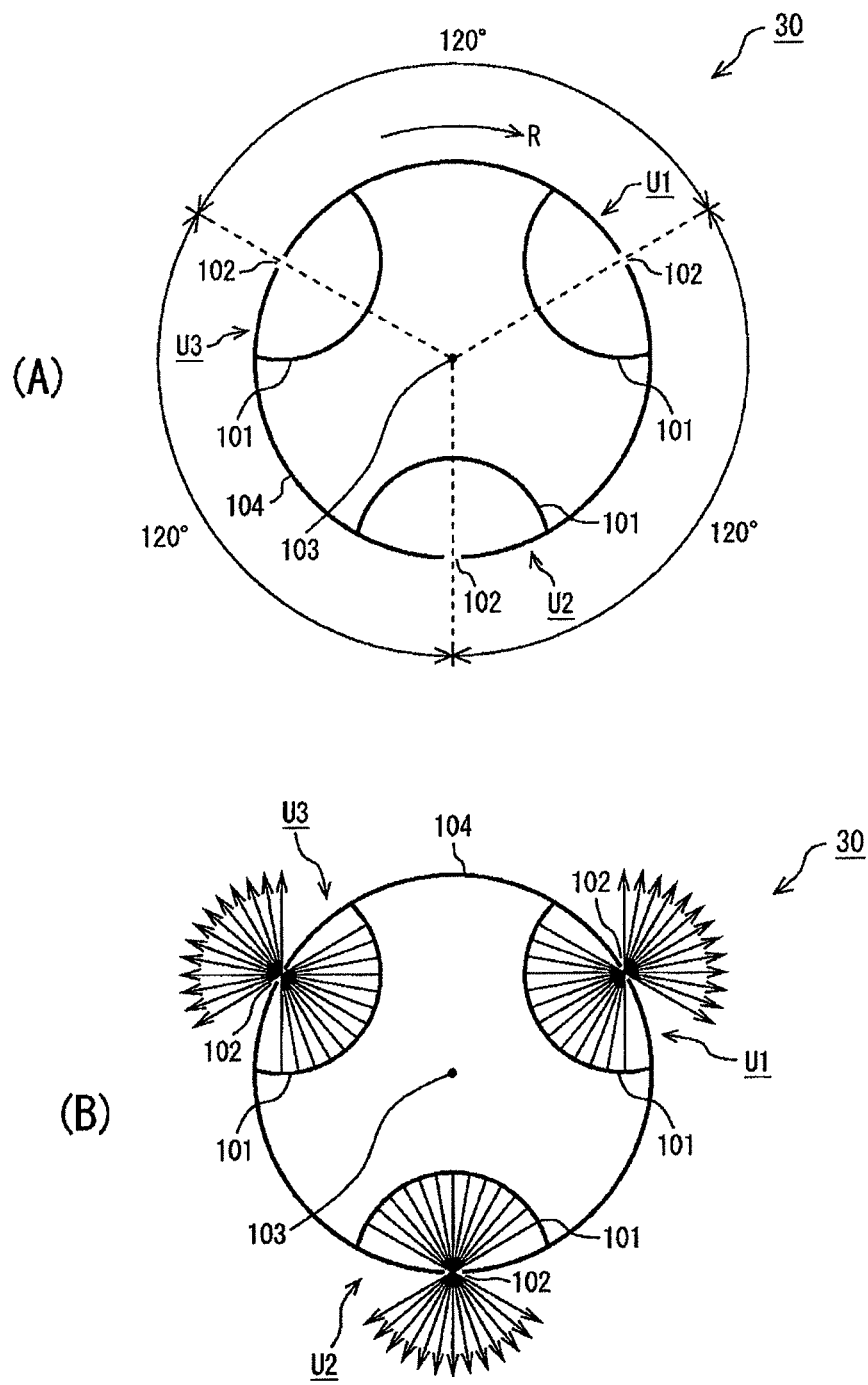
[FIG. 22]

FIGS. 22A and B are a sectional view illustrating a configuration example of an omnidirectional stereoscopic picture display 30 according to a third embodiment and an illustration of an operation example thereof. In this embodiment, some two-dimensional light-emitting element arrays 101 each emitting a single color with a different wavelength are mounted; therefore, color display is allowed to be executed without complicating the configuration of the two-dimensional light-emitting element arrays 101.

The omnidirectional stereoscopic picture display 30 illustrated in FIG. 22A uses an integral imaging method, and has a configuration in which three light-emitting units U1, U2 and U3 are included and the rotation section 104 rotates around the rotation shaft 103 as a rotation center in a direction indicated by an arrow R or a direction opposite thereto. In the omnidirectional stereoscopic picture display 30, three slits 102 are arranged in the exterior body 41 at equal angle intervals (120°) around the rotation shaft 103 as an origin point of the rotation section 104. The light-emitting unit U1 includes a first slit 102, the light-emitting unit U2 includes a second slit 102, and the light-emitting unit U3 includes a third slit 102.

In this example, light-emission surfaces of the two-dimensional light-emitting element arrays 101 are arranged between the rotation shaft 103 of the rotation section 104 and the slits 102 to face the slits 102 of the rotation section 104, respectively. For example, the two-dimensional light-emitting element array 101 of the light-emitting unit U1 is arranged between the exterior body 41 and the rotation shaft 103 so that the light-emission surface thereof faces the first slit 102 of the rotation section 104.

The two-dimensional light-emitting element array 101 of the light-emitting unit U2 is arranged between the exterior body 41 and the rotation shaft 103 so that the light-emission surface thereof faces the second slit 102 of the rotation section 104. The two-dimensional light-emitting element array 101 of the light-emitting unit U3 is arranged between the exterior body 41 and the rotation shaft 103 so that the light-emission surface thereof faces the third slit 102 of the rotation section 104. Light-emitting elements with different wavelengths corresponding to the wavelengths of the three two-dimensional light-emitting element arrays 101 are mounted in the two-dimensional light-emitting element arrays 101, respectively. Therefore, color display of a stereoscopic picture is executed by combining light rays with different wavelengths emitted from the three two-dimensional light-emitting element arrays 101.

In the omnidirectional stereoscopic picture display 30, the slit 102 parallel to the rotation shaft 103 is arranged in the exterior body 41 in front of the light-emission surface of the two-dimensional light-emitting element array 101 of the light-emitting unit U1. Also in this example, a configuration in which light emitted from the two-dimensional light-emitting element array 101 is not leaked from any part except for the slit part is applied. The other light-emitting units U2 and U3 have the same configuration.

[Operation Example]
By this three-slit configuration, the emission angle in a lateral direction with respect to the slit 102 of light emitted from the two-dimensional light-emitting element array 101 of the light-emitting unit U1 illustrated in FIG. 22B is largely limited. The emission angle in a lateral direction with respect to the slit 102 of light emitted from the two-dimensional light-emitting element array 101 of the light-emitting unit U2 is largely limited. Likewise, the emission angle in a lateral direction with respect to the slit 102 of light emitted from the two-dimensional light-emitting element array 101 of the light-emitting unit U3 is largely limited.

When the rotation section 104 with such a three-slit configuration is subjected to rotational scanning with respect to a viewpoint, a cylindrical integral imaging plane is allowed to be formed. Light of a stereoscopic picture formed with reference to the rotation shaft 103 is leaked from the interior of the rotation section 104 to outside through three slits 102.

Thus, in the omnidirectional stereoscopic picture display 30 according to the third embodiment, light from the three two-dimensional light-emitting element arrays 101 is emitted to different directions; therefore, integral imaging for 3 vertical lines limited by three slits 102 is allowed. Therefore, a color stereoscopic picture with high resolution formed by, for example, light of R color, G color and B color emitted from three two-dimensional light-emitting element arrays 101 with different wavelengths is viewable.

<Fourth Embodiment>
[Configuration Example of Omnidirectional Stereoscopic Picture Display 40]

Figure 23:
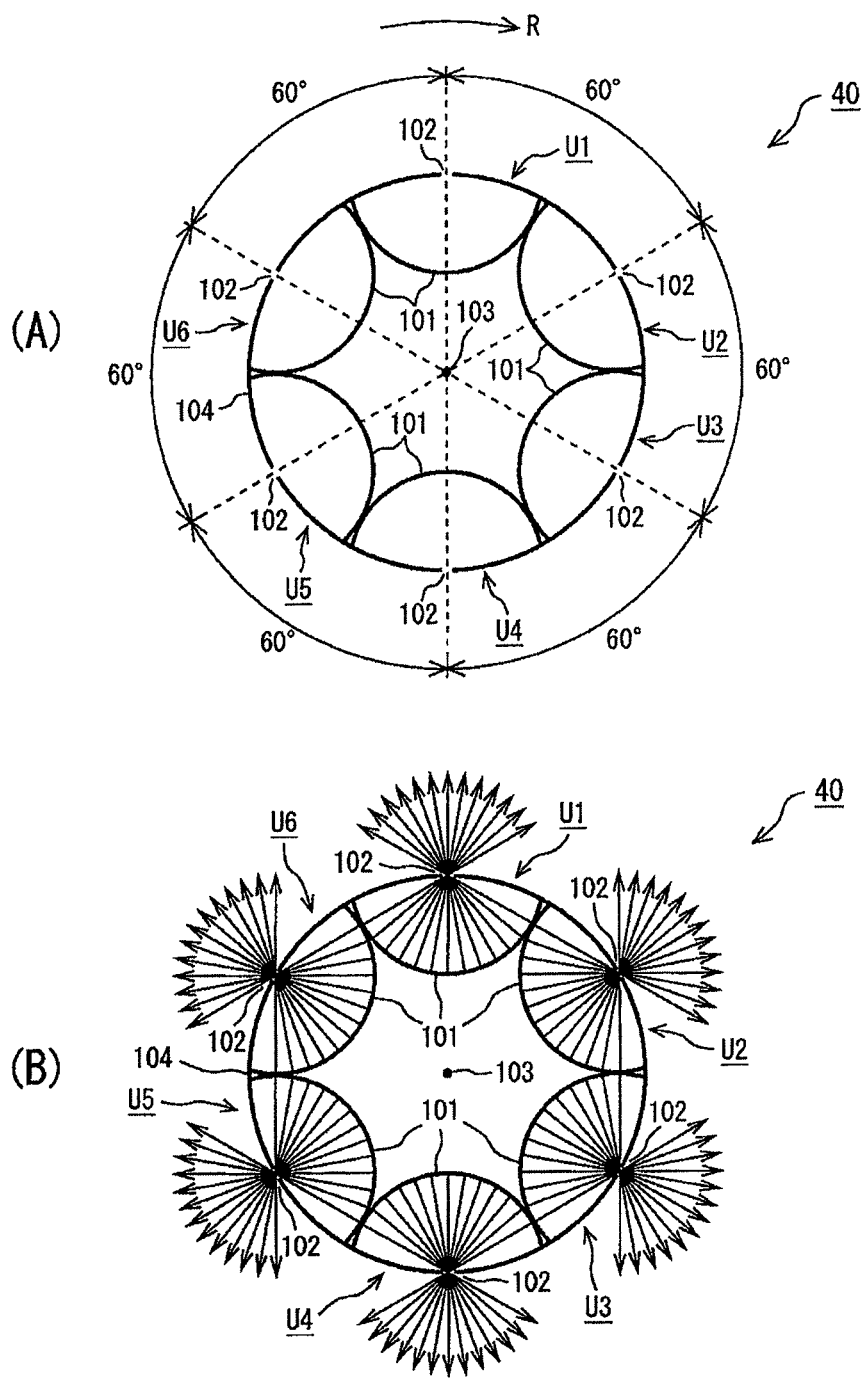
[FIG. 23]

FIGS. 23A and B are a sectional view illustrating a configuration example of an omnidirectional stereoscopic picture display 40 according to a fourth embodiment and an illustration of an operation example thereof. The omnidirectional stereoscopic picture display 30 illustrated in FIG. 22A uses an integral imaging method, and has a configuration in which six light-emitting units U1, U2, U3, U4, U5 and U6 are included and the rotation section 104 rotates around the rotation shaft 103 as a rotation center in a direction indicated by an arrow R or a direction opposite thereto.

In the omnidirectional stereoscopic picture display 40, six slits 102 are arranged in the exterior body 41 at equal angle intervals (60°) around the rotation shaft 103 as an origin point of the rotation section 104. The light-emitting units U1, U2, U3, U4, U5 and U6 include a first slit 102, a second slit 102, a third slit 102, a fourth slit 102, a fifth silt 102 and a sixth slit 102, respectively.

In this example, light-emission surfaces of the two-dimensional light-emitting element arrays 101 are arranged between the rotation shaft 103 of the rotation section 104 and the slits 102 so as to face the slits 102 of the rotation section 104, respectively. For example, the two-dimensional light-emitting element array 101 of the light-emitting unit U1 is arranged between the exterior body 41 and the rotation shaft 103 so that the light-emission surface thereof faces the first slit 102 of the rotation section 104.

The two-dimensional light-emitting element array 101 of the light-emitting unit U2 is arranged between the exterior body 41 and the rotation shaft 103 so that the light-emission surface thereof faces the second slit 102 of the rotation section 104. The two-dimensional light-emitting element array 101 of the light-emitting unit U3 is arranged between the exterior body 41 and the rotation shaft 103 so that the light-emission surface thereof faces the third slit 102 of the rotation section 104.

The two-dimensional light-emitting element array 101 of the light-emitting unit U4 is arranged between the exterior body 41 and the rotation shaft 103 so that the light-emission surface thereof faces the fourth slit 102 of the rotation section 104. The two-dimensional light-emitting element array 101 of the light-emitting unit U5 is arranged between the exterior body 41 and the rotation shaft 103 so that the light-emission surface thereof faces the fifth slit 102 of the rotation section 104. The two-dimensional light-emitting element array 101 of the light-emitting unit U6 is arranged between the exterior body 41 and the rotation shaft 103 so that the light-emission surface thereof faces the sixth slit 102 of the rotation section 104.

In the omnidirectional stereoscopic picture display 40, the slit 102 parallel to the rotation shaft 103 is arranged in the exterior body 41 in front of the light-emission surface of the two-dimensional light-emitting element array 101 of the light-emitting unit U1. Also in this example, a configuration in which light emitted from the two-dimensional light-emitting element array 101 is not leaked from any part except for the slit part is applied. The other light-emitting units U2 to U6 have the same configuration.

[Operation Example]

By this six-slit configuration, the emission angle in a lateral direction with respect to the slit 102 of light emitted from the two-dimensional light-emitting element array 101 of the light-emitting unit U1 illustrated in FIG. 23B is largely limited. The emission angle in a lateral direction with respect to the slit 102 of light emitted from the two-dimensional light-emitting element array 101 of the light-emitting unit U2 is largely limited. The emission angle in a lateral direction with respect to the slit 102 of light emitted from the two-dimensional light-emitting element array 101 of the light-emitting unit U3 is largely limited.

The emission angle in a lateral direction with respect to the slit 102 of light emitted from the two-dimensional light-emitting element array 101 of the light-emitting unit U4 is largely limited. The emission angle in a lateral direction with respect to the slit 102 of light emitted from the two-dimensional light-emitting element array 101 of the light-emitting unit U5 is largely limited. Likewise, the emission angle in a lateral direction with respect to the slit 102 of light emitted from the two-dimensional light-emitting element array 101 of the light-emitting unit U6 is largely limited.

When the rotation section 104 with such a six-slit configuration is subjected to rotational scanning with respect to a viewpoint, a cylindrical integral imaging plane is allowed to be formed. Light of a stereoscopic picture formed with reference to the rotation shaft 103 is leaked from the interior of the rotation section 104 to outside through the six slits 102.

Thus, in the omnidirectional stereoscopic picture display 40 according to the fourth embodiment, light from the six two-dimensional light-emitting element arrays 101 is emitted to different directions; therefore, integral imaging for 6 vertical lines limited by six slits 102 is allowed.

<Fifth Embodiment>

[Configuration Example of Omnidirectional Stereoscopic Picture Display 50]

Figure 24:
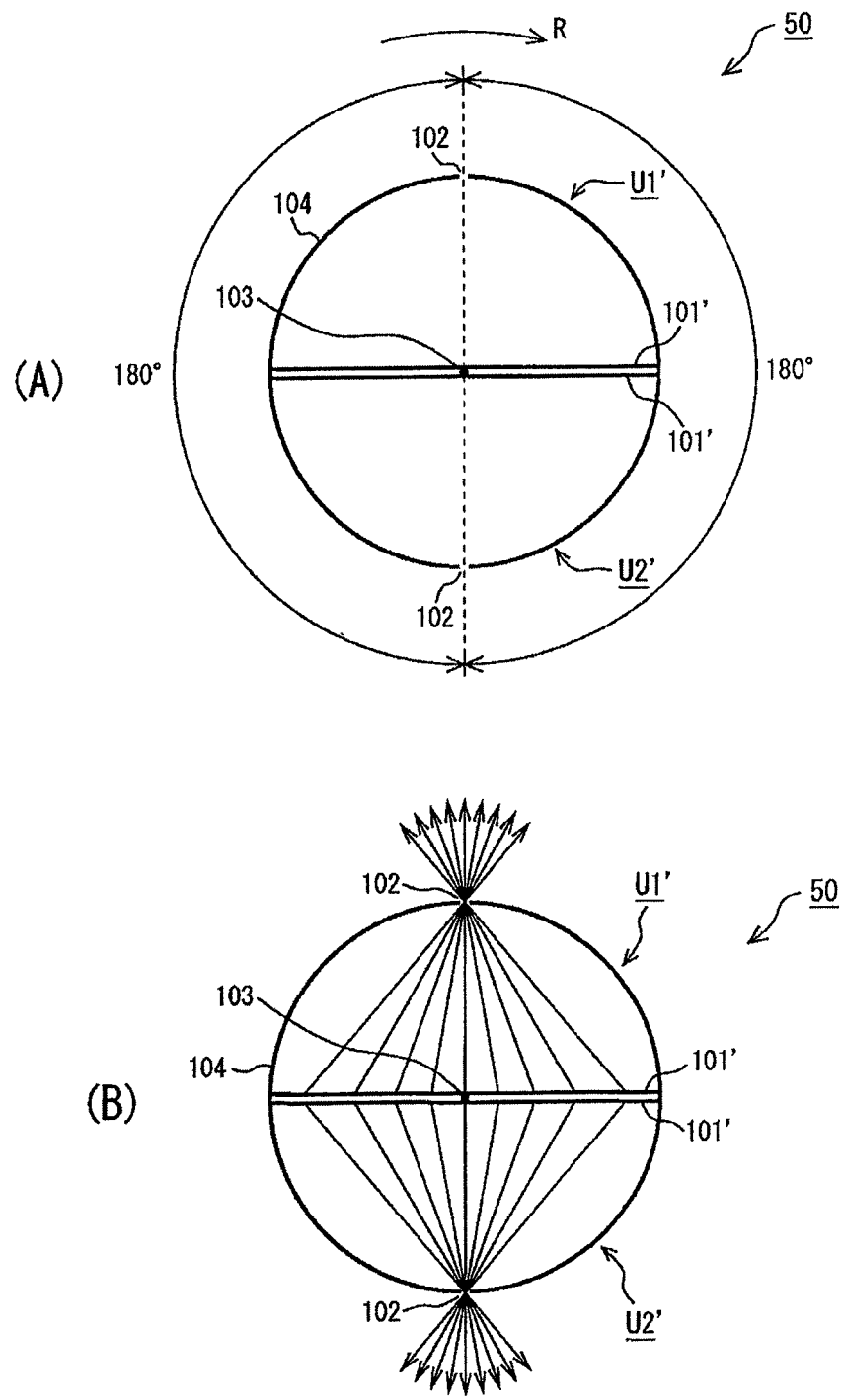
[FIG. 24]

FIGS. 24A and B are a sectional view illustrating a configuration example of an omnidirectional stereoscopic picture display 50 according to a fifth embodiment and an illustration of an operation example thereof. As a configuration relating to the shape of light-emitting unit U1 configured of the two-dimensional light-emitting element array 101 and the slit 102, any of various configurations in addition to the above-described configuration may be applied. For example, a configuration using two light-emitting units U1' each using a planar two-dimensional light-emitting element array 101' is considered.

The omnidirectional stereoscopic picture display 50 illustrated in FIG. 24A uses an integral imaging method, and has a configuration in which two light-emitting units U1' and U2' are included and the rotation section 104 rotates around the rotation shaft 103 as a rotation center in a direction indicated by an arrow R or a direction opposite thereto.

In the omnidirectional stereoscopic picture display 50, two slits 102 are arranged in the exterior body 41 at equal angle intervals (180°) around the rotation shaft 103 as an origin point of the rotation section 104. The light-emitting unit U1' includes one of the slits 102, and the light-emitting unit U2' includes the other slit 102. The two-dimensional light-emitting element array 101' of the light-emitting unit U1' has a planar (flat-shaped) light-emission surface, and the light-emission surface is arranged between the exterior body 41 and the rotation shaft 103 to face the one slit 102 of the rotation section 104. The two-dimensional light-emitting element array 101' of the light-emitting unit U2' is arranged between the exterior body 41 and the rotation shaft 103 to face the other slit 102 of the rotation section 104.

In the omnidirectional stereoscopic picture display 50, the silt 102 parallel to the rotation shaft 103 is arranged in the exterior body 41 in front of the light-emission surface of the two-dimensional light-emitting element array 101' of the light-emitting unit U1'. In this example, a configuration in which light emitted from the two-dimensional light-emitting element array 101' is not leaked from any other part except for the slit part is applied. The other light-emitting unit U2' has the same configuration.

[Operation Example]

By this two-slit configuration, the emission angle in a lateral direction with respect to the slit 102 of light emitted from the two-dimensional light-emitting element array 101' of the light-emitting unit U1' illustrated in FIG. 24B is largely limited. Likewise, the emission angle in a lateral direction with respect to the slit 102 of light emitted from the two-dimensional light-emitting element array 101' of the light-emitting unit U2' is largely limited. When the rotation section 104 with such a two-slit configuration is subjected to rotational scanning with respect to a viewpoint, a cylindrical integral imaging plane is allowed to be formed. In this example, light of a stereoscopic picture formed with reference to the rotation shaft 103 is leaked from the interior of the rotation section 104 to outside through the two slits 102.

Thus, in the omnidirectional stereoscopic picture display 50 according to the fifth embodiment, light from two planar two-dimensional light-emitting element arrays 101' is emitted to different directions; therefore, integral imaging for 2 vertical lines limited by two slit 102 is allowed. Therefore, as in the case of the second embodiment, a stereoscopic picture with high resolution formed by light emitted from the two two-dimensional light-emitting element arrays 101' is viewable.

<Sixth Embodiment>

[Configuration Example of Omnidirectional Stereoscopic Picture Display 60]

Figure 25:
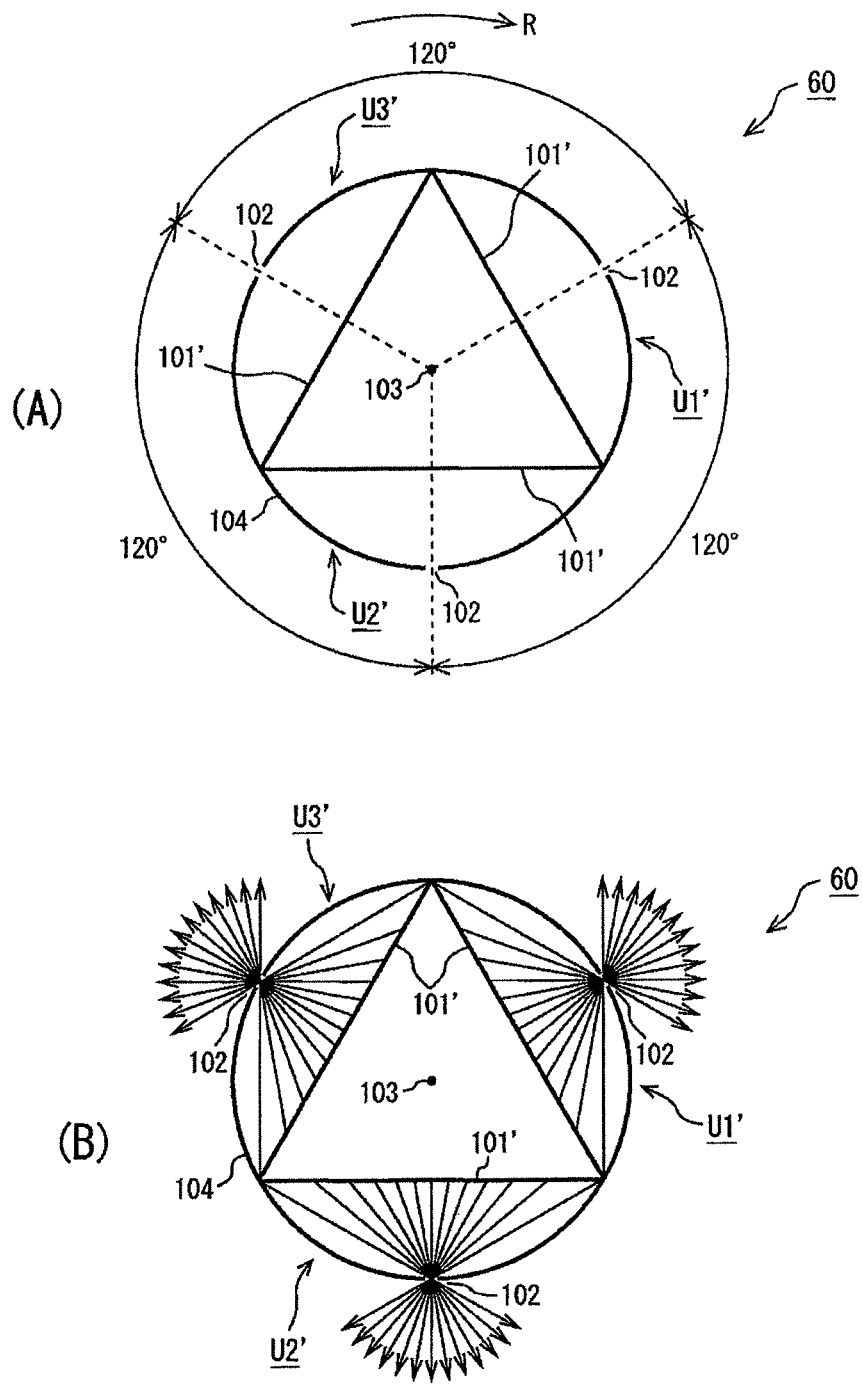
[FIG. 25]

FIGS. 25A and B are a sectional view illustrating a configuration example of an omnidirectional stereoscopic picture display 60 according to a sixth embodiment and an illustration of an operation example thereof. In this embodiment, some planar two-dimensional light-emitting element arrays 101' each emitting a single color with a different wavelength are mounted; therefore, color display is allowed to be executed without complicating the configuration of the two-dimensional light-emitting element arrays 101'.

The omnidirectional stereoscopic picture display 60 illustrated in FIG. 25A uses an integral imaging method, and has a configuration in which three light-emitting units U1', U2' and U3' are included and the rotation section 104 rotates around the rotation shaft 103 as a rotation center in a direction indicated by an arrow R or a direction opposite thereto. In the omnidirectional stereoscopic picture display 60, three slits 102 are arranged in the exterior body 41 at equal angle intervals (120°) around the rotation shaft 103 as an origin point of the rotation section 104. The light-emitting unit U1' includes a first slit 102, the light-emitting unit U2' includes a second slit 102, and the light-emitting unit U3' includes a third slit 102.

In this example, the planar two-dimensional light-emitting arrays 101' are arranged in the exterior body 41 in a regular triangular form. Light-emission surfaces thereof are arranged between the rotation shaft 103 of the rotation section 104 and the slits 102 to face the slits 102 of the rotation section 104, respectively. For example, the two-dimensional light-emitting element array 101' of the light-emitting unit U1' is arranged between the exterior body 41 and the rotation shaft 103 so that the light-emission surface thereof faces the first slit 102 of the rotation section 104.

The two-dimensional light-emitting element array 101' of the light-emitting unit U2' is arranged between the exterior body 41 and the rotation shaft 103 so that the light-emission surface thereof faces the second slit 102 of the rotation section 104. The two-dimensional light-emitting element array 101' of the light-emitting unit U3' is arranged between the exterior body 41 and the rotation shaft 103 so that the light-emission surface thereof faces the third slit 102 of the rotation section 104. Light-emitting elements with different wavelengths corresponding to the wavelengths of the three two-dimensional light-emitting element arrays 101' are mounted in the two-dimensional light-emitting element arrays 101', respectively, and color display of a stereoscopic picture is executed.

In the omnidirectional stereoscopic picture display 60, the slit 102 parallel to the rotation shaft 103 is arranged in the exterior body 41 in front of the light-emission surface of the two-dimensional light-emitting element array 101' of the light-emitting unit U1'. Also in this example, a configuration in which light emitted from the two-dimensional light-emitting element array 101' is not leaked from any part except for the slit part is applied. The other light-emitting units U2' and U3' have the same configuration.

[Operation Example]

By this three-slit configuration, the emission angle in a lateral direction with respect to the slit 102 of light emitted from the two-dimensional light-emitting element array 101' of the light-emitting unit U1' illustrated in FIG. 25B is largely limited. The emission angle in a lateral direction with respect to the slit 102 of light emitted from the two-dimensional light-emitting element array 101' of the light-emitting unit U2' is largely limited. Likewise, the emission angle in a lateral direction with respect to the slit 102 of light emitted from the two-dimensional light-emitting element array 101' of the light-emitting unit U3' is largely limited.

When the rotation section 104 with such a three-slit configuration is subjected to rotational scanning with respect to a viewpoint, a cylindrical integral imaging plane is allowed to be formed. Light of a stereoscopic picture formed with reference to the rotation shaft 103 is leaked from the interior of the rotation section 104 to outside through the three slits 102.

Thus, in the omnidirectional stereoscopic picture display 60 according to the sixth embodiment, light from the three planar two-dimensional light-emitting element arrays 101' is emitted to different directions; therefore, integral imaging for 3 vertical lines limited by three slits 102 is allowed. Therefore, as in the case of the third embodiment, a color stereoscopic picture with high resolution formed by, for example, light of R color, G color and B color emitted from three two-dimensional light-emitting element arrays 101' with different wavelengths is viewable.

<Seventh Embodiment>
[Optimization of Slit Width]

Figure 26:
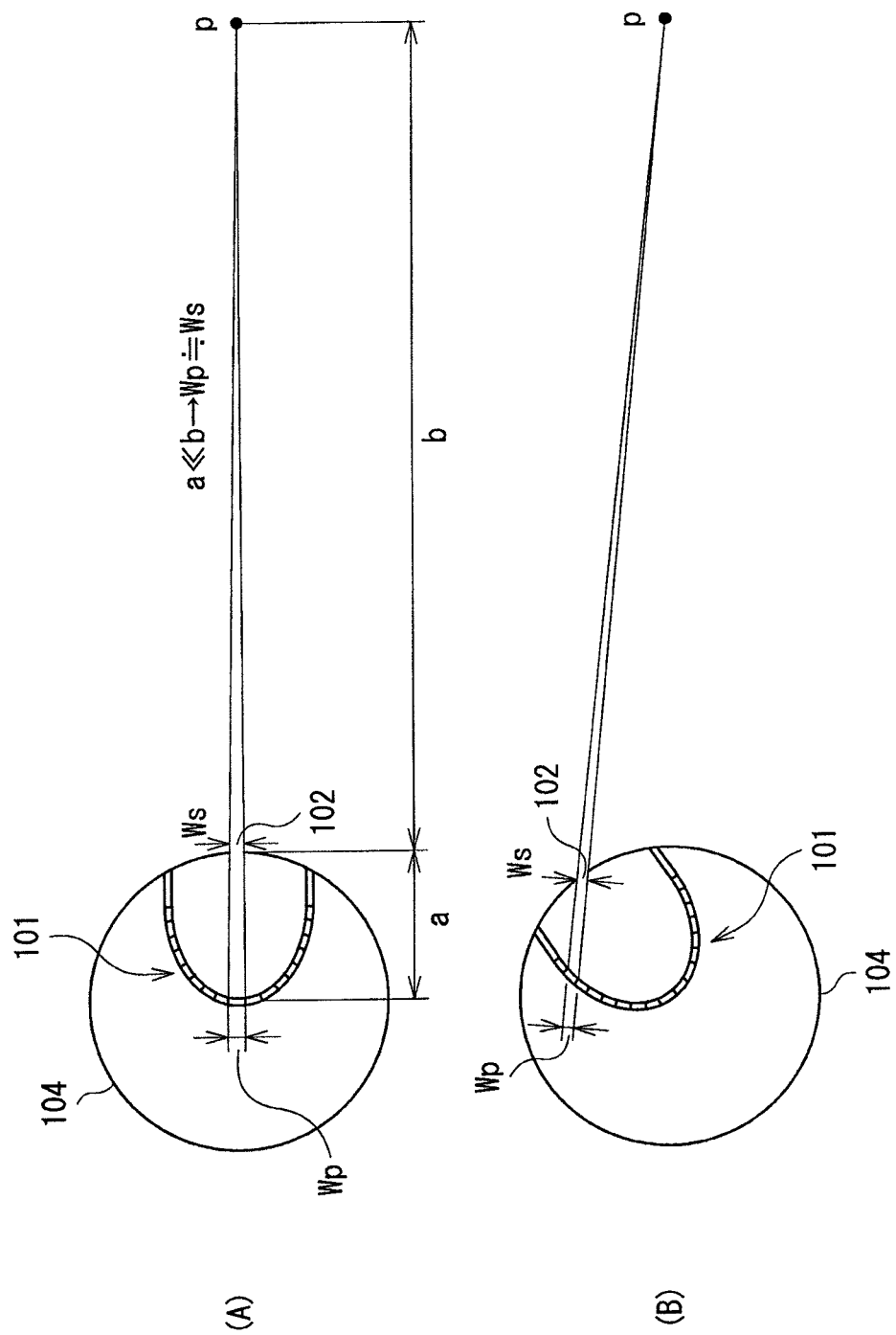
[FIG. 26]

In the embodiment, referring to FIGS. 26(A) and (B), the optimization of the width of the slit 102 in the rotation section 104 will be described with the configuration of the omnidirectional stereoscopic picture display 10 according to the above-described first embodiment as an example. Note that the same optimization may be performed in the omnidirectional stereoscopic picture displays according to other embodiments.

When the two-dimensional light-emitting element array 101 is observed through the slit 102 from an arbitrary viewpoint p at a certain moment, as a width Ws in a shorter axis direction of the slit 102, an observed width is desirably equal to the width of a mounting pitch Wp in a transverse direction of the light-emitting element. When the width equal to the width of the mounting pitch Wp is observed, in the case where the two-dimensional light-emitting element array 101 is observed from a predetermined direction, a state where a light-emission point from approximately one light-emitting element is observable is allowed to be formed. When the observed width is wider than the mounting pitch Wp, light emission patterns of adjacent light-emitting elements are gradually mixed to form a blurred picture. It is because at a certain moment, display data is updated so that one light-emitting element corresponds to one viewpoint p. On the other hand, when the slit width Ws is reduced to reduce the observed width, the picture is less likely to be blurred, but a light amount is reduced to form a dark picture.

Actually, the slit width Ws and the mounting pitch Wp look changed depending on observation time or the position of the viewpoint p. Therefore, the slit width Ws is preferably adjusted so as to be optimized, for example, in a central portion in a picture observed from a certain viewpoint p. For example, as illustrated in FIG. 26(A), a distance between the slit 102 and a central portion of the two-dimensional light-emitting element array 101 is a, and a distance from the slit 102 and the viewpoint p is b. Then, a configuration in which the distance b is sufficiently larger than the distance a and the slit width Ws is equal to the width of the mounting pitch Wp is used. In this case, as illustrated in FIG. 26(A), when the central portion of the two-dimensional light-emitting element array 101 is observed from the viewpoint p through the slit 102, the two-dimensional light-emitting element array 101 is observed with substantially the same width as that of the mounting pitch Wp. In the same configuration, as illustrated in FIG. 26(B), a state where an end portion of the two-dimensional light-emitting element array 101 is observed from the viewpoint p through the slit 102 is considered. In this case, the two-dimensional light-emitting element array 101 is observed through the slit 102 in a diagonal direction. In this case, as the two-dimensional light-emitting element array 101 is observed in a diagonal direction, compared to the state in FIG. 26(A), the observed slit width Ws appears smaller. Moreover, the size of the observed two-dimensional light-emitting element array 101 appears smaller, compared to the state in FIG. 26(A). Accordingly, even in a state where the two-dimensional light-emitting element array 101 is observed in a diagonal direction as illustrated in FIG. 26(B), the two-dimensional light-emitting element array 101 is observed with substantially the same apparent width as that of the mounting pitch Wp.

<Eighth Embodiment>

Figure 27:
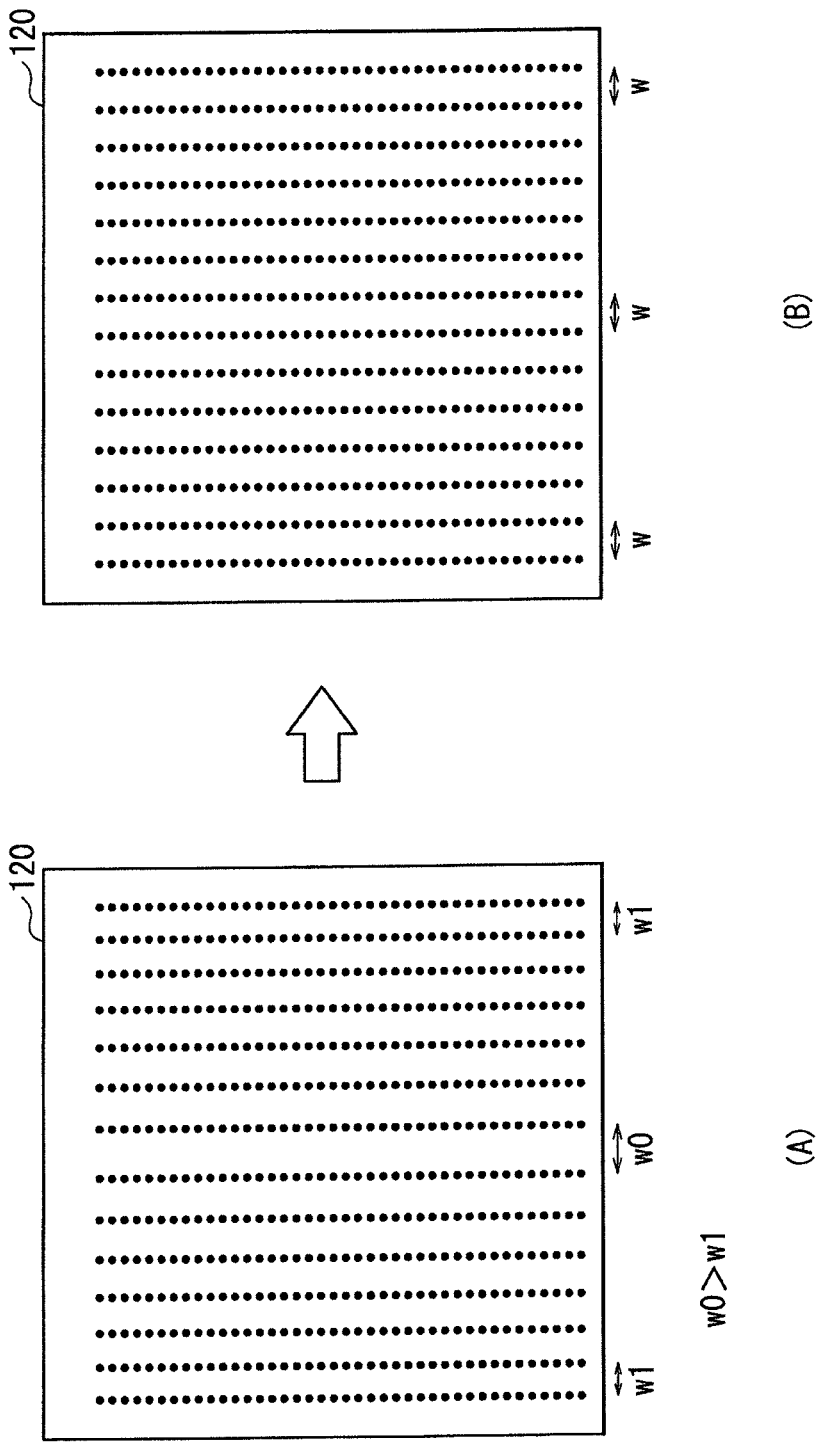
[FIG. 27]

As described in the above-described first embodiment, in the omnidirectional stereoscopic picture display 10, for example, picture display is performed so that a trail of light-emission points by the two-dimensional light-emitting element array 101 with respect to each of 60 viewpoints p=300 to 359, that is, an observed picture display plane is a flat plane. In this case, in the two-dimensional light-emitting element array 101, a plurality of light-emitting elements are arranged at equal intervals on a curved surface, and the plurality of light-emitting elements are simultaneously subjected to picture updating (light-emission control) at the same time. In this case, a display plane 120 observed from an arbitrary viewpoint p is, for example, as illustrated in FIG. 27(A). Black points in the drawing correspond to pixels (a trail of light-emission points). In this case, the observed display plane 120 has an issue that a width w1 between pixels in right and left end portions in a transverse direction appears shorter than a width w0 between pixels in a central portion. However, ideally, as illustrated in FIG. 27(B), it is preferable that the widths w between pixels in the central portion and the right and left end portions are the same as one another (light-emission points are arranged at fixed intervals).

In the embodiment, a technique of achieving ideal picture display illustrated in FIG. 27(B) will be described based on the configuration of the omnidirectional stereoscopic picture display 10 according to the above-described first embodiment. Note that the omnidirectional stereoscopic picture displays according to other embodiments may perform picture display by the same technique.

First, referring to FIGS. 28 and 29, a calculation example of a curved surface shape and positions of light-emitting points (light-emitting elements) of the two-dimensional light-emitting element array 101 for achieving ideal picture display as illustrated in FIG. 27(B) will be described below. Meanings of reference numerals in FIGS. 28 and 29 are the same as those in FIGS. 3 and 4 which are described above.

Figure 28:
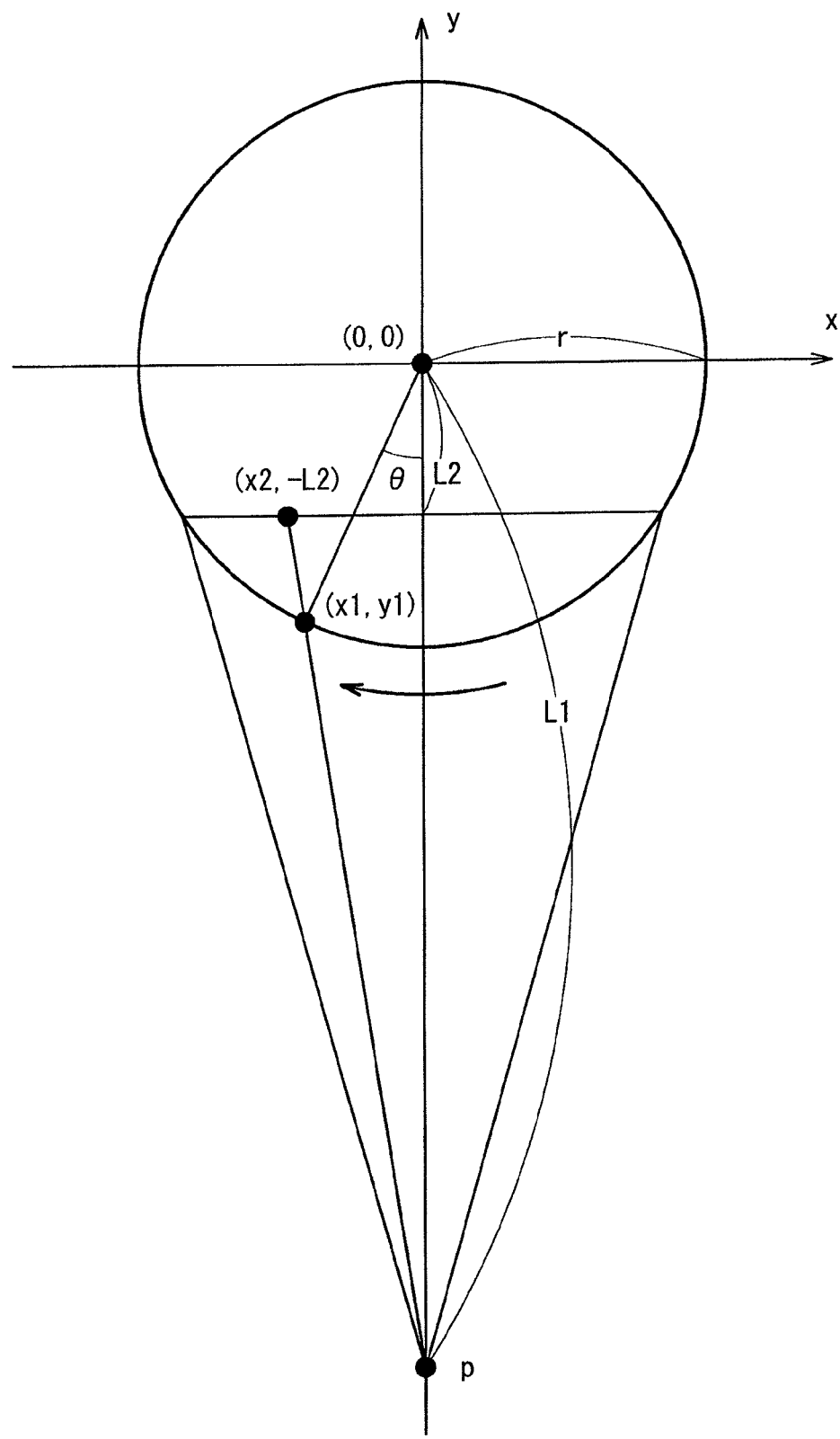
FIG. 28 is an illustration of a calculation example of a curved surface shape and positions of light-emitting points (light-emitting elements) of the two-dimensional light-emitting element array 101.
Figure 29:
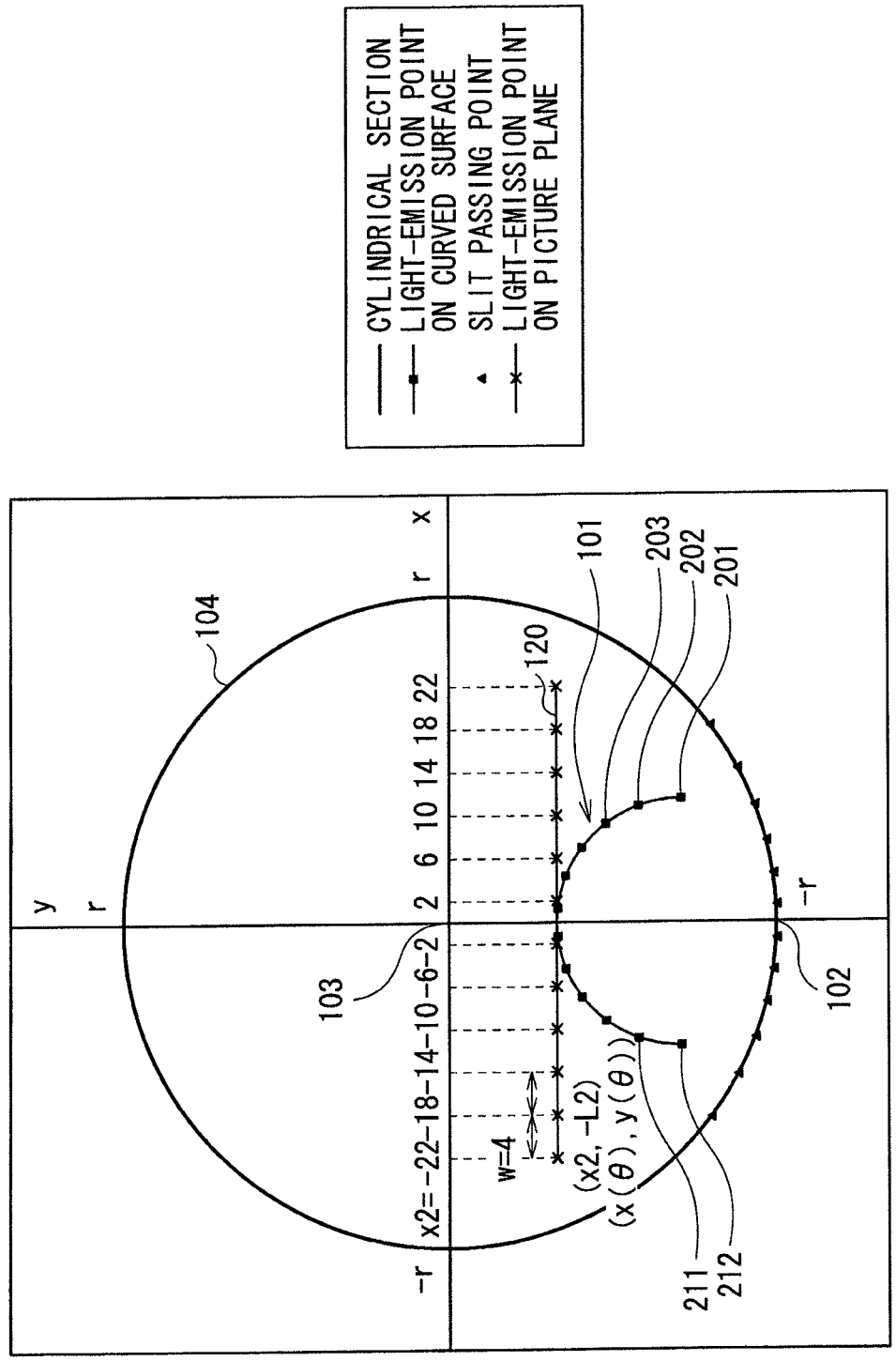
FIG. 29 is an illustration of a specific example of the curved surface shape and positions of light-emitting points (light-emitting elements) of the two-dimensional light-emitting element array 101.

In FIG. 28, a light-emission point (corresponding a pixel indicated in FIG. 27(B)) actually observed from the viewpoint p through the slit 102 is a point (x2, −L2) on y=−L2. Conditions of a pass point (x1, y1) of the slit 102 through which the light-emission point (x2, −L2) is observable is as follows, where L3=L1−L2.

$$x1 = \frac{x2\left\{ L1 \cdot L3 - \sqrt{L3^2 \cdot r^2 + (r^2 - L1^2)x2^2} \right\}}{L3^2 + x2^2}$$ [Mathematical Expression 1]

$$y1 = -\sqrt{r^2 - x1^2}$$

In this case, in the case where an angle θ indicating the position of the slit 102 increases in a rotation direction indicated by an arrow in FIG. 28, the angle θ is as follows:

$$\theta = -\sin^{-1}\theta(x1/r)$$

Therefore, position coordinates (x(θ), y(θ)) of the light-emission point (the light-emitting element) on a curved surface shape (curved shape) in the two-dimensional light-emitting element array 101 is as follows:

$$x(\theta) = x2 \cos\theta + L2 \sin\theta \quad (1A)$$

$$y(\theta) = x2 \sin\theta - L2 \cos\theta \quad (2A)$$

When a time when the slit 102 passes a position at the angle θ=0° is t=0, and time it takes for the slit 102 to rotate one revolution, that is, 360° is Tc, updating timings of the light-emission points of a picture observed from the viewpoint p are as follows:

$$t = Tc \cdot \theta/2\pi \quad (3)$$

[Specific Example]

FIG. 29 illustrates a specific example of the curved surface shape and positions of light-emission points (light-emitting elements) in the curved surface of the two-dimensional light-emitting element array 101 for arranging light-emission points actually observed from the viewpoint p through the slit 102 at equal intervals in a plane. In FIG. 29, L1=90, L2=10 and r=30 are established, and the total number of light-emission points in an x-axis direction is 12, and an interval is 4, and the values of x2 of light-emission points observed at equal intervals are −22, −18, −14, −10, −6, −2, 2, 6, 10, 14, 18 and 22.

Moreover, in the case where pictures for 60 viewpoints p=300 to 359 are transmitted in one revolution, updating intervals T of 12 light-emitting elements 201 to 212 are as follows:

$$T = Tc/60 \quad (4)$$

Figure 30:
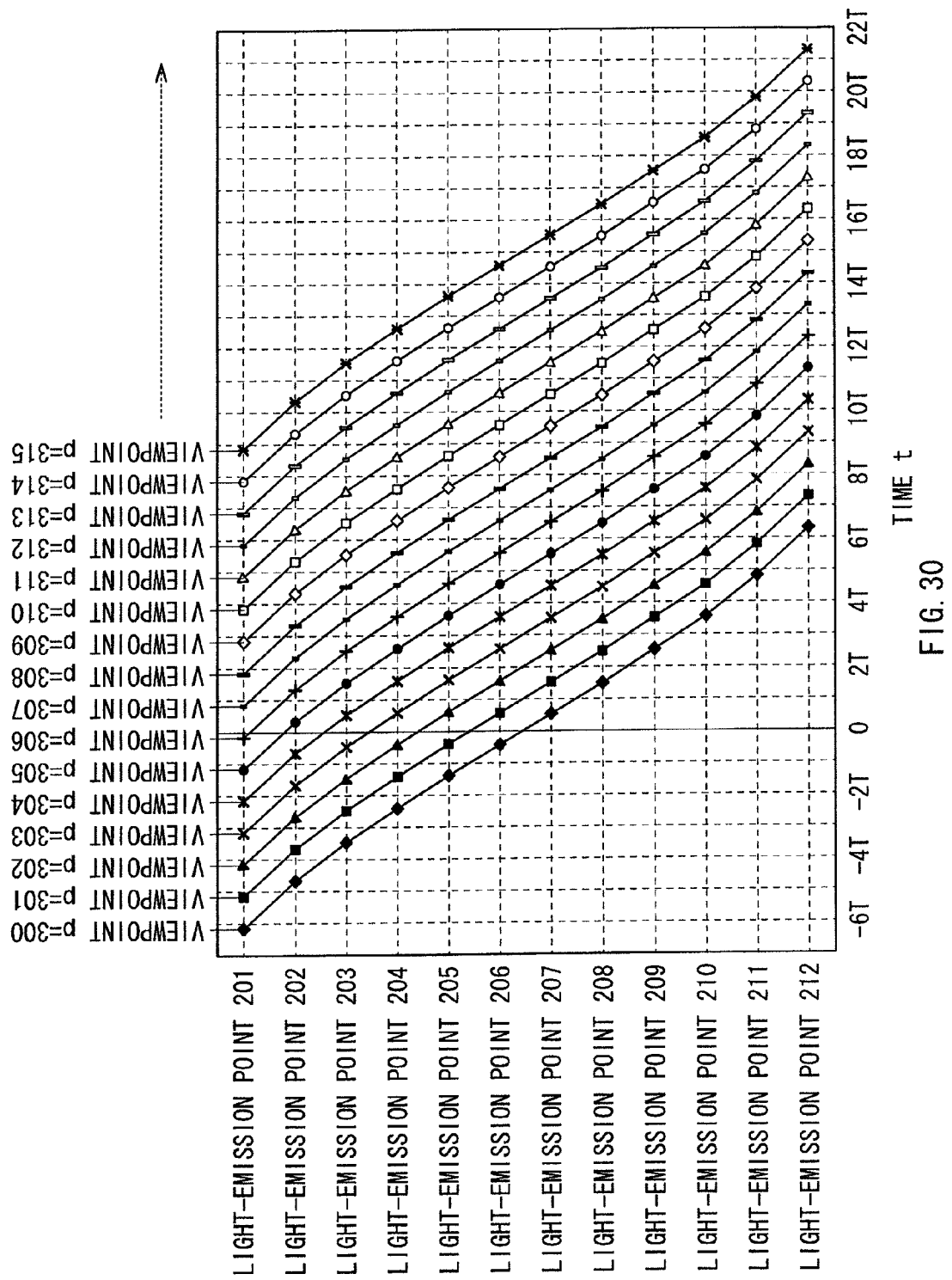
FIG. 30 is an illustration of light-emission timings of light-emitting elements in the two-dimensional light-emitting element array 101.
Figure 31:
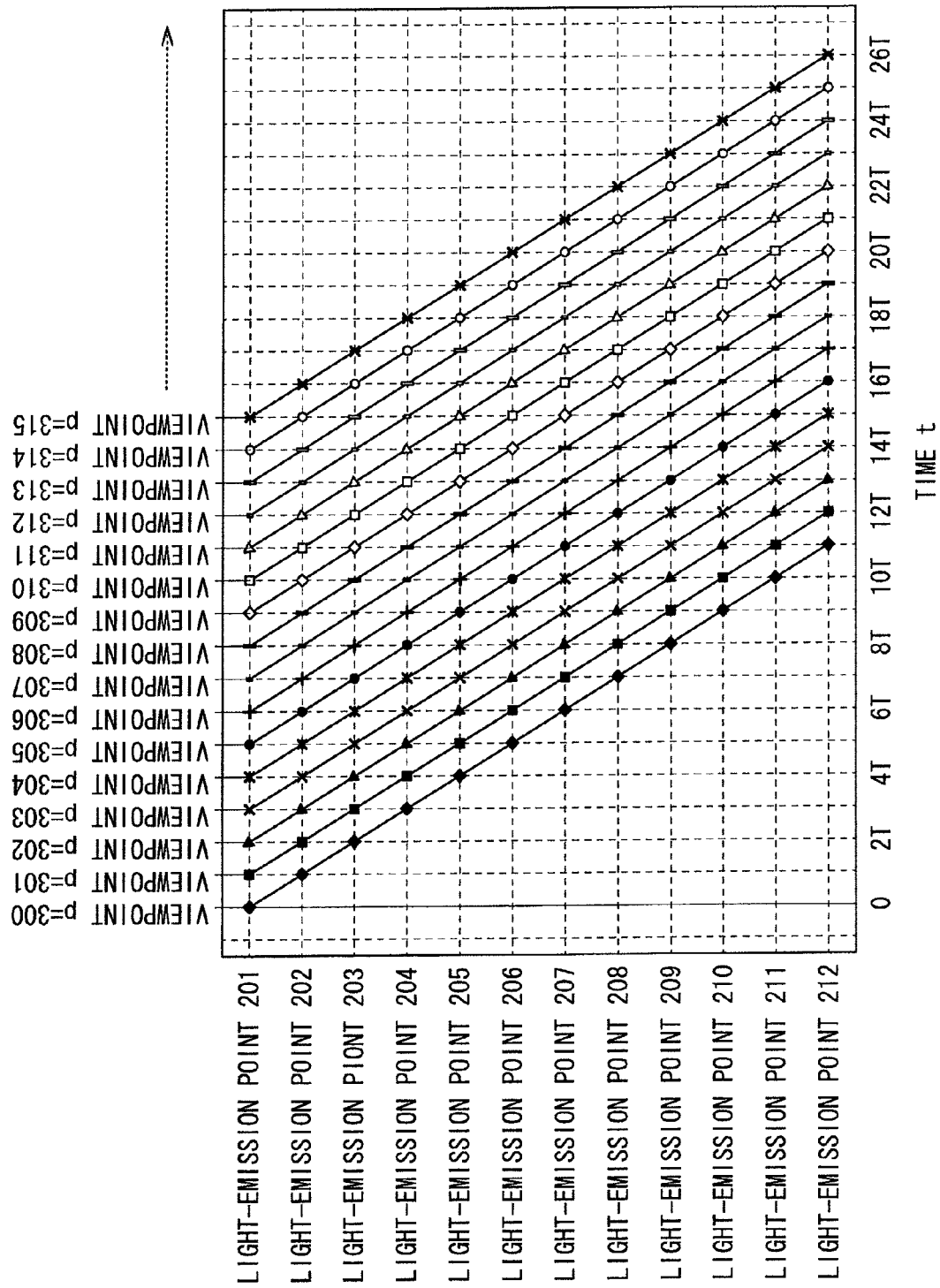
FIG. 31 is an illustration of a comparative example of light-emission timings of light-emitting elements in the two-dimensional light-emitting element array 101.

FIG. 30 illustrates light-emission timings of the light-emitting elements for achieving ideal picture display illustrated in FIG. 27(B). Moreover, FIG. 31 illustrates light-emission timings as a comparative example. The comparative example in FIG. 31 corresponds to timings of light ray emission illustrated in FIGS. 10 to 12 and FIGS. 13 to 15 which are described above. In FIGS. 30 and 31, a horizontal axis indicates time t and a vertical axis indicates 12 light-emission points (light-emitting elements 201 to 212). In FIG. 30, a solid curved line (a straight line in FIG. 31) indicates light-emission timings with respect to a certain viewpoint p. For example, in FIG. 30, a leftmost solid curved line indicates light-emission timings of light-emission points (light-emitting elements) observed from the viewpoint 300. Note that light-emission timings illustrated in FIGS. 30 and 31 are controlled by the display control section 15 (refer to FIG. 18).

In the comparative example in FIG. 31, updating intervals T and updating timings (time) of 12 light-emitting elements 201 to 212 are the same as each other. For example, at the time t=11T, the light-emitting elements 201 to 212 each perform picture display (light emission) for viewpoints 311 to 300, respectively (for example, the light-emitting element 201 performs light emission for the viewpoint 311, and at the same time, the light-emitting element 202 performs light emission for the viewpoint 310). At the next time t=12T, the light-emitting elements 201 to 212 are updated simultaneously, and each perform light emission for the viewpoints 312 to 301. In other words, picture updating timings (light-emission updating timings) are the same for 12 light-emitting elements 201 to 212.

On the other hand, in an example in FIG. 30, the updating intervals T of 12 light-emitting elements 201 to 212 are the same, but updating timings (time) thereof are different. For example, the light-emitting element 201 starts light emission for the viewpoint 311 at a time slightly earlier than the time t=5T, and other light-emitting elements 202 to 212 do not emit light at the same time. For example, the light-emitting element 202 starts light emission for the viewpoint 310 at a time slightly later than the time t=5T. Thus, 12 light-emitting elements 201 to 212 are separately controlled to start light emission at different timings. As the light-emitting elements 201 to 212 is separately controlled to perform light emission at such light-emission timings, ideal picture display as illustrated in FIG. 27(B) is achievable.

Figure 32:
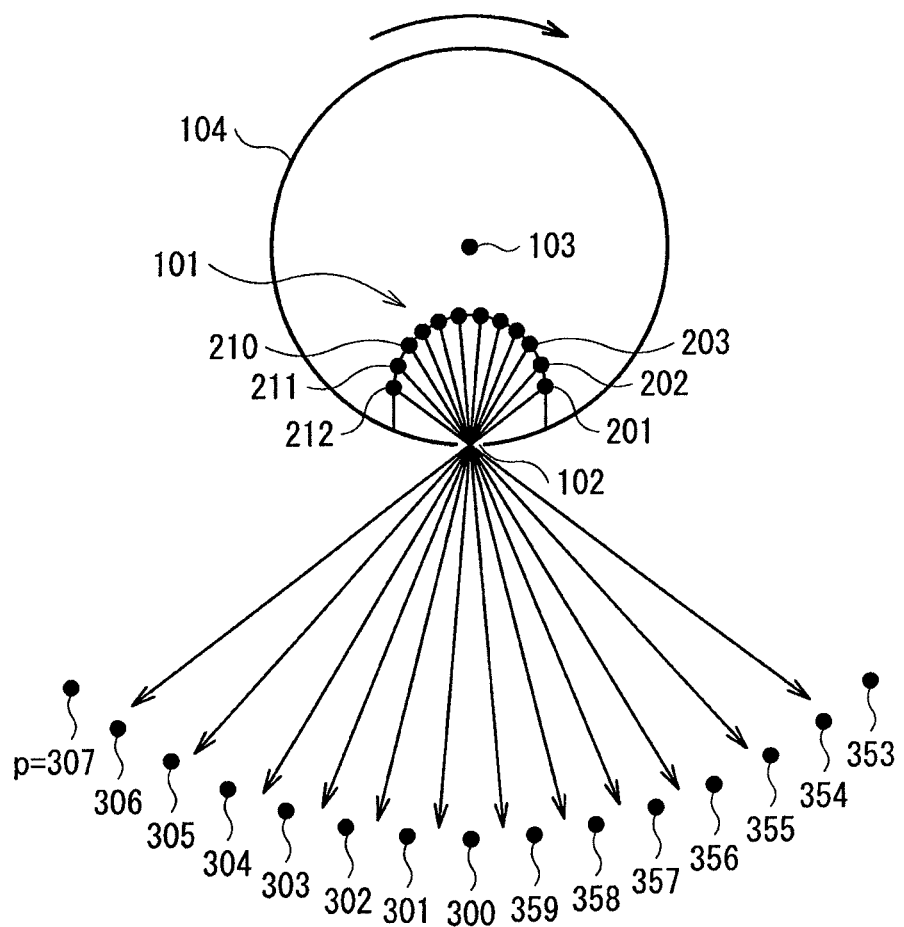
FIG. 32 is an illustration of a state of light rays emitted through a slit in the case where a plurality of light-emitting elements simultaneously emit light at a time t=0 in a configuration in FIG. 29.

FIG. 32 illustrates a state (a light ray vector) of light rays emitted through the slit 102 in the case where 12 light-emitting elements 201 to 212 simultaneously emit light at the time t=0 in the configuration in FIG. 29. It is obvious from FIG. 32 that a light ray vector from each light-emitting element has a different positional relationship with a viewpoint position. It is also obvious from this that instead of simultaneously emitting light from 12 light-emitting elements 201 to 212, it is necessary to separately control light-emission timings of light-emitting elements as illustrated in FIG. 30.

[Effect by Forming an Observed Picture on a Flat Plane]

In each of the above-described embodiments, the curved surface of the two-dimensional light-emitting element array 101 is preferably configured to form a flat display plane observed from the viewpoint p. The reasons for this are as follows.

When the observed display plane is flat, a picture taken by a camera or a picture formed by CG is allowed to be used as it is without picture processing. In the case where the observed display plane is curved, it is necessary to produce and use a picture of which a display plane has a corrected curvature so as not to distort a picture observed from the viewpoint p.

In the case where the observed display plane is curved, when the display plane is viewed from above or below, a picture is distorted in an arc shape; therefore, it is difficult to obtain a favorable stereoscopic picture.

In particular, in the case where as in the case of the embodiment, pixel intervals of the display plane observed from the viewpoint p are uniform, the following effect is further obtained.

When the pixel intervals are uniform, a picture taken by a camera or a picture produced by CG is allowed to be used as it is without picture processing. In the case where the pixel intervals are not uniform, it is necessary to produce and use a picture in which a distortion in width between pixels is corrected.

<Ninth Embodiment>

[Viewing Example of Stereoscopic Picture by Displays of Respective Embodiments]

Figure 33:
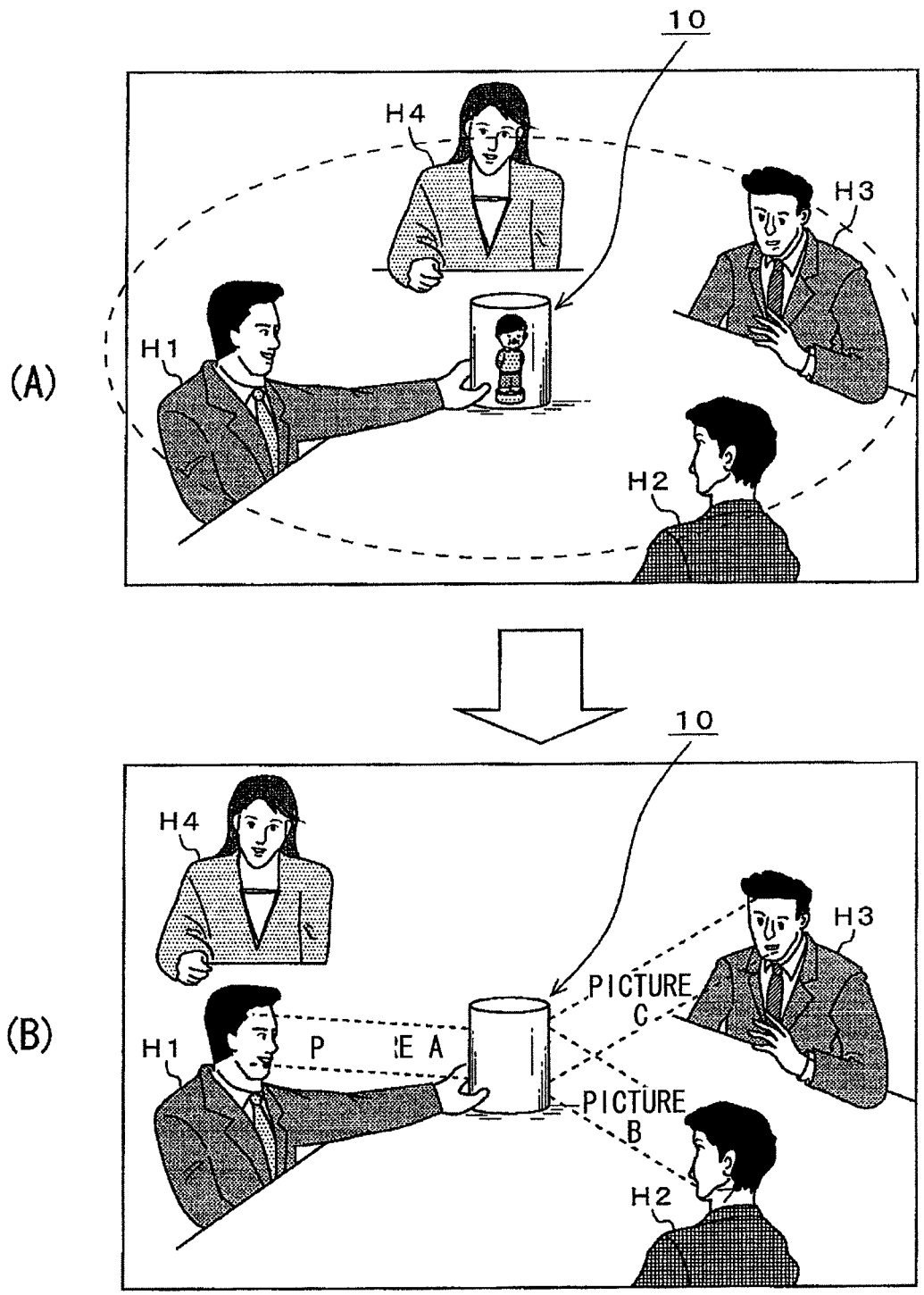
[FIG. 33]

FIGS. 33A and B are illustrations of a viewing example of a stereoscopic picture in the omnidirectional stereoscopic picture display 10 and the like as the above-described respective embodiments. The viewing example of the stereoscopic picture illustrated in FIG. 33A indicates a case where a character (a boy doll) stereoscopically displayed by the omnidirectional stereoscopic picture display 10 or the like is viewed by four viewers H1 to H4. In this case, a stereoscopic picture of an entire circumference of the character is displayed; therefore, the viewer H1 (a man) is allowed to view a stereoscopic picture of a left side of the character. The viewer H2 (a man) is allowed to view a stereoscopic picture of a front side of the character. The viewer H3 (a man) is allowed to view a stereoscopic picture of a right side of the character. The viewer H4 (a woman) is allowed to view a stereoscopic picture of a back side of the character.

In the viewing example of the stereoscopic picture illustrated in FIG. 33B, a stereoscopic picture display system in which a picture is transmitted to only a region where it is determined that a viewer is present and a stereoscopic picture is not transmitted to a region where it is determined that no viewer is present is used. For example, in the drawing, four viewers H1 to H4 are present around the omnidirectional stereoscopic picture display 10. Three viewers H1 to H3 watch the omnidirectional stereoscopic picture display 10 with their eyes fixed thereon, but the viewer H4 does not watch the omnidirectional stereoscopic picture display 10, and looks the other way. In this case, in the omnidirectional stereoscopic picture display 10 illustrated in FIG. 18, the viewer detection sensor 81 detects pupils of the three viewers H1 to H3 to generate the viewer detection signal S81.

The omnidirectional stereoscopic picture display 10 sequentially transmits viewing regions of the three viewers H1 to H3 to the picture source transmission device 90 based on the viewer detection signal S81 supplied from the viewer detection sensor 81. The picture source transmission device 90 transmits only region pictures corresponding to the viewing regions of the three viewers H1 to H3 to the omnidirectional stereoscopic picture display 10. As a result, display information is allowed to be reproduced only in viewing regions where three viewers H1 to H3 are present.

In this example, the viewer H1 watching the omnidirectional stereoscopic picture display 10 with his eyes fixed thereon is allowed to watch a stereoscopic picture of left side of the character. Likewise, the viewer H2 is allowed to view a stereoscopic picture of a front side of the character. Likewise, the viewer H3 is allowed to view a stereoscopic picture of a right side of the character. However, a stereoscopic picture is not displayed in a viewing region where the viewer H4 looking the other way is present.

A broken line portion illustrated in the drawing indicates a state where display light is applied to the face of each of the viewers H1 to H3. Display light is not applied to the viewer H4, because as the eyes of the viewer H4 are not directed to the omnidirectional stereoscopic picture display 10, the viewer H4 is not considered as a viewer. A region picture corresponding to a viewing region between the viewer H1 and the viewer H2 is not transmitted; therefore, a stereoscopic picture is not displayed in the viewing region therebetween. Therefore, a unique stereoscopic picture display method is allowed to be provided.

<Other Embodiments>

The present invention is not limited to the above-described embodiments, and may be variously modified.

For example, in the omnidirectional stereoscopic picture display 10 illustrated in FIGS. 1 and 2, a fixed member for giving protection or the like for the rotation section 104 may be arranged outside of the rotation section 104. In this case, for example, a fixed member which does not rotate may be arranged around the exterior body 41 including the slit 102 with a space therebetween. The fixed member may be configured of, for example, a cylindrical transparent member as a whole. Moreover, as the fixed member, a cylindrical member processed in a mesh form may be used. For example, a member made of metal or the like processed in a mesh form such as punching metal may be used.

[Industrial Applicability]

The present invention is extremely suitably applied to an integral imaging-based omnidirectional stereoscopic picture display or the like which picks up images of a subject throughout an entire circumference thereof, or reproduces a stereoscopic picture of an entire circumference of a subject based on two-dimensional picture information for stereoscopic picture display or the like formed by a computer.

The invention claimed is:

1. A stereoscopic picture display comprising:
   a cylindrical rotation section including a rotation shaft therein;
   a drive section causing the rotation section to rotate;
   a light-emitting element array mounted in the rotation section and having a light-emission surface; and
   a slit arranged in a circumferential surface of the rotation section in a position facing the light-emission surface,
   wherein the light-emitting element array has a laminate configuration in which a number n of light-emitting element substrates are laminated along a direction of the rotation shaft of the rotation section, where n is an integer that is 2 or more, and the light-emitting element substrate has a configuration in which a number m of light-emitting elements are mounted in a curved line, where m is an integer that is 2 or more.

2. The stereoscopic picture display according to claim 1, wherein
the slit is arranged to extend in a direction parallel to the rotation shaft.

3. The stereoscopic picture display according to claim 2, wherein
a curved shape of the light-emission surface is represented by the following expressions:

$$x(\theta)=r(L2-L1)\sin\theta\cos\theta/(L1-r\cos\theta)+L2\sin\theta \quad (1)$$

$$y(\theta)=r(L2-L1)\sin^2\theta/(L1-r\cos\theta)-L2\cos\theta \quad (2)$$

where L1 is a length of a line segment from the rotation shaft to an arbitrary viewpoint,
L2 is a minimum distance from the rotation shaft to the light-emitting element array,
r is a length of a line segment from the rotation shaft to the slit,
θ is an angle formed between the line segment with the length L1 and the line segment with the length r, and represents the position of the slit with respect to the line segment with the length L1, and
x(θ) is an x-axis coordinate value forming the curved shape of the light-emission surfaces, and y(θ) is a y-axis coordinate value forming the curved shape of the light-emission surface.

4. The stereoscopic picture display according to claim 2, wherein
a curved shape of the light-emission surface is represented by the following expressions:

$$x(\theta)=x2\cos\theta+L2\sin\theta \quad (1A)$$

$$y(\theta)=x2\sin\theta-L2\cos\theta \quad (2A)$$

where L1 is a distance of a line segment from the rotation shaft to an arbitrary viewpoint,
L2 is a minimum distance from the rotation shaft to the light-emitting element array,
r is a distance of a line segment from the rotation shaft to the slit,
θ is an angle formed between the line segment with the length L1 and the line segment with the length r, and represents the position of the slit with respect to the line segment with the length L1, and
x(θ) is an x-axis coordinate value forming the curved shape of the light-emission surface, and y(θ) is a y-axis coordinate value forming the curved shape of the light-emission surface.

5. The stereoscopic picture display according to claim 1, further comprising a display control section performing light-emission control of the plurality of light-emitting elements based on picture information for stereoscopic picture.

6. The stereoscopic picture display according to claim 5, wherein
the display control section performs light-emission control to allow the number m of light-emitting elements arranged in a row direction of the light-emitting element array to start light emission at different timings in accordance with rotation of the rotation section.

7. The stereoscopic picture display according to claim 1, wherein a width in a shorter axis direction of the slit is formed to be equal to a mounting pitch of the number m of light-remitting elements.

8. The stereoscopic picture display according to claim 5, further comprising an observer detection section detecting an observer around the rotation section,
wherein the display control section performs a comparison between an observer detection value obtained from the observer detection section and a predetermined observer determination reference value, and controls light-emission intensities of the light-emitting elements according to a result of the comparison.

9. The stereoscopic picture display according to claim 8, wherein
the observer detection section is mounted on the rotation section.

10. The stereoscopic picture display according to claim 1, wherein
each of the plurality of light-emitting elements is provided with a lens member which allows an emitted light flux to be condensed on the slit.

11. The stereoscopic picture display according to claim 1, wherein
a cooling blade is mounted on the rotation section.

12. The stereoscopic picture display according to claim 1, further comprising:
a rotation detection section detecting rotation of the rotation section; and
a drive control section controlling the drive section,
wherein the drive control section performs a comparison between a rotation detection value obtained from the rotation detection section and a predetermined rotation reference value, and controls the drive section to stop a rotation operation of the rotation section according to a result of the comparison.

13. The stereoscopic picture display according to claim 1, further comprising:
a vibration detection section detecting vibrations of the rotation section; and
a drive control section controlling the drive section,
wherein the drive control section performs a comparison between a vibration detection value obtained from the vibration detection section and a predetermined vibration reference value, and controls the drive section to stop a rotation operation of the rotation section according to a result of the comparison.

14. The stereoscopic picture display according to claim 5, wherein
the picture information for stereoscopic picture is two-dimensional picture data for N points×m rows obtained by picking up images of an arbitrary subject from N points at equal intervals along an entire circumference thereof with use of an image pickup system including a number m×n of image pickup elements in a matrix with m rows and n columns, where N is an integer of 2 or more.

* * * * *